(12) United States Patent
Oyanagi et al.

(10) Patent No.: US 11,869,559 B2
(45) Date of Patent: Jan. 9, 2024

(54) MAGNETIC TAPE HAVING CONTROLLED WATER CONTACT ANGLE RATIO, MAGNETIC TAPE CARTRIDGE, AND MAGNETIC TAPE APPARATUS

(71) Applicant: FUJIFILM Corporation, Tokyo (JP)

(72) Inventors: Noriko Oyanagi, Minamiashigara (JP); Wataru Kikuchi, Minamiashigara (JP); Akio Tamura, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/873,728

(22) Filed: Jul. 26, 2022

(65) Prior Publication Data

US 2023/0101868 A1 Mar. 30, 2023

(30) Foreign Application Priority Data

Jul. 27, 2021 (JP) ................................. 2021-122517
Jan. 24, 2022 (JP) ................................. 2022-008493

(51) Int. Cl.
G11B 5/78 (2006.01)
G11B 5/714 (2006.01)
G11B 5/706 (2006.01)
G11B 5/725 (2006.01)
G11B 5/702 (2006.01)
G11B 5/71 (2006.01)
G11B 5/733 (2006.01)

(52) U.S. Cl.
CPC .............. *G11B 5/78* (2013.01); *G11B 5/7028* (2013.01); *G11B 5/70678* (2013.01); *G11B 5/71* (2013.01); *G11B 5/714* (2013.01); *G11B 5/7253* (2020.08); *G11B 5/7334* (2019.05)

(58) Field of Classification Search
None
See application file for complete search history.

(56) References Cited

U.S. PATENT DOCUMENTS

2016/0064024 A1* 3/2016 Mikami ............... G11B 5/7334
428/840.2
2019/0304496 A1* 10/2019 Fujimoto ........... G11B 5/70642
2020/0402533 A1* 12/2020 Nakashio ........... G11B 5/70678

FOREIGN PATENT DOCUMENTS

JP H07-320254 A 12/1995
JP H09-16949 A 1/1997
JP 2006-188596 A 7/2006

* cited by examiner

*Primary Examiner* — Kevin M Bernatz
(74) *Attorney, Agent, or Firm* — Sughrue Mion, PLLC

(57) ABSTRACT

The magnetic tape includes a non-magnetic support, and a magnetic layer including a ferromagnetic powder. A fluorine-containing compound is included in a portion on the non-magnetic support on a magnetic layer side, and a ratio θr of a water contact angle measured on a surface of the magnetic layer after sliding on a magnetic head to a water contact angle measured on the surface of the magnetic layer before sliding on the magnetic head is 0.70 or more.

20 Claims, 2 Drawing Sheets

MAGNETIC TAPE HAVING CONTROLLED WATER CONTACT ANGLE RATIO, MAGNETIC TAPE CARTRIDGE, AND MAGNETIC TAPE APPARATUS

CROSS-REFERENCE TO RELATED APPLICATIONS

This application claims priority under 35 U.S.C 119 to Japanese Patent Application No. 2021-122517 filed on Jul. 27, 2021 and Japanese Patent Application No. 2022-008493 filed on Jan. 24, 2022. Each of the above applications is hereby expressly incorporated by reference, in its entirety, into the present application.

BACKGROUND OF THE INVENTION

1. Field of the Invention

The present invention relates to a magnetic tape, a magnetic tape cartridge, and a magnetic tape apparatus.

2. Description of the Related Art

In recent years, magnetic recording media have been widely used as recording media for recording various pieces of data (see JP2006-188596A, JP1997-16949A (JP-H09-16949A), and JP1995-320254A (JP-H07-320254A)).

SUMMARY OF THE INVENTION

There are two types of magnetic recording media: a tape shape and a disk shape, and a tape-shaped magnetic recording medium, that is, a magnetic tape is mainly used for data storage applications such as data backup and archiving.

Recording of data on a magnetic tape and reproduction of recorded data are usually performed by repeatedly running the magnetic tape in a magnetic tape apparatus (generally referred to as a "drive"). A desired performance of the magnetic tape is little deterioration in electromagnetic conversion characteristics after such repeated running.

An object of an aspect of the present invention is to provide a magnetic tape having little deterioration in electromagnetic conversion characteristics even after repeated running.

One aspect of the present invention relates to a magnetic tape comprising: a non-magnetic support; and a magnetic layer including a ferromagnetic powder, in which a fluorine-containing compound is included in a portion on the non-magnetic support on a magnetic layer side, and a ratio θr of a water contact angle measured on a surface of the magnetic layer after sliding on a magnetic head to a water contact angle measured on the surface of the magnetic layer before sliding on the magnetic head is 0.70 or more.

In one embodiment, the ratio θr may be 0.80 or more.

In one embodiment, the ratio θr may be 0.85 or more.

In one embodiment, the magnetic tape may further comprise one or more non-magnetic layers including a non-magnetic powder between the non-magnetic support and the magnetic layer.

In one embodiment, the magnetic tape may further comprise a back coating layer including a non-magnetic powder on a surface side of the non-magnetic support opposite to a surface side having the magnetic layer.

In one embodiment, the ferromagnetic powder may be a hexagonal strontium ferrite powder.

In one embodiment, the ferromagnetic powder may be a hexagonal barium ferrite powder.

In one embodiment, the ferromagnetic powder may be an ε-iron oxide powder.

Another aspect of the present invention relates to a magnetic tape cartridge comprising: the magnetic tape described above.

Still another aspect of the present invention relates to a magnetic tape apparatus comprising: the magnetic tape described above.

According to one aspect of the present invention, it is possible to provide a magnetic tape having little deterioration in electromagnetic conversion characteristics even after repeated running, and to provide a magnetic tape cartridge and a magnetic tape apparatus which include the magnetic tape.

DESCRIPTION OF THE PREFERRED EMBODIMENTS

Magnetic Tape

Figure 1:
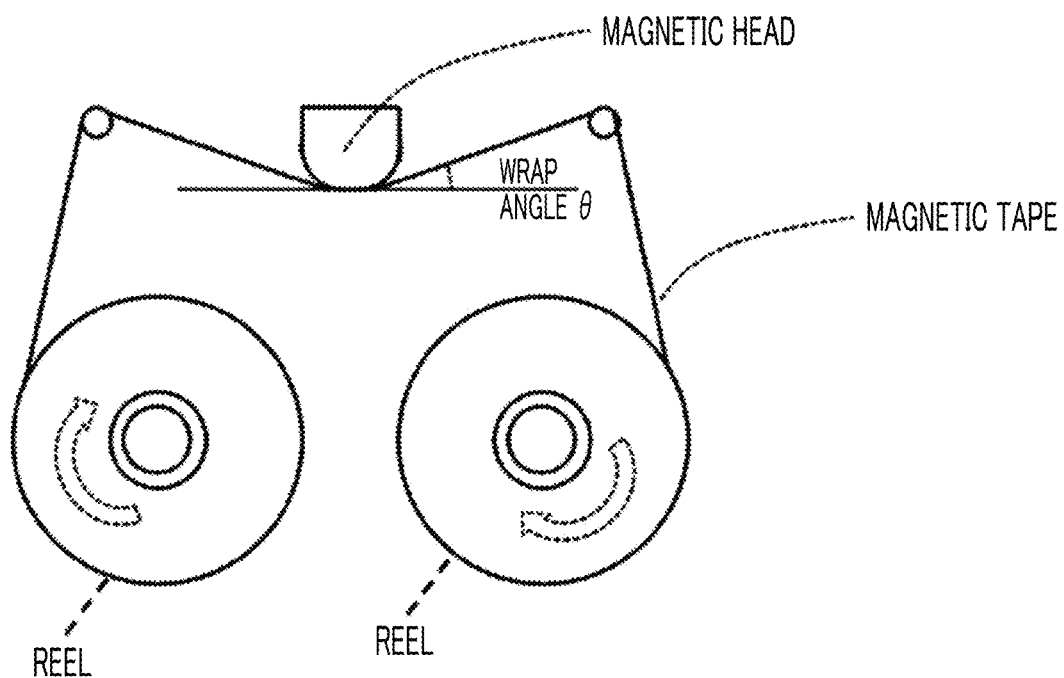
FIG. 1 shows an example of an apparatus used for sliding a magnetic tape and a magnetic head on each other.

One aspect of the present invention relates to a magnetic tape including a non-magnetic support and a magnetic layer including ferromagnetic powder. The magnetic tape includes a fluorine-containing compound in a portion on the non-magnetic support on a magnetic layer side, and a ratio θr of a water contact angle measured on a surface of the magnetic layer after sliding on a magnetic head to a water contact angle measured on the surface of the magnetic layer before sliding on the magnetic head (hereinafter, simply referred to as a "ratio θr") is 0.70 or more.

The magnetic tape includes a fluorine-containing compound in a portion on the non-magnetic support on the magnetic layer side. In the present invention and the present specification, the term "portion on the non-magnetic support on the magnetic layer side" refers to a magnetic layer in a case of a magnetic tape including the magnetic layer directly on the non-magnetic support, and refers to a magnetic layer and/or a non-magnetic layer in a case of a magnetic tape including the non-magnetic layer between the non-magnetic support and the magnetic layer, which will be described in detail below. Hereinafter, the term "portion on the non-magnetic support on the magnetic layer side" is also simply described as a "portion on the magnetic layer side". The presence of the fluorine-containing compound on a surface of the magnetic tape on the magnetic layer side is also included in the inclusion of the fluorine-containing compound in the portion on the magnetic layer side. In the present invention and the present specification, the term "magnetic layer surface (surface of the magnetic layer)" has the same meaning as the surface of the magnetic tape on the magnetic layer side.

Recording of data on the magnetic tape and reproduction of the recorded data are usually performed as the magnetic layer surface of the magnetic tape and a magnetic head come into contact with each other to be slid on each other. It is desirable to reduce friction during sliding between the magnetic layer surface and the magnetic head, from the viewpoint of improving electromagnetic conversion characteristics. As means for reducing the friction, a component (so-called lubricant) capable of imparting lubricity to the magnetic layer surface may be contained in the magnetic tape. For example, JP2006-188596A, JP1997-16949A (JP-H09-16949A), and JP1995-320254A (JP-H07-320254A), which are mentioned above, each disclose a fluorine-containing compound as a lubricant.

With respect to this, as a result of intensive studies by the present inventor, it has been clarified that a magnetic tape including a fluorine-containing compound in the portion on the magnetic layer side and having a ratio θr of 0.70 or more has little deterioration in electromagnetic conversion characteristics even after repeated running. The present inventor considers that the ratio θr of 0.70 or more indicates that the amount of fluorine-containing compounds released from the magnetic tape is small even though the magnetic tape is repeatedly run while sliding on the magnetic head, that is, most of the fluorine-containing compounds remain in the magnetic tape even after repeated running. The present inventor supposes that the fact that most of the fluorine-containing compounds remain in the magnetic tape even though the magnetic tape is repeatedly run leads to suppression of deterioration in lubricity of the magnetic layer surface caused by the fluorine-containing compound, and as a result, it is possible to suppress deterioration in electromagnetic conversion characteristics after repeated running. Note that the present invention is not limited to the supposition described in the present specification.

Hereinafter, the magnetic tape will be described in more detail.

Ratio θr

Measurement of Water Contact Angle and Calculation of θr

A water contact angle before sliding on the magnetic head is called "$\theta_{before}$", and a water contact angle after sliding on the magnetic head is called "$\theta_{after}$". Two tape samples are cut out from any position in the longitudinal direction of the same magnetic tape. A length of one of the two tape samples is 100 m. A length of the other tape sample need only be any length enough to measure the water contact angle. For the tape sample having any length, the water contact angle is obtained at a randomly selected portion of the magnetic layer surface without sliding on the magnetic head. The water contact angle obtained for this tape sample is defined as the water contact angle $\theta_{before}$ before sliding on the magnetic head. For a tape sample having a length of 100 m, the water contact angle is obtained at a randomly selected portion of the magnetic layer surface after sliding on the magnetic head. The water contact angle obtained for this tape sample is defined as the water contact angle $\theta_{after}$ after sliding on the magnetic head. The sliding on the magnetic head will be described below. In the present invention and the present specification, the term "water contact angle" refers to a value measured by a liquid droplet method. Specifically, the water contact angle refers to an arithmetic average of values obtained by measuring the tape sample to be measured at six different locations of the magnetic layer surface by a θ/2 method in a measurement environment of an atmosphere temperature of 25° C. and a relative humidity of 50%. The water used is distilled water having a temperature of 25° C. An example of a specific aspect of measurement conditions will be described below with reference to Examples. The ratio θr is a ratio calculated as "$\theta_{after}/\theta_{before}$". The measurement of the water contact angle is performed after leaving the tape sample to be measured in an environment of a temperature of 25° C. and a relative humidity of 50% for 2 hours or longer.

Sliding on Magnetic Head

A reel tester having two tape reels is used for sliding the magnetic layer surface of the above tape sample having a length of 100 m and the magnetic head on each other. As the reel tester, a commercially available product or a reel tester assembled by a well-known method can be used. As an example, FIG. 1 shows an example of an apparatus used for sliding a magnetic tape (specifically, the above-described tape sample) and a magnetic head on each other.

The sliding between the magnetic tape and the magnetic head is performed in an environment of an atmosphere temperature of 23° C.±1° C. and a relative humidity of 50%.

One end part of the tape sample is fixed to one tape reel of the reel tester, the other end part is fixed to the other tape reel of the reel tester, whereby the tape sample is attached to the reel tester.

As the magnetic head attached to the reel tester, a linear tape-open (LTO) 8 head is used. In the present invention and the present specification, the term "LTO 8 head" refers to a magnetic head conforming to an LTO 8 standard. As the LTO 8 head, a magnetic head mounted on an LTO 8 drive may be taken out and used, or a commercially available magnetic head as the magnetic head for the LTO 8 drive may be used. Here, the term "LTO 8 drive" refers to a drive (magnetic tape apparatus) conforming to an LTO 8 standard. This also applies to drives of other generations. For example, the term "LTO 9 drive" refers to a drive conforming to an LTO 9 standard. In consideration of the fact that the LTO 8 standard is a standard that can cope with high-density recording in recent years, the LTO 8 head is employed as a magnetic head for the sliding, and the magnetic tape is not limited to the one used in the LTO 8 drive. On the magnetic tape, data may be recorded and/or reproduced in the LTO 8 drive, data may be recorded and/or reproduced in the LTO 9 drive or even a next generation drive, or data may be recorded and/or reproduced in a drive of a generation prior to LTO 8 such as LTO 7.

The tape sample is run on the reel tester, and the surface of the magnetic layer and the magnetic head come into contact with each other to be slid on each other. Running conditions of the magnetic tape (the above-described tape sample) are as follows. A value of a tension applied in the longitudinal direction of the magnetic tape and a running speed of the magnetic tape are set values in the reel tester. Regarding a unit, "gf" indicates a gram-force, and 1 N (Newton) is about 102 gf.

Running speed of magnetic tape: 4 m/sec
Tension applied in longitudinal direction of magnetic tape: 100 gf
Running pass of magnetic tape: 20,000 single-pass
Wrap angle θ: 1°

In the magnetic tape, from the viewpoint of suppressing deterioration in electromagnetic conversion characteristics after repeated running, the ratio θr is 0.70 or more, preferably 0.72 or more, more preferably 0.75 or more, still more preferably 0.77 or more, still more preferably 0.80 or more, still more preferably 0.82 or more, and still more preferably 0.85 or more. The ratio θr is 1.00 in a case where $\theta_{before}=\theta_{after}$. The ratio θr may be 1.00, 1.00 or less, or less than 1.00. The ratio θr may be, for example, 0.98 or less, 0.96 or less, or 0.94 or less. Note that the ratio θr may exceed the values exemplified here. The present inventor considers that the value of the ratio θr more than 1.00 indicates that the amount of the fluorine-containing compound remaining in the magnetic tape after sliding on the magnetic head is larger. The present inventor supposes that this point is preferable for further suppressing deterioration in electromagnetic conversion characteristics after repeated running Fluorine-Containing Compound The magnetic tape includes a fluorine-containing compound in a portion on the magnetic layer side. In the present invention and the present specification, the term "fluorine-containing compound" refers to a compound containing one or more fluorine atoms (F) per molecule. In order to control the ratio θr to 0.70 or more, the fluorine-containing compound is preferably a compound that is likely to remain in the magnetic tape even though the magnetic layer surface and the magnetic head are slid on each other. From this point, a fluorine-containing compound having a functional group called an adsorption functional group is preferable, a compound having two or more adsorption functional groups in one molecule is more preferable, and a compound having more adsorption functional groups in one molecule is still more preferable. In one aspect, the fluorine-containing compound may be a polymer (also referred to as a "fluorine-containing polymer"). The fluorine-containing polymer may be a homopolymer or a copolymer. The fluorine-containing polymer may have a branched structure including a main chain and one or more side chains branched from the main chain. At least one terminal of the side chain and/or the main chain may contain the adsorption functional group. One terminal or both terminals of the main chain may contain the adsorption functional group. The fluorine-containing polymer containing the adsorption functional group in the side chain is preferable for increasing the value of θr, and it is more preferable that more side chains contain the adsorption functional group. In addition, in the fluorine-containing polymer, a fluorine atom may be contained in the side chain and/or the main chain. For example, the fluorine-containing polymer may contain a functional group containing a fluorine atom as a constituent atom (also referred to as a "fluorine-containing functional group") in the side chain. From the viewpoint of providing more excellent lubricity to the magnetic layer surface, it is more preferable that more side chains contain the fluorine-containing functional group in the fluorine-containing polymer.

In one aspect, the fluorine-containing polymer may be a polymer having a branched structure (hereinafter, referred to as a "polymer A") that includes a repeating unit represented by General Formula (1) and at least one repeating unit selected from the group consisting of a repeating unit represented by General Formula (2) and a repeating unit represented by General Formula (3).

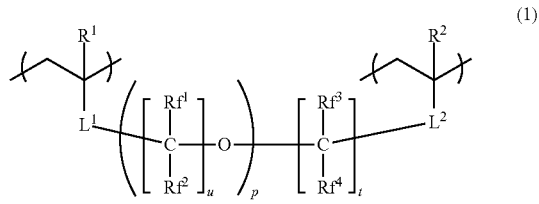
(1)

In General Formula (1),
$R^1$ and $R^2$ each independently represent a hydrogen atom or a methyl group.
$L^1$ and $L^2$ each independently represent a divalent linking group.
$Rf^1$, $Rf^2$, $Rf^3$, and $Rf^4$ each independently represent a fluorine atom or a perfluoroalkyl group.
u represents an integer of 1 or more.
p represents an integer of 2 or more.
t represents an integer of 0 or more.
A plurality of $Rf^1$'s may be the same as or different from each other.
A plurality of $Rf^2$'s may be the same as or different from each other.
In a case where there are a plurality of $Rf^3$'s, the plurality of $Rf^3$'s may be the same as or different from each other.
In a case where there are a plurality of $Rf^4$'s, the plurality of $Rf^4$'s may be the same as or different from each other.

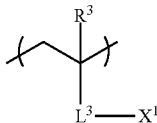
(2)

In General Formula (2),
$R^3$ represents a hydrogen atom or a methyl group.
$L^3$ represents a single bond or a divalent linking group.
$X^1$ represents —OH, —COOH, —PO$_3$H, {—OP(=O)(OH)$_2$}, —OM$^1$, —CO$_2$M$^1$, —SO$_3$M$^1$, —NT$^1$T$^2$, an epoxy group, an alicyclic epoxy group, an oxazoline group, —NG$^1$G$^2$G$^3$E$^1$, or a group having a betaine structure.
$M^1$ represents alkali metal, alkaline earth metal, Mg, Al, or $Q^1Q^2Q^3Q^4N^+$.
$Q^1$, $Q^2$, $Q^3$, and $Q^4$ each independently represent a hydrogen atom or an alkyl group having 1 to 20 carbon atoms.
$T^1$ and $T^2$ each independently represent a hydrogen atom, an alkyl group having 1 to 20 carbon atoms, or an alkoxy group having 1 to 20 carbon atoms.
$T^1$ and $T^2$ may be bonded.
$E^1$ represents an anion.
$G^1$, $G^2$, and $G^3$ each independently represent a hydrogen atom or an alkyl group having 1 to 20 carbon atoms.

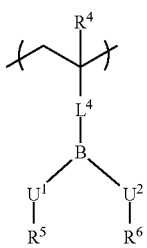
(3)

In General Formula (3),
$R^4$ represents a hydrogen atom, a fluorine atom, a chlorine atom, or an alkyl group having 1 to 20 carbon atoms.
$U^1$ and $U^2$ each independently represent —O—, —S—, —COO—, —OCO—, —CONH—, —NHCOO—, or NH—.
$R^5$ and $R^6$ each independently represent a hydrogen atom, an aliphatic hydrocarbon group, an aryl group, or a heteroaryl group.
$R^5$ and $R^6$ may be bonded.
$L^4$ represents a single bond or a divalent linking group.

The polymer A contains at least one repeating unit represented by General Formula (1), and may contain only one or two or more repeating units.

The polymer A may have only a repeating unit represented by General Formula (2), may have only a repeating unit represented by General Formula (3), or may have a repeating unit represented by General Formula (2) and a repeating unit represented by General Formula (3). In a case where the polymer A has the repeating unit represented by General Formula (2), the polymer A may contain only one or two or more repeating units represented by General Formula (2). In a case where the polymer A has the repeating unit represented by General Formula (3), the polymer A may contain only one or two or more repeating units represented by General Formula (3).

Since the polymer A contains the repeating unit represented by General Formula (1), it may contain a fluorine-containing functional group in the side chain.

In addition, the repeating unit represented by General Formula (2) and the repeating unit represented by General Formula (3) can be referred to as a repeating unit having an adsorption functional group. Since the polymer A contains one or more of these repeating units, it may be a compound that is likely to remain in the magnetic tape even though the magnetic layer surface and the magnetic head are slid on each other.

Hereinafter, the polymer A will be described in more detail.

In notations for a group (atomic group) in the present invention and the present specification, in a case where the group is cited without specifying whether it is substituted or unsubstituted, the group includes both a group having no substituent and a group having a substituent as long as this does not impair the spirit of the present invention. For example, the term "alkyl group" includes not only an alkyl group having no substituent (unsubstituted alkyl group), but also an alkyl group having a substituent (substituted alkyl group).

In addition, the term "organic group" in the present invention and the present specification refers to a group containing at least one carbon atom.

As the substituent, a monovalent substituent is preferable unless otherwise specified.

In the present invention and the present specification, "(meth)acrylate" denotes acrylate and methacrylate, "(meth)acryl" denotes acryl and methacryl, and "(meth)acryloyl" denotes acryloyl and methacryloyl.

The bonding direction of a divalent linking group denoted in the present invention and the present specification is not limited unless otherwise specified. For example, in a case where Y is —COO— in a compound represented by the formula "X—Y—Z", Y may be —CO—O— or —O—CO—. The compound may be "X—CO—O—Z" or "X—O—CO—Z".

In the present invention and the present specification, in a case where the polymer "has a branched structure" or is "branched", it means that the main chain of the polymer is branched. The polymer having a branched structure may typically have a three-dimensional crosslinking structure and/or have at least one polymerization initiator fragment incorporated at the terminal.

As will be described below, the polymer A may have a partial structure obtained by radically polymerizing a fluorine-containing compound having two or more polymerizable groups.

It is supposed that in a case where the polymer A is synthesized, the polymerization initiator fragment can be incorporated into the polymer A by adjusting the amount of the polymerization initiator, the type of the polymerization initiator, or the like, and the solubility can be improved by increasing the polymerization starting point, making the crosslinking size compact, and forming a large amount of polymer terminals.

The polymerization initiator fragment differs depending on the structure of the polymerization initiator used in the polymerization of the polymer A, and the incorporation of the polymer fragment into the polymer A can be confirmed by a method such as nuclear magnetic resonance (NMR) spectrum measurement, infrared (IR) spectrum measurement, mass spectrometry measurement, or elemental analysis measurement.

The polymer A is a polymer having a branched structure including at least one repeating unit represented by General Formula (1) and at least one selected from the group consisting of the repeating unit represented by General Formula (2) and the repeating unit represented by General Formula (3).

Repeating Unit Represented by General Formula (1)

The repeating unit represented by General Formula (1) is a repeating unit having a perfluoropolyether group.

$R^1$ and $R^2$ in General Formula (1) each independently represent a hydrogen atom or a methyl group.

$L^1$ and $L^2$ in General Formula (1) each independently represent a divalent linking group. The divalent linking group is not particularly limited, and examples thereof include —COO—, —CO—, —O—, an alkylene group (preferably having 1 to 10 carbon atoms), a cycloalkylene group (preferably having 3 to 20 carbon atoms), an arylene group (preferably having 6 to 20 carbon atoms), —SO—, —SO$_2$—, —NH—, —NR—, and a divalent linking group consisting of combination of two or more of them. R represents an alkyl group (preferably having 1 to 10 carbon atoms), a cycloalkyl group (preferably having 3 to 20 carbon atoms), or an aryl group (preferably having 6 to 20 carbon atoms).

$L^1$ and $L^2$ in General Formula (1) are preferably a divalent linking group consisting of combination of —COO—, an alkylene group, and NH—, and more preferably a divalent linking group represented by General Formula (L-1).

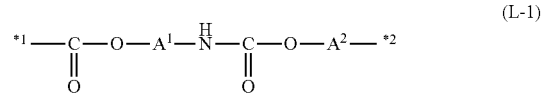

(L-1)

In General Formula (L-1), $A^1$ and $A^2$ each independently represent an alkylene group. *1 and *2 represent a bonding position.

The alkylene group of $A^1$ and $A^2$ in General Formula (L-1) is preferably an alkylene group having 1 to 10 carbon atoms, more preferably an alkylene group having 1 to 7 carbon atoms, and still more preferably an alkylene group having 1 to 4 carbon atoms.

Specific examples of the alkylene group represented by $A^1$ and $A^2$ include a methylene group, an ethylene group, a trimethylene group, a methylethylene group, a tetramethylene group, a 1-methyltrimethylene group, a pentamethylene group, a 2,2-dimethyltrimethylene group, a hexamethylene group, a nonamethylene group, a 2-methyloctamethylene group, a decamethylene group, and a dodecamethylene group.

$L^1$ and $L^2$ in General Formula (1) are preferably a divalent linking group consisting of combination of —O—, an alkylene group, and an arylene group, and also preferably a divalent linking group represented by General Formula (L-2).

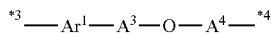
(L-2)

In General Formula (L-2), $Ar^1$ represents an arylene group, and $A^3$ and $A^4$ each independently represent an alkylene group. *3 and *4 represent a bonding position.

The arylene group represented by $Ar^1$ in General Formula (L-2) is preferably an arylene group having 6 to 20 carbon atoms, more preferably an arylene group having 6 to 15 carbon atoms, still more preferably an arylene group having 6 to 10 carbon atoms, and still more preferably a phenylene group.

The alkylene group represented by $A^3$ and $A^4$ in General Formula (L-2) is preferably an alkylene group having 1 to 10 carbon atoms, more preferably an alkylene group having 1 to 7 carbon atoms, and still more preferably an alkylene group having 1 to 4 carbon atoms.

Specific examples of the alkylene group represented by $A^3$ and $A^4$ include a methylene group, an ethylene group, a trimethylene group, a methylethylene group, a tetramethylene group, a 1-methyltrimethylene group, a pentamethylene group, a 2,2-dimethyltrimethylene group, a hexamethylene group, a nonamethylene group, a 2-methyloctamethylene group, a decamethylene group, and a dodecamethylene group.

$Rf^1$, $Rf^2$, $Rf^3$, and $Rf^4$ in General Formula (1) each independently represent a fluorine atom or a perfluoroalkyl group.

In a case where one or two or more of $Rf^1$, $Rf^2$, $Rf^3$, and $Rf^4$ each independently represent a perfluoroalkyl group, the perfluoroalkyl group is preferably a perfluoroalkyl group having 1 to 10 carbon atoms, more preferably a perfluoroalkyl group having 1 to 7 carbon atoms, and still more preferably a perfluoroalkyl group having 1 to 4 carbon atoms.

It is preferable that $Rf^1$, $Rf^2$, $Rf^3$, and $Rf^4$ represent a fluorine atom.

u in General Formula (1) represents an integer of 1 or more, preferably represents an integer in a range of 1 to 10, more preferably represents an integer in a range of 1 to 6, and still more preferably represents an integer in a range of 1 to 3.

p in General Formula (1) represents an integer of 2 or more, preferably represents an integer in a range of 2 to 100, more preferably represents an integer in a range of 6 to 80, and still more preferably represents an integer in a range of 10 to 60.

p pieces of $[CRf^1Rf^2]uO$'s may be the same as or different from each other.

t in General Formula (1) represents an integer of 0 or more, preferably represents an integer in a range of 1 to 10, more preferably represents an integer in a range of 1 to 6, and still more preferably represents an integer in a range of 1 to 3.

The repeating unit represented by General Formula (1) can be obtained by polymerizing a compound (K1) represented by General Formula (1m).

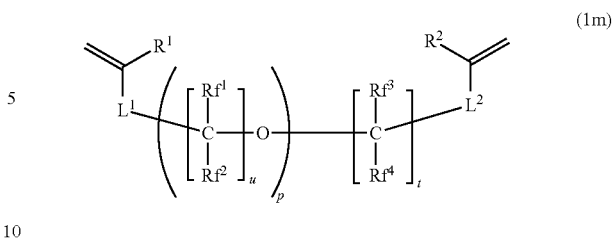
(1m)

In General Formula (1m), $R^1$, $R^2$, $L^1$, $L^2$, $Rf^1$, $Rf^2$, $Rf^3$, $Rf^4$, u, p, and t are synonymous with $R^1$, $R^2$, $L^1$, $L^2$, $Rf^1$, $Rf^2$, $Rf^3$, $Rf^4$, u, p, and t in General Formula (1), respectively, and the description, specific examples, and preferred ranges for each are also the same.

In one aspect, a content of the repeating unit represented by General Formula (1) in the polymer A is preferably 10 to 99 mass %, more preferably 20 to 95 mass %, still more preferably 30 to 90 mass %, and still more preferably 40 to 90 mass %, with respect to the total repeating unit in the polymer A.

Repeating Unit Represented by General Formula (2)

$R^3$ in General Formula (2) represents a hydrogen atom or a methyl group.

$L^3$ in General Formula (2) represents a single bond or a divalent linking group. The divalent linking group is not particularly limited, and examples thereof include —COO—, —CO—, —O—, an alkylene group (preferably having 1 to 20 carbon atoms), a cycloalkylene group (preferably having 3 to 20 carbon atoms), an arylene group (preferably having 6 to 20 carbon atoms), —SO—, —SO$_2$—, —NH—, —NR—, and a divalent linking group consisting of combination of two or more of them. R represents an alkyl group (preferably having 1 to 10 carbon atoms), a cycloalkyl group (preferably having 3 to 20 carbon atoms), or an aryl group (preferably having 6 to 20 carbon atoms).

In a case where $L^3$ represents a divalent linking group, it is preferably a divalent linking group consisting of at least one selected from the group consisting of —O—, —COO—, —CONH—, —OCO—, and an alkylene group. The alkylene group is preferably an alkylene group having 1 to 20 carbon atoms, more preferably an alkylene group having 1 to 12 carbon atoms, and still more preferably an alkylene group having 1 to 6 carbon atoms.

$L^3$ preferably represents a single bond or a divalent linking group represented by General Formula (L-3).

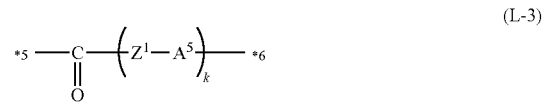
(L-3)

In General Formula (L-3), $Z^1$ represents —O— or NH—. $A^5$ represents an alkylene group. k represents an integer in a range of 1 to 30. *5 and *6 represent a bonding position.

The alkylene group represented by $A^5$ is preferably an alkylene group having 1 to 12 carbon atoms, more preferably an alkylene group having 1 to 6 carbon atoms, and still more preferably an alkylene group having 1 to 4 carbon atoms.

The alkylene group represented by $A^5$ may have a substituent.

Specific examples of the alkylene group represented by $A^5$ include a methylene group, an ethylene group, a trimethylene group, a 2-hydroxytrimethylene group, a methylethylene group, a tetramethylene group, a 1-methyltrimethylene group, a pentamethylene group, a 2,2-dimethyltrimethylene group, a hexamethylene group, a nonamethylene group, a 2-methyloctamethylene group, a decamethylene group, and a dodecamethylene group.

k is an integer in a range of 1 to 30, preferably an integer in a range of 1 or 15, more preferably an integer in a range of 1 to 10, and still more preferably an integer in a range of 1 to 5.

$X^1$ in General Formula (2) represents —OH, —COOH, —PO$_3$H, {—OP(=O)(OH)$_2$}, —OM$^1$, —CO$_2$M$^1$, —SO$_3$M$^1$, —NT$^1$T$^2$, an epoxy group, an alicyclic epoxy group, an oxazoline group, —NG$^1$G$^2$G$^3$E$^1$, or a group having a betaine structure.

$M^1$ represents alkali metal, alkaline earth metal, Mg, Al, or $Q^1Q^2Q^3Q^4N^+$.

$Q^1$, $Q^2$, $Q^3$, and $Q^4$ each independently represent a hydrogen atom or an alkyl group having 1 to 20 carbon atoms.

$T^1$ and $T^2$ each independently represent a hydrogen atom, an alkyl group having 1 to 20 carbon atoms, or an alkoxy group having 1 to 20 carbon atoms.

$T^1$ and $T^2$ may be bonded.

$E^1$ represents an anion.

$G^1$, $G^2$, and $G^3$ each independently represent a hydrogen atom or an alkyl group having 1 to 20 carbon atoms.

In a case where $X^1$ represents —OM$^1$, —O$^-$·(M$^1$)$^+$, which is in a state of a salt, is preferable.

(M$^1$)$^+$ represents an alkali metal ion, an alkaline earth metal ion, Mg$^{2+}$, Al$^{3+}$, or $Q^1Q^2Q^3Q^4N^+$. In a case where (M$^1$)$^+$ is Mg$^{2+}$, it is preferable that one Mg$^{2+}$ and O$^-$'s form a salt.

In a case where (M$^1$)$^+$ is Al$^{3+}$, it is preferable that one Al$^{3+}$ and three O$^-$'s form a salt.

In a case where $X^1$ represents —CO$_2$M$^1$, —CO$_2$$^-$·(M$^1$)$^+$, which is in a state of a salt, is preferable.

(M$^1$)$^+$ represents an alkali metal ion, an alkaline earth metal ion, Mg$^{2+}$, Al$^{3+}$, or $Q^1Q^2Q^3Q^4N^+$. In a case where (M$^1$)$^+$ is Mg$^{2+}$, it is preferable that one Mg$^{2+}$ and two CO$_2$$^-$'s form a salt.

In a case where (M$^1$)$^+$ is Al$^{3+}$, it is preferable that one Al$^{3+}$ and three CO$_2$$^-$'s form a salt.

In a case where $X^1$ represents —SO$_3$M$^1$, —SO$_3$$^-$·(M$^1$)$^+$, which is in a state of a salt, is preferable.

(M$^1$)$^+$ represents an alkali metal ion, an alkaline earth metal ion, Mg$^{2+}$, Al$^{3+}$, or $Q^1Q^2Q^3Q^4N^+$. In a case where (M$^1$)$^+$ is Mg$^{2+}$, it is preferable that one Mg$^{2+}$ and two SO$_3$$^-$'s form a salt.

In a case where (M$^1$)$^+$ is Al$^{3+}$, it is preferable that one Al$^{3+}$ and three SO$_3$$^-$'s form a salt.

Examples of the alkali metal represented by M$^1$ include lithium (Li), sodium (Na), potassium (K), and cesium (Cs).

Examples of the alkaline earth metal represented by M$^1$ include calcium (Ca), strontium (Sr), and barium (Ba).

$Q^1$, $Q^2$, $Q^3$, and $Q^4$ in $Q^1Q^2Q^3Q^4N^+$ (quaternary ammonium salt) represented by M$^1$ each independently represent a hydrogen atom or an alkyl group having 1 to 20 carbon atoms. In a case where one or more of $Q^1$, $Q^2$, $Q^3$, and $Q^4$ represent an alkyl group, the alkyl group may be linear or branched, and is preferably an alkyl group having 1 to 10 carbon atoms, more preferably an alkyl group having 1 to 7 carbon atoms, and still more preferably an alkyl group having 1 to 4 carbon atoms.

In a case where one or more of $Q^1$, $Q^2$, $Q^3$, and $Q^4$ represent an alkyl group, the alkyl group may have a substituent.

Examples of the alkyl groups each independently represented by one or two or more of $Q^1$, $Q^2$, $Q^3$, and $Q^4$ include a methyl group, an ethyl group, a 2-hydroxyethyl group, a n (normal)-propyl group, an isopropyl group, a 3-hydroxypropyl group, an n-butyl group, an isobutyl group, a sec (secondary)-butyl group, a tert (tertiary)-butyl group, a 4-hydroxybutyl group, and an n-hexyl group.

Specific examples of $Q^1Q^2Q^3Q^4N^+$ include (CH$_3$)$_4$N$^+$, (C$_2$H$_5$)$_4$N$^+$, (C$_3$H$_7$)$_4$N$^+$, (C$_4$H$_9$)$_4$N$^+$, (C$_5$H$_{11}$)$_4$N$^+$, (C$_6$H$_{13}$)$_4$N$^+$, (C$_7$H$_{15}$)$_4$N$^+$, (C$_8$H$_{17}$)$_4$N$^+$, (C$_9$H$_{19}$)$_4$N$^+$, and (C$_{10}$H$_{21}$)$_4$N$^+$, where $Q^1$ to $Q^4$ are all the same.

In a case where $Q^1$ to $Q^3$ are all methyl groups, $Q^4$ may be, for example, (C$_2$H$_5$), (C$_6$H$_{13}$), (C$_8$H$_{17}$), (C$_9$H$_{19}$), (C$_{10}$H$_{21}$), (C$_{12}$H$_{25}$), (C$_{14}$H$_{29}$), (C$_{16}$H$_{33}$), and (C$_{18}$H$_{37}$).

In a case where $Q^1$ and $Q^2$ are methyl groups, $Q^3$ and $Q^4$ may be, for example, (C$_8$H$_{17}$), (C$_{10}$H$_{21}$), (C$_{12}$H$_{25}$), (C$_{14}$H$_{29}$), (C$_{16}$H$_{33}$), and (C$_{18}$H$_{37}$).

In a case where $Q^1$ is a methyl group, $Q^2$ to $Q^4$ may be all, for example, (C$_4$H$_9$) and (C$_8$H$_{17}$).

In a case where $X^1$ represents —NT$^1$T$^2$, $T^1$ and $T^2$ each independently represent a hydrogen atom, an alkyl group having 1 to 20 carbon atoms, or an alkoxy group having 1 to 20 carbon atoms. $T^1$ and $T^2$ may be bonded.

In a case where one or both of $T^1$ and $T^2$ represent an alkyl group, the alkyl group may be linear or branched, and is preferably an alkyl group having 1 to 10 carbon atoms, more preferably an alkyl group having 1 to 7 carbon atoms, and still more preferably an alkyl group having 1 to 4 carbon atoms.

In a case where one or both of $T^1$ and $T^2$ represent an alkyl group, the alkyl group may have a substituent.

Examples of the alkyl groups each independently represented by one or both of $T^1$ and $T^2$ include a methyl group, an ethyl group, a 2-hydroxyethyl group, an n-propyl group, an isopropyl group, a 3-hydroxypropyl group, an n-butyl group, an isobutyl group, a sec-butyl group, a tert-butyl group, a 4-hydroxybutyl group, and an n-hexyl group.

In a case where one or both of $T^1$ and $T^2$ represent an alkoxy group, the alkoxy group may be linear or branched, and is preferably an alkoxy group having 1 to 10 carbon atoms, more preferably an alkoxy group having 1 to 7 carbon atoms, and still more preferably an alkoxy group having 1 to 4 carbon atoms.

In a case where one or both of $T^1$ and $T^2$ represent an alkoxy group, the alkoxy group may have a substituent.

Examples of the alkoxy groups each independently represented by one or both of $T^1$ and $T^2$ include a methoxy group, an ethoxy group, a 2-hydroxyethoxy group, an n-propyloxy group, an isopropyloxy group, a 3-hydroxypropyloxy group, an n-butyloxy group, an isobutyloxy group, a sec-butyloxy group, a tert-butyloxy group, a 4-hydroxybutyloxy group, and an n-hexyloxy group.

In a case where $T^1$ and $T^2$ are bonded, —NT$^1$T$^2$ is a cyclic group. Examples of such a group include a morpholino group.

Most preferably, $T^1$ and $T^2$ represent a hydrogen atom.

The alicyclic epoxy group refers to a cyclic group having a structure in which an epoxy ring and a saturated hydrocarbon group are condensed, and examples thereof include the following 3,4-epoxycyclohexyl group. In the following, * represents a bonding position.

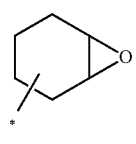

In a case where $X^1$ represents $-NG^1G^2G^3E^1$, $-N^+G^1G^2G^3E^1$, which is in a state of a salt, is preferable.

The anion represented by $E^1$ is not particularly limited, examples thereof include a halide ion such as fluoride ion ($F^-$), chloride ion ($Cl^-$), bromide ion ($Br^-$), and iodide ion ($I^-$); a hydroxide ion ($OH^-$); a cyanide ion ($CN^-$); a nitrate ion ($NO_3^-$); a carbonate ion ($CO_3^{2-}$); a sulfate ion ($SO_4^{2-}$); a sulfonate anion such as methansulfonate anion ($CH_3SO_3^-$), benzenesulfonate anion, p-toluenesulfonate anion, and trifluoromethanesulfonate anion; a perchlorate anion; a borate anion such as tetrafluoroborate anion and tetraphenylborate anion; a hexafluorophosphate anion; and an acetate anion. In a case where $E^1$ is a divalent anion, it is preferable that one $E^1$ and two $NG^1G^2G^3$'s form a salt.

$G^1$, $G^2$, and $G^3$ each independently represent a hydrogen atom or an alkyl group having 1 to 20 carbon atoms.

In a case where one or more of $G^1$, $G^2$, and $G^3$ represent an alkyl group, the alkyl group may be linear or branched, and is preferably an alkyl group having 1 to 10 carbon atoms, more preferably an alkyl group having 1 to 7 carbon atoms, and still more preferably an alkyl group having 1 to 4 carbon atoms.

In a case where one or more of $G^1$, $G^2$, and $G^3$ represent an alkyl group, the alkyl group may have a substituent.

Examples of the alkyl groups each independently represented by one or two or more of $G^1$, $G^2$, and $G^3$ include a methyl group, an ethyl group, a 2-hydroxyethyl group, an n-propyl group, an isopropyl group, a 3-hydroxypropyl group, an n-butyl group, an isobutyl group, a sec-butyl group, a tert-butyl group, a 4-hydroxybutyl group, and an n-hexyl group.

In a case where $X^1$ in General Formula (2) represents a group having a betaine structure, the group is not particularly limited as long as it is a group having a betaine structure. As the group having a betaine structure, a group represented by General Formula (BT1), (BT2), (BT3), or (BT4) is preferable.

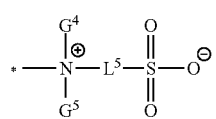

(BT1)

In General Formula (BT1),
$G^4$ and $G^5$ each independently represent a hydrogen atom or an alkyl group having 1 to 20 carbon atoms.
$L^5$ represents a divalent linking group.
\* represents a bonding position.

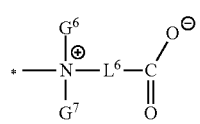

(BT2)

In General Formula (BT2),
$G^6$ and $G^7$ each independently represent a hydrogen atom or an alkyl group having 1 to 20 carbon atoms.
$L^6$ represents a divalent linking group.
\* represents a bonding position.

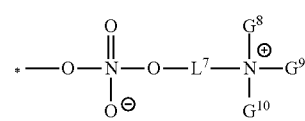

(BT3)

In General Formula (BT3),
$G^8$, $G^9$, and $G^{19}$ each independently represent a hydrogen atom or an alkyl group having 1 to 20 carbon atoms.
$L^7$ represents a divalent linking group.
\* represents a bonding position.

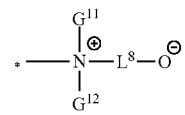

(BT4)

In General Formula (BT4),
$G^{11}$ and $G^{12}$ each independently represent a hydrogen atom or an alkyl group having 1 to 20 carbon atoms.
$L^8$ represents a divalent linking group.
\* represents a bonding position.

$G^4$ and $G^5$ in General Formula (BT1) each independently represent a hydrogen atom or an alkyl group having 1 to 20 carbon atoms. The description, specific examples, and preferred ranges for the alkyl group having 1 to 20 carbon atoms are the same as those described for the alkyl group having 1 to 20 carbon atoms represented by $G^1$, $G^2$, and $G^3$.

$L^5$ represents a divalent linking group, and preferably represents an alkylene group. The alkylene group is preferably an alkylene group having 1 to 12 carbon atoms, more preferably an alkylene group having 1 to 6 carbon atoms, and still more preferably an alkylene group having 1 to 4 carbon atoms.

The alkylene group represented by $L^5$ may have a substituent.

Specific examples of the alkylene group represented by $L^5$ include a methylene group, an ethylene group, a trimethylene group, a 2-hydroxytrimethylene group, a methylethylene group, a tetramethylene group, a 1-methyltrimethylene group, a pentamethylene group, a 2,2-dimethyltrimethylene group, a hexamethylene group, a nonamethylene group, a 2-methyloctamethylene group, a decamethylene group, and a dodecamethylene group.

$G^6$ and $G^7$ in General Formula (BT2) each independently represent a hydrogen atom or an alkyl group having 1 to 20 carbon atoms. The description, specific examples, and preferred ranges for the alkyl group having 1 to 20 carbon atoms are the same as those described for the alkyl group having 1 to 20 carbon atoms represented by $G^1$, $G^2$, and $G^3$.

$L^6$ represents a divalent linking group. The description, specific examples, and preferred ranges for $L^6$ are the same as those described for $L^5$ described above.

$G^8$, $G^9$, and $G^{10}$ in General Formula (BT3) each independently represent a hydrogen atom or an alkyl group having 1 to 20 carbon atoms. The description, specific examples, and preferred ranges for the alkyl group having 1 to 20 carbon atoms are the same as those described for the alkyl group having 1 to 20 carbon atoms represented by $G^1$, $G^2$, and $G^3$.

$L^7$ represents a divalent linking group. The description, specific examples, and preferred ranges for $L^7$ are the same as those described for $L^5$.

$G^{11}$ and $G^{12}$ in General Formula (BT4) each independently represent a hydrogen atom or an alkyl group having 1 to 20 carbon atoms. The description, specific examples, and preferred ranges for the alkyl group having 1 to 20 carbon atoms are the same as those described for the alkyl group having 1 to 20 carbon atoms represented by $G^1$, $G^2$, and $G^3$.

$L^8$ represents a divalent linking group. The description, specific examples, and preferred ranges for $L^8$ are the same as those described for $L^5$.

The polymer A includes the repeating unit represented by General Formula (2), in which it is preferable that $X^1$ in General Formula (2) represents —COOH, —PO$_3$H, {—OP(=O)(OH)$_2$}, —CO$_2$M$^1$, —SO$_3$M$^1$, —NT$^1$T$^2$, an oxazoline group, —NG$^1$G$^2$G$^3$E$^1$, or a group having a betaine structure; it is more preferable that $X^1$ represents —NG$^1$G$^2$G$^3$E$^1$, or a group having a betaine structure; it is still more preferable that $X^1$ represents a group represented by General Formula (BT1), (BT2), (BT3), or (BT4); and it is still more preferable that $X^1$ represents a group represented by General Formula (BT1), (BT2), or (BT3).

The repeating unit represented by General Formula (2) can be obtained by polymerizing a compound (K2) represented by General Formula (2m).

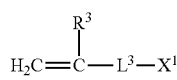

(2m)

In General Formula (2m), $R^3$, $L^3$, and $X^1$ are synonymous with $R^3$, $L^3$, and $X^1$ in General Formula (2), respectively, and the description, specific examples, and preferred ranges for each are also the same.

The compound represented by General Formula (2m) is preferably a compound represented by any one of General Formula (2m-1), General Formula (2m-2), General Formula (2m-3), and General Formula (2m-4).

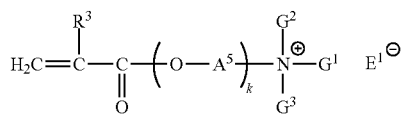

(2m-1)

In General Formula (2m-1), $R^3$ is synonymous with $R^3$ in General Formula (2), and the description, specific examples, and preferred ranges for $R^3$ are also the same.

In General Formula (2m-1), $A^5$ and k are synonymous with $A^5$ and k in General Formula (L-3), respectively, and the description, specific examples, and preferred ranges for each are also the same.

In General Formula (2m-1), $G^1$, $G^2$, $G^3$, and $E^1$ are synonymous with $G^1$, $G^2$, $G^3$, and $E^1$, where $X^1$ in General Formula (2) represents —NG$^1$G$^2$G$^3$E$^1$, respectively, and the description, specific examples, and preferred ranges for each are also the same.

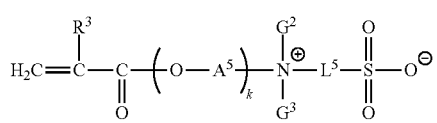

(2m-2)

In General Formula (2m-2), $R^3$ is synonymous with $R^3$ in General Formula (2), and the description, specific examples, and preferred ranges for $R^3$ are also the same.

In General Formula (2m-2), $A^5$ and k are synonymous with $A^5$ and k in General Formula (L-3), respectively, and the description, specific examples, and preferred ranges for each are also the same.

In General Formula (2m-2), $G^4$, $G^5$, and $L^5$ are synonymous with $G^4$, $G^5$, and $L^5$ in General Formula (BT1), respectively, and the description, specific examples, and preferred ranges for each are also the same.

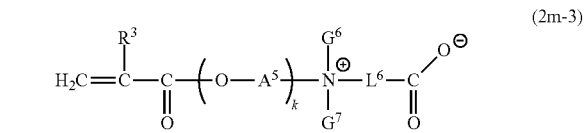

(2m-3)

In General Formula (2m-3), $R^3$ is synonymous with $R^3$ in General Formula (2), and the description, specific examples, and preferred ranges for $R^3$ are also the same.

In General Formula (2m-3), $A^5$ and k are synonymous with $A^5$ and k in General Formula (L-3), respectively, and the description, specific examples, and preferred ranges for each are also the same.

In General Formula (2m-3), $G^6$, $G^7$, and $L^6$ are synonymous with $G^6$, $G^7$, and $L^6$ in General Formula (BT2), respectively, and the description, specific examples, and preferred ranges for each are also the same.

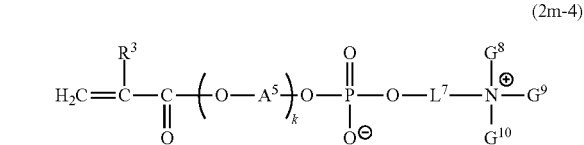

(2m-4)

In General Formula (2m-4), $R^3$ is synonymous with $R^3$ in General Formula (2), and the description, specific examples, and preferred ranges for $R^3$ are also the same.

In General Formula (2m-4), $A^5$ and k are synonymous with $A^5$ and k in General Formula (L-3), respectively, and the description, specific examples, and preferred ranges for each are also the same.

In General Formula (2m-4), $G^8$, $G^9$, $G^{19}$, and $L^7$ are synonymous with $G^8$, $G^9$, $G^{10}$, and $L^7$ in General Formula (BT3), respectively, and the description, specific examples, and preferred ranges for each are also the same.

Specific examples of the compound represented by General Formula (2m) include aminoalkyl (meth)acrylates such as acrylic acid, methacrylic acid, itaconic acid, maleic acid, crotonic acid, s-carboxyethyl acrylate, 2-hydroxyethyl acrylate, 2-hydroxyethyl methacrylate, 3-hydroxypropyl acrylate, 2-hydroxypropyl acrylate, 3-hydroxypropyl methacrylate, 2-hydroxypropyl methacrylate, 4-hydroxybutyl acrylate, 2-hydroxybutyl acrylate, 4-hydroxybutyl methacrylate, 2-hydroxybutyl methacrylate, polypropylene glycol acrylate, polypropylene glycol methacrylate, isopropenyl oxazoline, styreneboronic acid, 2-(N,N-dimethylamino) ethyl (meth)acrylate, and 2-(N-tert-butylamino)ethyl (meth) acrylate; acrylamides such as (meth)acrylamide, N-methyl (meth)acrylamide, N-ethyl (meth)acrylamide, N-n-propyl (meth)acrylamide, N-isopropyl (meth)acrylamide, N-n-butyl (meth)acrylamide, N-methylol (meth)acrylamide, N-(2-hydroxyethyl)acrylamide, N-methoxymethyl (meth) acrylamide, N-butoxymethyl (meth)acrylamide, N-(2-dimethylaminoethyl) (meth)acrylamide, N-(3-dimethylaminopropyl) (meth)acrylamide, diacetone (meth)acrylamide, N,N-dimethyl (meth)acrylamide, and N-(meth)acryloyl morpholine; (meth)acryloyl group-containing quaternary ammonium salts such as N-(2-(meth)acryloyloxyethyl)-N,N,N-trimethylammonium chloride, N-(2-(meth)acryloyloxyethyl)-N,N,N-trimethylammonium bromide, N-(2-(meth)acryloyloxyethyl)-N,N,N-trimethylammonium iodide, N-(2-(meth)acryloyloxyethyl)-N,N,N-trimethylammonium methanesulfonate, N-(2-(meth)acryloyloxyethyl)-N,N-diethyl-N-methylammonium methanesulfonate, N-(2-(meth)acryloyloxyethyl)-N-butyl-N,N-dimethylammonium iodide, and N-(2-(meth)acryloyloxypropyl)-N,N-diethyl-N-methylammonium chloride; carboxybetaines such as 2-((2-(meth)acryloyloxyethyl)dimethylammonio)acetate (also called N-(2-(meth)acryloyloxyethyl)-N,N-dimethylglycine), 3-((2-(meth) acryloyloxyethyl)dimethylammonio) propanoate, 4-((2-(meth)acryloyloxyethyl)dimethylammonio)butanoate, and 5-((2(meth)acryloyloxyethyl) dimethylammonio)pentanoate; sulfobetaines such as ((2-(meth)acryloyloxyethyl)dimethylammonio) methanesulfonate, 2-((2-(meth)acryloyloxyethyl) dimethylammonio)ethanesulfonate, 3-((2-(meth) acryloyloxyethyl)dimethylammonio)propane-1-sulfonate, and 4-((2-(meth)acryloyloxyethyl) dimethylammonio)butane-1-sulfonate; (meth)acryloyl group-containing phosphates such as 2-(meth)acryloyloxyethyl dihydrogen phosphate and 4-(meth)acryloyloxybutyl dihydrogen phosphate; and phosphorylcholines such as (2-(meth)acryloyloxyethyl) phosphorylcholine and (4-(meth)acryloyloxybutyl)phosphorylcholine. Note that the values are not limited thereto.

Repeating Unit Represented by General Formula (3)

$R^4$ in General Formula (3) represents a hydrogen atom, a fluorine atom, a chlorine atom, or an alkyl group having 1 to 20 carbon atoms.

The alkyl group represented by $R^4$ may be linear or branched, and is preferably an alkyl group having 1 to 10 carbon atoms, more preferably an alkyl group having 1 to 7 carbon atoms, still more preferably an alkyl group having 1 to 4 carbon atoms, and still more preferably a methyl group.

$R^4$ preferably represents a hydrogen atom or a methyl group.

$U^1$ and $U^2$ in General Formula (3) each independently represent —O—, —S—, —COO—, —OCO—, —CONH—, —NHCOO—, or NH—, and preferably represent —O— or NH—, and more preferably represent —O—.

$R^5$ and $R^6$ in General Formula (3) each independently represent a hydrogen atom, an aliphatic hydrocarbon group, an aryl group, or a heteroaryl group. $R^5$ and $R^6$ may be bonded.

In a case where one or both of $R^5$ and $R^6$ represent an aliphatic hydrocarbon group, the aliphatic hydrocarbon group may have a substituent.

In a case where one or both of $R^5$ and $R^6$ represent an aliphatic hydrocarbon group, examples of the aliphatic hydrocarbon group include an alkyl group, a cycloalkyl group, an alkenyl group, a cycloalkenyl group, or an alkynyl group, which may have a substituent.

The alkyl group is preferably an alkyl group having 1 to 20 carbon atoms, more preferably an alkyl group having 1 to 10 carbon atoms, still more preferably an alkyl group having 1 to 7 carbon atoms, and still more preferably an alkyl group having 1 to 4 carbon atoms.

Specific examples of the alkyl group include a linear or branched alkyl group such as a methyl group, an ethyl group, a propyl group, a butyl group, a pentyl group, a hexyl group, a heptyl group, an octyl group, a nonyl group, a decyl group, an undecyl group, a dodecyl group, a tridecyl group, a hexadecyl group, an octadecyl group, an eicosyl group, an isopropyl group, an isobutyl group, a sec-butyl group, a tert-butyl group, an isopentyl group, a neopentyl group, a 1-methylbutyl group, an isohexyl group, and a 2-methylhexyl group.

As the cycloalkyl group, a cycloalkyl group having 3 to 20 carbon atoms is preferable, and a cycloalkyl group having 5 to 15 carbon atoms is more preferable.

Specific examples of the cycloalkyl group include a cyclopentyl group, a cyclohexyl group, a 1-adamantyl group, and a 2-norbornyl group.

As the alkenyl group, an alkenyl group having 2 to 20 carbon atoms is preferable, an alkenyl group having 2 to 10 carbon atoms is more preferable, an alkenyl group having 2 to 7 carbon atoms is still more preferable, and an alkenyl group having 2 to 4 carbon atoms is still more preferable.

Specific examples of the alkenyl group include a linear or branched alkenyl group such as a vinyl group, a 1-propenyl group, a 1-butenyl group, and a 1-methyl-1-propenyl group.

As the cycloalkenyl group, a cycloalkenyl group having 3 to 20 carbon atoms is preferable, and a cycloalkenyl group having 5 to 15 carbon atoms is more preferable.

Specific examples of the cycloalkenyl group include a 1-cyclopentenyl group and a 1-cyclohexenyl group.

As the alkynyl group, an alkynyl group having 2 to 20 carbon atoms is preferable, an alkynyl group having 2 to 10 carbon atoms is more preferable, an alkynyl group having 2 to 7 carbon atoms is still more preferable, and an alkynyl group having 2 to 4 carbon atoms is still more preferable.

Specific examples of the alkynyl group include an ethynyl group, a 1-propynyl group, a 1-butynyl group, and a 1-octynyl group.

In a case where one or both of $R^5$ and $R^6$ represent an aryl group, the aryl group may have a substituent.

In the case where one or both of $R^5$ to $R^6$ represent an aryl group, the aryl group is preferably an aryl group having 6 to 20 carbon atoms, more preferably an aryl group having 6 to 15 carbon atoms, and still more preferably an aryl group having 6 to 12 carbon atoms.

In addition, in a case where one or both of $R^5$ and $R^6$ represent an aryl group, the aryl group may be, for example, a fused ring formed of one to four benzene rings and a fused ring formed of a benzene ring and an unsaturated five-membered ring.

In a case where one or both of $R^5$ and $R^6$ represent an aryl group, specific examples of the aryl group include a phenyl group, a naphthyl group, an anthryl group, a phenanthryl group, an indenyl group, an acenabutenyl group, a fluorenyl group, and a pyrenyl group.

In a case where one or both of $R^5$ and $R^6$ represent a heteroaryl group, the heteroaryl group may have a substituent.

Examples of the heteroaryl group include a heteroaryl group obtained by removing one hydrogen atom on a heteroaromatic ring containing one or more heteroatoms selected from the group consisting of a nitrogen atom, an oxygen atom, and a sulfur atom.

Specific examples of the heteroaromatic ring containing one or more heteroatoms selected from the group consisting of a nitrogen atom, an oxygen atom, and a sulfur atom include pyrrole, furan, thiophene, pyrazole, imidazole, triazole, oxazole, isoxazole, oxadiazole, thiazole, thiadiazole, indole, carbazole, benzofuran, dibenzofuran, thianaphthene, dibenzothiophene, indazole benzimidazole, anthranil, benzisoxazole, benzoxazole, benzothiazole, purine, pyridine, pyridazine, pyrimidine, pyrazine, triazine, quinoline, acridine, isoquinoline, phthalazine, quinazoline, quinoxaline, naphthyridine, phenanthroline, and pteridine.

Examples of the substituent that the $R^5$ and $R^6$ may have include a monovalent non-metal atomic group from which a hydrogen atom has been excluded, and the substituent can be selected from the following substituent group Y, for example.

Substituent group Y:
a halogen atom (—F, —Br, —Cl, —I), a hydroxyl group, an alkoxy group, an aryloxy group, a mercapto group, an alkylthio group, an arylthio group, an alkyldithio group, an aryldithio group, an amino group, an N-alkylamino group, an N,N-dialkylamino group, an N-arylamino group, an N,N-diarylamino group, an N-alkyl-N-arylamino group, an acyloxy group, a carbamoyloxy group, an N-alkylcarbamoyloxy group, an N-arylcarbamoyloxy group, an N,N-dialkylcarbamoyloxy group, an N,N-diarylcarbamoyloxy group, an N-alkyl-N-arylcarbamoyloxy group, an alkylsulfoxy group, an arylsulfoxy group, an acylthio group, an acylamino group, an N-alkylacylamino group, an N-arylacylamino group, a ureido group, an N'-alkylureido group, an N',N'-dialkylureido group, an N'-arylureido group, an N',N'-diarylureido group, an N'-alkyl-N'-arylureido group, an N-alkylureido group, an N-arylureido group, an N'-alkyl-N-alkylureido group, an N'-alkyl-N-arylureido group, an N',N'-dialkyl-N-alkylureido group, an N',N'-dialkyl-N-arylureido group, an N'-aryl-N-alkylureido group, an N'-aryl-N-arylureido group, an N',N'-diaryl-N-alkylureido group, an N',N'-diaryl-N-arylureido group, an N'-alkyl-N'-aryl-N-alkylureido group, an N'-alkyl-N'-aryl-N-arylureido group, an alkoxycarbonylamino group, an aryloxycarbonylamino group, an N-alkyl-N-alkoxycarbonylamino group, an N-alkyl-N-aryloxycarbonylamino group, an N-aryl-N-alkoxycarbonylamino group, an N-aryl-N-aryloxycarbonylamino group, a formyl group, an acyl group, a carboxyl group and a conjugated base group thereof, an alkoxycarbonyl group, an aryloxycarbonyl group, a carbamoyl group, an N-alkylcarbamoyl group, an N,N-dialkylcarbamoyl group, an N-arylcarbamoyl group, an N,N-diarylcarbamoyl group, an N-alkyl-N-arylcarbamoyl group, an alkylsufinyl group, an arylsulfinyl group, an alkylsulfonyl group, an arylsulfonyl group, a sulfo group (—SO$_3$H) and a conjugated base group thereof, an alkoxysulfonyl group, an aryloxysulfonyl group, a sulfinamoyl group, an N-alkylsulfinamoyl group, an N,N-dialkylsulfinamoyl group, an N-arylsulfinamoyl group, an N,N-diarylsulfinamoyl group, an N-alkyl-N-arylsulfinamoyl group, a sulfamoyl group, an N-alkylsulfamoyl group, an N,N-dialkylsulfamoyl group, an N-arylsulfamoyl group, an N,N-diarylsulfamoyl group, an N-alkyl-N-arylsulfamoyl group, an N-acylsulfamoyl group and a conjugated base group thereof, an N-alkylsulfonylsulfamoyl group (—SO$_2$NHSO$_2$(alkyl)) and a conjugated base group thereof, an N-arylsulfonylsulfamoyl group (—SO$_2$NHSO$_2$(aryl)) and a conjugated base group thereof, an N-alkylsulfonylcarbamoyl group (—CONHSO$_2$(alkyl)) and a conjugated base group thereof, an N-arylsulfonylcarbamoyl group (—CONHSO$_2$(aryl)) and a conjugated base group thereof, an alkoxysilyl group (—Si(Oalkyl)$_3$), an aryloxysilyl group (—Si(Oaryl)$_3$), a hydroxysilyl group (—Si(OH)$_3$) and a conjugated base group thereof, a phosphono group (—PO$_3$H$_2$) and a conjugated base group thereof, a dialkylphosphono group (—PO$_3$(alkyl)$_2$), a diarylphosphono group (—PO$_3$(aryl)$_2$), an alkylarylphosphono group (—PO$_3$(alkyl)(aryl)), a monoalkylphosphono group (—PO$_3$H(alkyl)) and a conjugated base group thereof, a monoarylphosphono group (—PO$_3$H(aryl)) and a conjugated base group thereof, a phosphonooxy group (—OPO$_3$H$_2$) and a conjugated base group thereof, a dialkylphosphonooxy group (—OPO$_3$(alkyl)$_2$), a diarylphosphonooxy group (—OPO$_3$(aryl)$_2$), an alkylarylphosphonooxy group (—OPO$_3$(alkyl)(aryl)), a monoalkylphosphonooxy group (—OPO$_3$H(alkyl)) and a conjugated base group thereof, a monoarylphosphonooxy group (—OPO$_3$H(aryl)) and a conjugated base group thereof, a cyano group, a nitro group, an aryl group, an alkenyl group, and an alkynyl group. These substituents may form a ring by being bonded to each other, if possible, or by being bonded to a hydrocarbon group substituted with the substituent.

$R^5$ and $R^6$ each independently preferably represent a hydrogen atom, an alkyl group, or an aryl group, and more preferably represent a hydrogen atom or an alkyl group.

Still more preferably, both $R^5$ and $R^6$ represent a hydrogen atom or both represent an alkyl group, and $R^5$ and $R^6$ are bonded (that is, $R^5$ and $R^6$ represent an alkylene linking group).

$L^4$ in General Formula (3) represents a single bond or a divalent linking group.

The divalent linking group represented by $L^4$ preferably represents —O—, —S—, —OCO—, —CONR$^{13}$—, —NR$^{13}$COO—, —CR$^{13}$N—, a substituted or unsubstituted divalent aliphatic group, a substituted or unsubstituted divalent aromatic group, and a divalent linking group selected from the group consisting of combination thereof. $R^{13}$ represents a hydrogen atom or an alkyl group having 1 to 20 carbon atoms.

In a case where $L^4$ contains a substituted or unsubstituted divalent aliphatic group, the aliphatic group preferably has 1 to 20 carbon atoms, more preferably 1 to 15 carbon atoms, and still more preferably 1 to 10 carbon atoms.

In a case where $L^4$ contains a substituted or unsubstituted divalent aromatic group, the number of aromatic rings included in the aromatic group is preferably 1 to 3, more preferably 1 and 2, and still more preferably 1.

$L^4$ is preferably —O—, —COO—, —OCO—, —CONR$^{13}$—, —NR$^{13}$COO—, a substituted or unsubstituted divalent aliphatic group, a substituted or unsubstituted divalent aromatic group, and a divalent linking group selected from the group consisting of combination thereof, more preferably of —O—, —COO—, —OCO—, a substituted or unsubstituted divalent aliphatic group, a substituted or unsubstituted divalent aromatic group, and a divalent linking group selected from the group consisting of combination thereof, and still more preferably —O—, —COO—, —OCO—, a substituted or unsubstituted alkylene group, a substituted or unsubstituted arylene group, and a divalent linking group selected from the group consisting of combination thereof.

The repeating unit represented by General Formula (3) can be obtained by polymerizing a compound (K3) (hydrophilic monomer) represented by General Formula (3m).

(3m)

In General Formula (3m), $R^4$, $U^1$, $U^2$, $R^5$, $R^6$, and $L^4$ are synonymous with $R^4$, $U^1$, $U^2$, $R^5$, $R^6$, and $L^4$ in General Formula (3), respectively, and the description, specific examples, and preferred ranges for each are also the same.

Specific examples of the compound represented by General Formula (3m) include monomers represented by Formulae 3-1 to 3-26. Note that the values are not limited thereto.

3-1
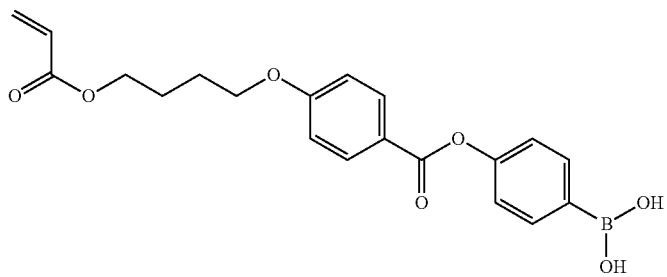

3-2
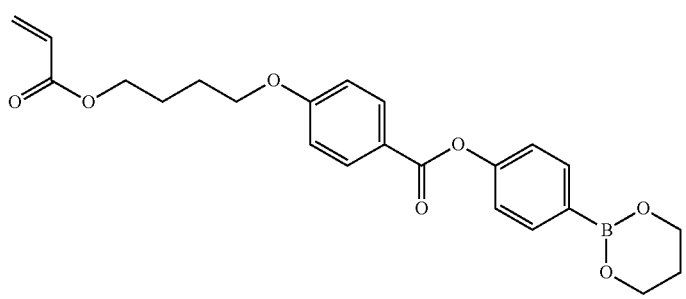

3-3
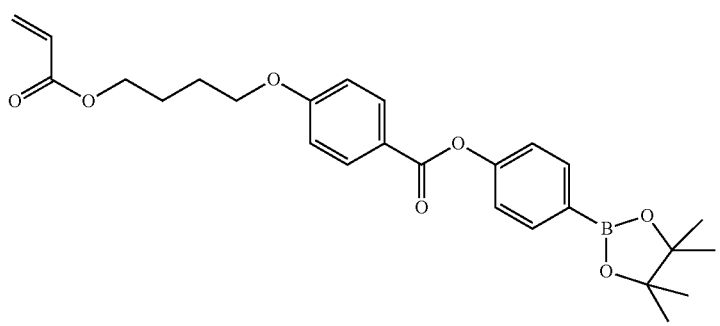

3-4
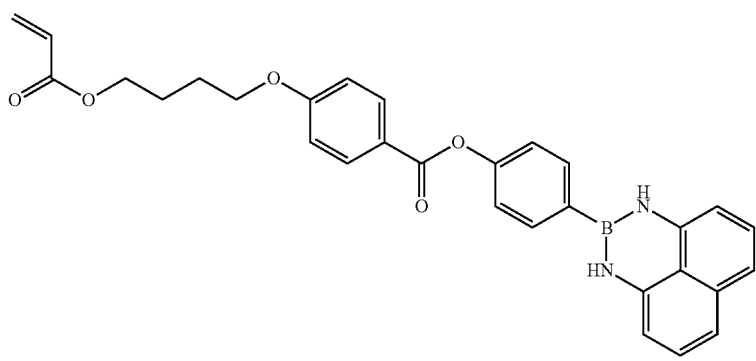

3-5
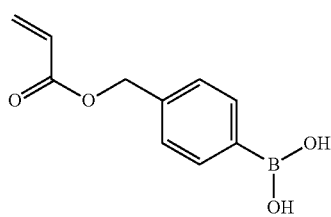

3-6
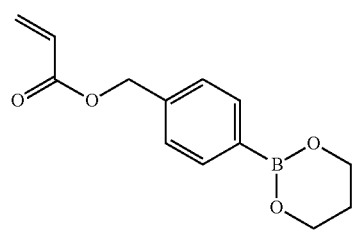

-continued
| | |
|---|---|
| 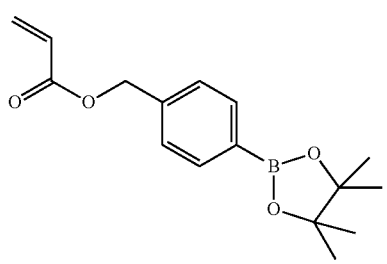 | 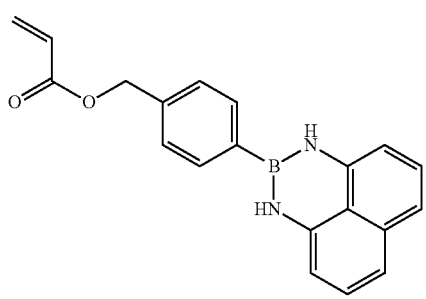 |
| 3-7 | 3-8 |
| 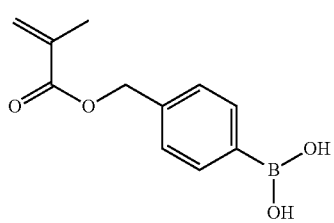 | 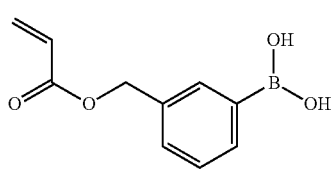 |
| 3-9 | 3-10 |
| 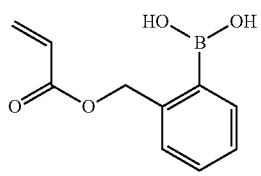 | 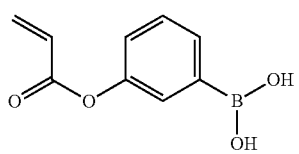 |
| 3-11 | 3-12 |
| 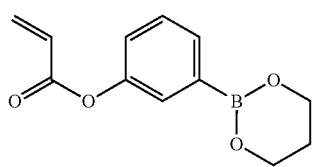 | 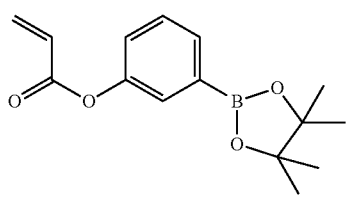 |
| 3-13 | 3-14 |
| 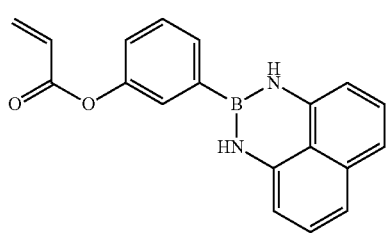 | 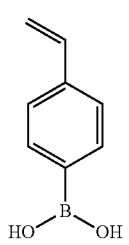 |
| 3-15 | 3-16 |
| 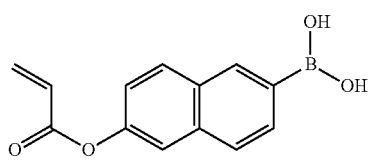 | 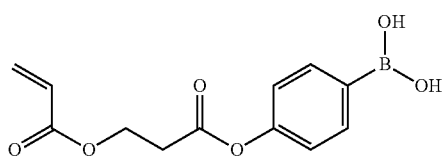 |
| 3-17 | 3-18 |
| 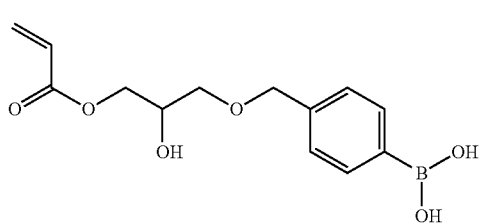 | 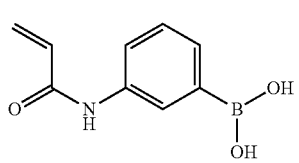 |
| 3-19 | 3-20 |

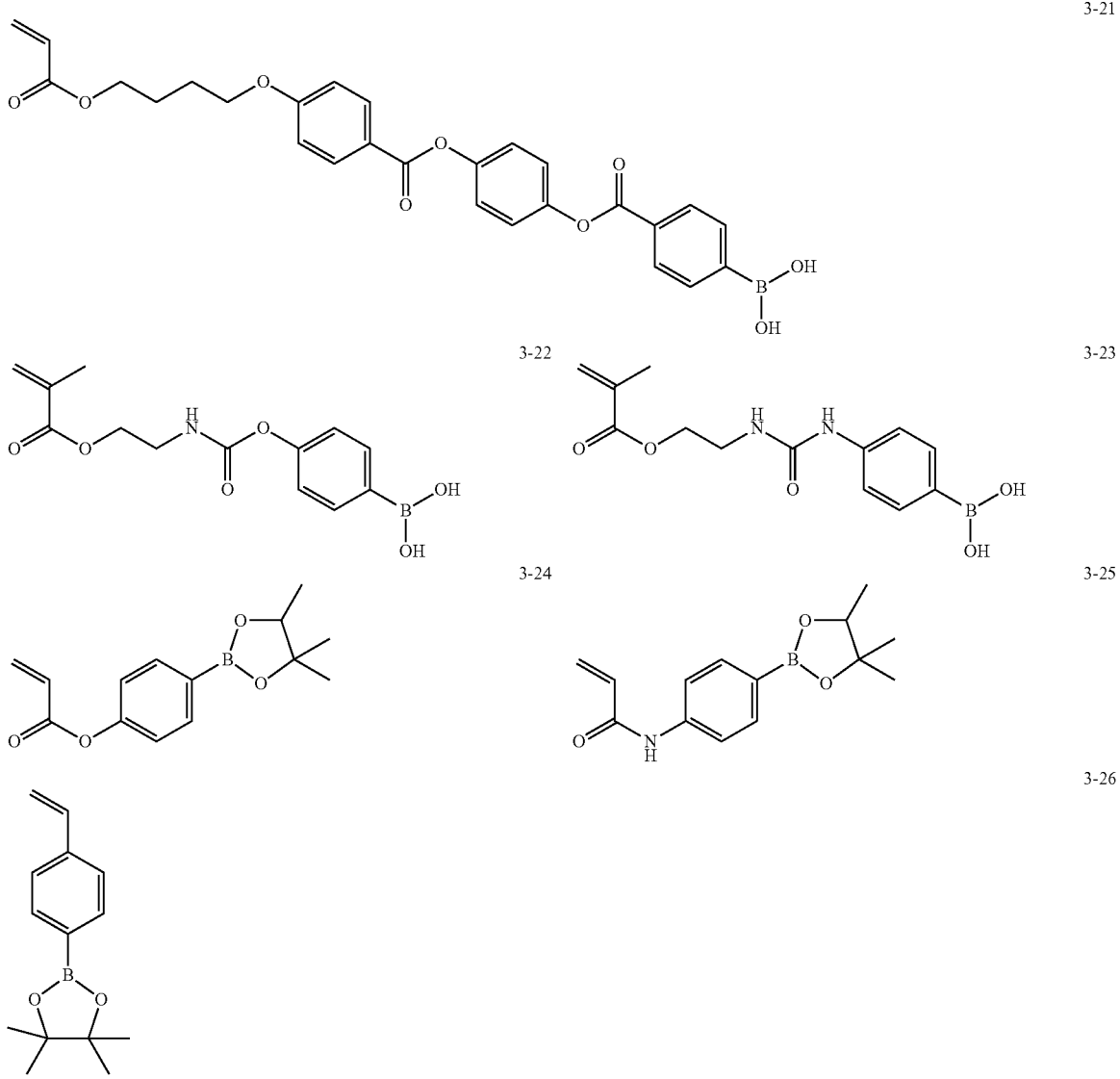

The total of a content of the repeating unit represented by General Formula (2) and a content of the repeating unit represented by General Formula (3) in the polymer A is, in one aspect, preferably 1 to 90 mass %, more preferably 5 to 80 mass %, still more preferably 10 to 70 mass %, still more preferably 10 to 60 mass %, and still more preferably 10 to 50 mass %, with respect to the total repeating unit in the polymer A.

Other Repeating Units

The polymer A may contain only the above repeating unit, or may have repeating units other than those represented by General Formulae (1) to (3), as a repeating unit.

A content of the repeating units other than those represented by General Formulae (1) to (3) in the polymer A is preferably 0 to 20 mass %, more preferably 0 to 10 mass %, still more preferably 0 to 5 mass %, and still more preferably 0 mass % (having no repeating units other than those represented by General Formulae (1) to (3)), with respect to the total repeating unit in the polymer A.

A weight-average molecular weight (Mw) of the polymer A is preferably 1000 to 20000, more preferably 1000 to 15000, and still more preferably 1000 to 10000, as a value obtained by performing polystyrene conversion of a value measured by gel permeation chromatography (GPC).

The weight-average molecular weight (Mw) of the polymer A is a value obtained by performing polystyrene conversion of a value measured by gel permeation chromatography (GPC) under the following conditions.

[Eluent]: tetrahydrofuran (THF)
[Device name] Ecosec HLC-8220GPC (manufactured by Tosoh Corporation)
[Column]: TSKgel SuperHZM-H, TSKgel SuperHZ4000, TSKgel SuperHZM200 (manufactured by Tosoh Corporation)
[Column temperature]: 40° C.
[Flow rate]: 50 ml/min Method of Manufacturing Polymer A The polymer A can be obtained by performing polymerization reaction of the compound (K1) represented by General Formula (1m) with at least one selected from the group consisting of the compound (K2) represented by General Formula (2m) and the compound (K3) represented by General Formula (3m) in the presence of a polymerization initiator. Here, the amount of the polymerization initiator used may be, for example, 210 to 3000 mol % with respect to the total amount of the compound (K1), the compound (K2), and the compound (K3).

The amount of the polymerization initiator used (polymerization initiator amount) is obtained by Formula (J), and is, in one aspect, preferably 210 to 3000 mol %, more preferably 260 to 1500 mol %, still more preferably 260 to 1000 mol %, and still more preferably 260 to 700 mol %, with respect to the total amount of the compound (K1), the compound (K2), and the compound (K3).

polymerization initiator amount (mol %)=100×
amount of substance of polymerization initiator/
(amount of substance of compound (K1)+
amount of substance of compound (K2)+amount
of substance of compound (K3))  Formula (J):

Polymerization Initiator:

As the polymerization initiator, an azo-based polymerization initiator can be preferably used.

Examples of the azo-based polymerization initiator include compounds shown in the following (1) to (6).

(1) Azonitrile compound:
2,2'-azobisisobutyronitrile, 2,2'-azobis(2-methylbutyronitrile), 2,2'-azobis(2,4-dimethylvaleronitrile), 1,1'-azobis(1-cyclohexanecarbonitrile), 2,2'-azobis(4-methoxy-2,4-dimethylvaleronitrile), 2-(carbamoylazo)isobutyronitrile, and the like.

(2) Azoamide compound:
2,2'-azobis{2-methyl-N-[1,1-bis(hydroxymethyl)-2-hydroxyethyl]propionamide}, 2,2'-azobis {2-methyl-N-[2-(1-hydroxybutyl)]propionamide}, 2,2'-azobis[2-methyl-N-(2-hydroxyethyl)propionamide], 2,2'-azobis[N-(2-propenyl)-2-methylpropionamide], 2,2'-azobis(N-butyl-2-methylpropionamide), 2,2'-azobis(N-cyclohexyl-2-methylpropionamide), and the like.

(3) Cyclic azoamidine compound:
2,2'-azobis[2-(2-imidazolin-2-yl)propane]dihydrochloride, 2,2'-azobis[2-(2-imidazolin-2-yl)propane]disulfate dihydrate, 2,2'-azobis[2-[1-(2-hydroxyethyl)-2-imidazolin-2-yl]propane]dihydrochloride, 2,2'-azobis[2-(2-imidazolin-2-yl)propane], 2,2'-azobis(1-imino-1-pyrrolidino-2-methylpropane)dihydrochloride, and the like.

(4) Azoamidine compound:
2,2'-azobis(2-methylpropionamidine)dihydrochloride, 2,2'-azobis[N-(2-carboxyethyl)-2-methylpropionamidine]tetrahydrate, and the like.

(5) Others:
dimethyl 2,2'-azobisisobutyrate, 4,4'-azobis-4-cyanovaleric acid, 2,2'-azobis(2,4,4-trimethylpentane), 1,1'-azobis(1-acetoxy-1-phenylethane), dimethyl 1,1'-azobis(1-cyclohexanecarboxylate), 4,4'-azobis(4-cyanopentanoic acid), and the like.

(6) Fluoroalkyl group-containing azo-based polymerization initiator:
4,4'-azobis(4-cyanopentanoate-2-(perfluoromethyl)ethyl),
4,4'-azobis(4-cyanopentanoate-2-(perfluorobutyl)ethyl),
4,4'-azobis(4-cyanopentanoate-2-(perfluorohexyl)ethyl),
and the like.

Among the above-described azo-based polymerization initiators, from the viewpoint of the surface energy of the obtained polymer, an azo-based polymerization initiator having a substituent having a relatively low polarity is desirable, and dimethyl 2,2'-azobisisobutyrate or 2,2'-azobis(2,4,4-trimethylpentane) is particularly preferable. In addition, 4,4'-azobis(4-cyanopentanoate-2-(perfluoromethyl)ethyl) and 4,4'-azobis(4-cyanopentanoate-2-(perfluorohexyl)ethyl), which are fluoroalkyl group-containing azo-based polymerization initiator, are also preferable.

The polymer A can be polymerized by a well-known method, for example, solution polymerization, dispersion polymerization, precipitation polymerization, and bulk polymerization. Among these, solution polymerization or precipitation polymerization is preferable. In particular, from the viewpoint of controlling the molecular weight, it is preferable to perform reaction by solution polymerization in an organic solvent. Examples of the organic solvent used in this case include an aromatic hydrocarbon solvent such as benzene, toluene, xylene, ethylbenzene, and tetralin; an aliphatic or alicyclic hydrocarbon solvent such as n-hexane, n-heptane, mineral spirit, and cyclohexane; a halogen solvent such as methyl chloride, methyl bromide, methyl iodide, methylene dichloride, chloroform, carbon tetrachloride, trichloroethylene, perchloroethylene, and orthodichlorobenzene; an ester or ester ether solvent such as ethyl acetate, butyl acetate, methoxybutyl acetate, methyl cellosolve acetate, ethyl cellosolve acetate, and propylene glycol monomethyl ether acetate; an ether solvent such as diethyl ether, tetrahydrofuran, 1,4-dioxane, methyl cellosolve, ethyl cellosolve, butyl cellosolve, and propylene glycol monomethyl ether; a ketone solvent such as acetone, methyl ethyl ketone, methyl isobutyl ketone, di-n-butyl ketone, and cyclohexanone; an alcohol solvent such as methanol, ethanol, n-propanol, isopropanol, n-butanol, isobutanol, tert-butanol, 2-ethylhexyl alcohol, and benzyl alcohol; an amide solvent such as N,N-dimethylformamide and N,N-dimethylacetamide; a sulfoxide solvent such as dimethylsulfoxide; a heterocyclic compound solvent such as N-methyl-2-pyrrolidone; a fluorine solvent of hydrofluoroether-based (trade name Novec7200 manufactured by 3M Company); and a mixed solvent of two or more of them.

Among these, preferred are an aromatic hydrocarbon solvent, a halogen solvent, an ester solvent, an ether solvent, a ketone solvent, an alcohol solvent, an amide solvent, a sulfoxide solvent, a fluorine solvent, and the like, and particularly preferred are toluene, xylene, orthodichlorobenzene, butyl acetate, propylene glycol monomethyl ether acetate, propylene glycol monomethyl ether, 1,4-dioxane, methyl cellosolve, methyl isobutyl ketone, N,N-dimethylformamide, N,N-dimethylacetamide, Novec7200, Novec7300 (manufactured by 3M Company), and the like, and a mixed solvent of two or more thereof is also preferable.

In a case where the above polymerization reaction is performed in the presence of an organic solvent, a content of the organic solvent in the whole polymerization reactant is preferably 0.1 to 100 parts by mass, and more preferably 0.5 to 50 parts by mass, with respect to 1 part by mass of the compound (K1).

The polymerization reaction can be performed under normal pressure, pressure sealing, or reduced pressure, and is preferably performed under normal pressure in terms of the simplicity of the apparatus and operation. In addition, the polymerization reaction is preferably performed under an inert gas atmosphere such as $N_2$. A temperature of the polymerization reaction is preferably 50° C. to 200° C., and more preferably 70° C. to 150° C. More preferably, the polymerization reaction can be performed at a temperature higher than a temperature for 10 hours half-life of the polymerization initiator by 10° C. or more, and more specifically, the polymerization reaction is preferably performed by adding dropwise a solution containing at least one selected from the group consisting of the compound (K1), the compound (K2), and the compound (K3), the polymerization initiator, and an organic solvent into the organic solvent maintained at a temperature higher than a temperature for the 10 hours half-life of the polymerization initiator by 10° C. or more. After the completion of the polymerization reaction, the obtained polymer A can be collected by any method, and as necessary, the polymer A can be subjected to post-treatment such as washing. Examples of the method for collecting the polymer A from the reaction solution include a method such as re-precipitation.

The amount of at least one selected from the group consisting of the compound (K2) and the compound (K3) to be used is preferably 1 to 1000 mol %, and more preferably 5 to 500 mol %, with respect to the compound (K1), from the viewpoint of solvent solubility, resin dispersibility, and the like.

In synthesizing the polymer A, the polymerization reaction is preferably a radical polymerization reaction from the viewpoint of controlling the molecular weight.

A double bond residual ratio in the polymer A obtained by the radical polymerization reaction is preferably 0.05 mol % or less, more preferably 0.01 mol % or less, and still more preferably 0.001 mol % or less, with respect to 1 mol of the polymer. The double bond residual ratio can be easily calculated from the peak intensity by performing nuclear magnetic resonance (NMR) measurement.

Specific examples of the polymer A include polymers (1-1) to (1-8) used in Examples described below. Further, specific examples of the polymer A include the following polymers (1-9) to (1-21). For each polymer, "a" and "b" represent a content (unit: mass %) of each repeating unit with respect to the total repeating unit in the polymer. The details are as described above. In one aspect, for each polymer, "b" is preferably 10 to 70 mass %, more preferably 10 to 60 mass %, and still more preferably 10 to 50 mass %.

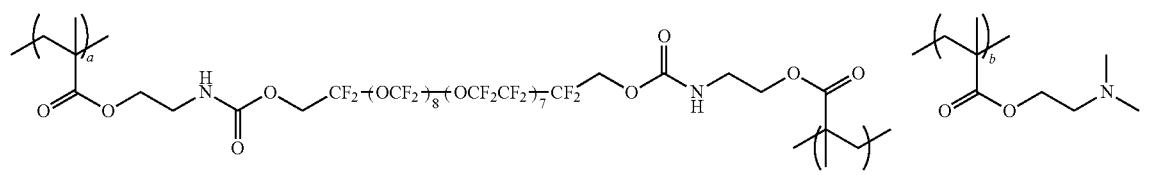
(1-9)

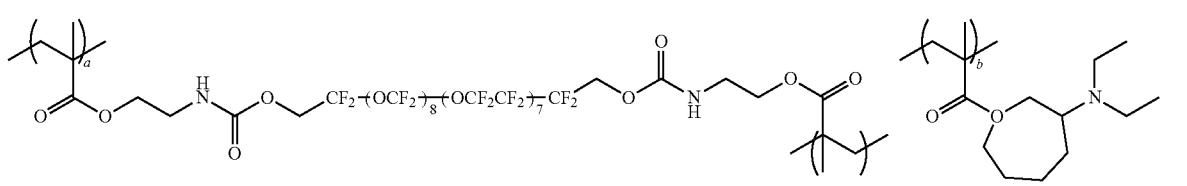
(1-10)

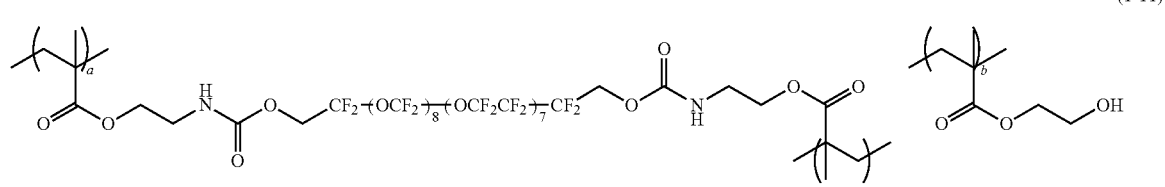
(1-11)

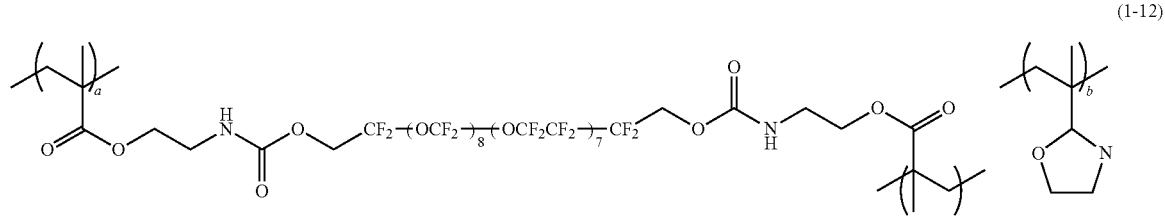
(1-12)

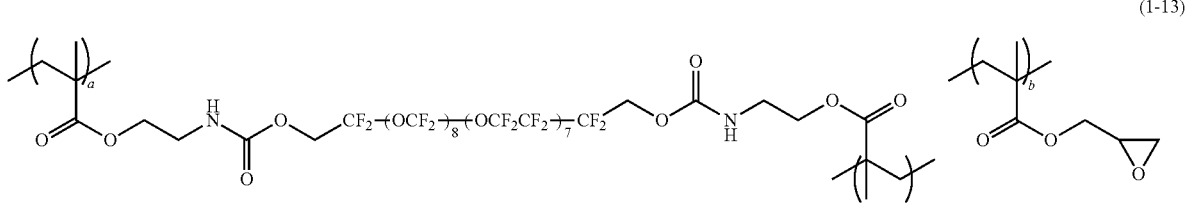
(1-13)

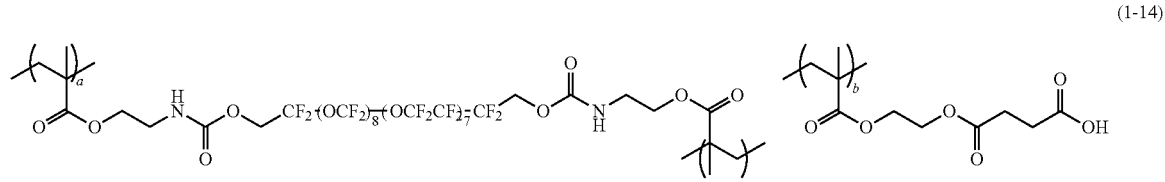
(1-14)

(1-15)
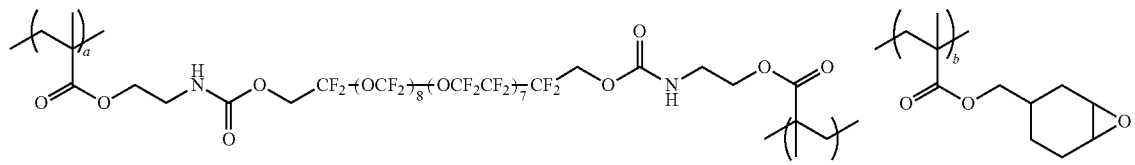
(1-16)
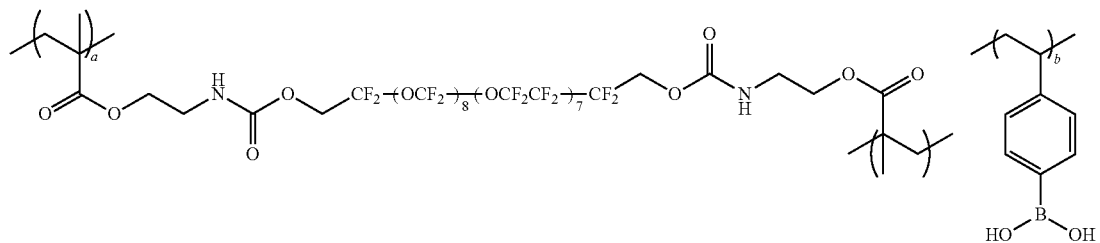
(1-17)
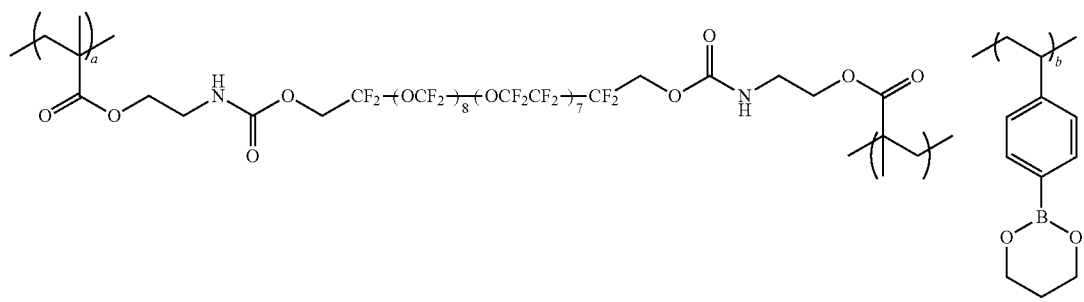
(1-18)
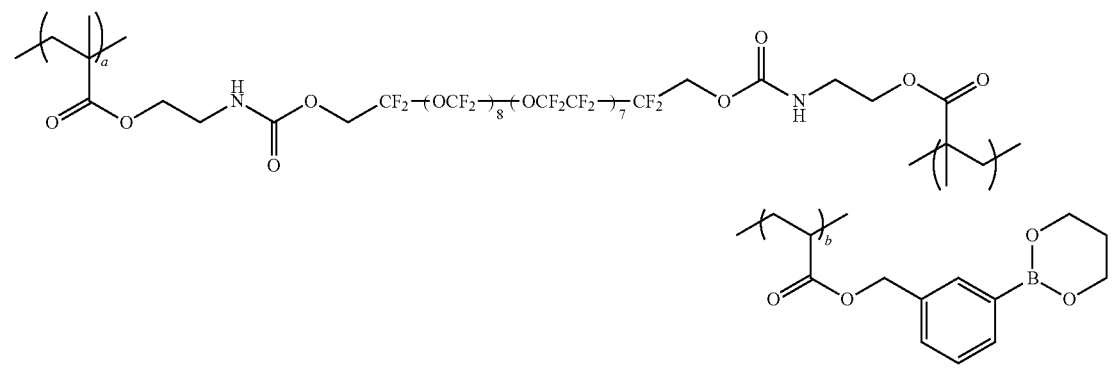
(1-19)
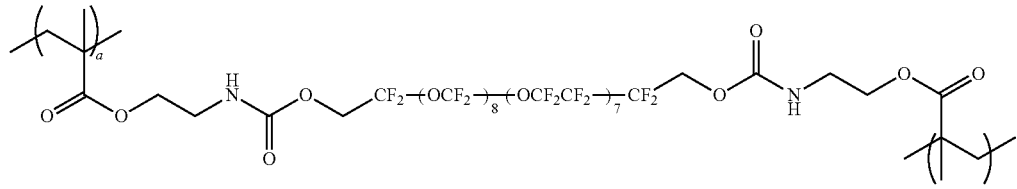
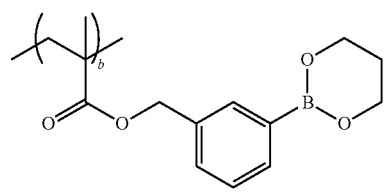

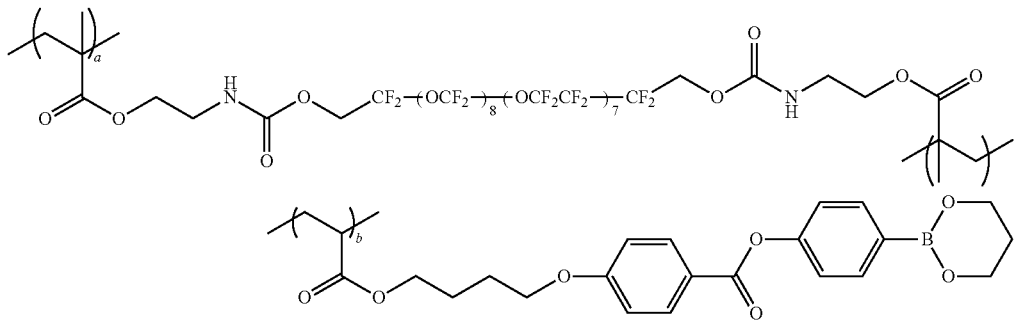
(1-20)

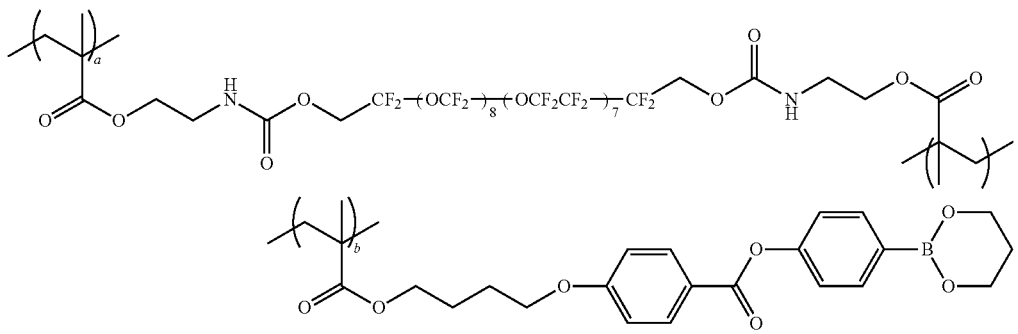
(1-21)

One or more of the fluorine-containing compounds can be used for manufacturing a magnetic tape. In one aspect, a coating liquid containing a fluorine-containing compound is prepared, and the coating liquid is applied (so-called overcoat) to the surface of the magnetic layer, so that the fluorine-containing compound can be present in a portion on the magnetic layer side. The coating amount here is preferably 0.1 to 50 mg/m² as the coating amount of the fluorine-containing compound per unit area, from the viewpoint of further increasing the value of the ratio θr. The coating liquid containing the fluorine-containing compound can be prepared by mixing the fluorine-containing compound with one or more solvents. The kind of solvent used for preparing such a coating liquid and a concentration of the fluorine-containing compound in the coating liquid are not particularly limited. As the solvent, for example, one or more kinds of a ketone solvent (for example, methyl ethyl ketone and cyclohexanone) and a fluorine solvent (for example, 1,1,1,2,2,3,4,5,5,5-decafluoropentane) can be used. In addition, in one aspect, it is possible to manufacture a magnetic tape containing the fluorine-containing compound in the portion on the magnetic layer side, by adding the fluorine-containing compound as a component of a magnetic layer forming composition. In this case, the content of the fluorine-containing compound in the magnetic layer forming composition (or the magnetic layer) is preferably in a range of 0.5 to 1.5 parts by mass with respect to 100.0 parts by mass of a ferromagnetic powder, from the viewpoint of further increasing the value of the ratio θr.

Hereinafter, the magnetic tape will be further described.

Magnetic Layer

Ferromagnetic Powder

As a ferromagnetic powder included in the magnetic layer, a well-known ferromagnetic powder as a ferromagnetic powder used in magnetic layers of various magnetic recording media can be used alone or in combination of two or more. From the viewpoint of improving recording density, it is preferable to use a ferromagnetic powder having a small average particle size. From this point, the average particle size of the ferromagnetic powder is preferably 50 nm or less, more preferably 45 nm or less, still more preferably 40 nm or less, still more preferably 35 nm or less, still more preferably 30 nm or less, still more preferably 25 nm or less, and still more preferably 20 nm or less. On the other hand, from the viewpoint of magnetization stability, the average particle size of the ferromagnetic powder is preferably 5 nm or more, more preferably 8 nm or more, still more preferably 10 nm or more, still more preferably 15 nm or more, and still more preferably 20 nm or more.

Regarding the particle size of the ferromagnetic powder, an average particle volume may be used as an index of the particle size. From the viewpoint of improving recording density, the average particle volume is preferably 2500 nm³ or less, more preferably 2300 nm³ or less, still more preferably 2000 nm³ or less, and still more preferably 1500 nm³ or less. From the viewpoint of magnetization stability, the average particle volume of the ferromagnetic powder is preferably 500 nm³ or more, more preferably 600 nm³ or more, still more preferably 650 nm³ or more, and still more preferably 700 nm³ or more. The average particle volume described above is a value obtained as a sphere-equivalent volume from the average particle size obtained by the method described below.

Hexagonal Ferrite Powder

Preferred specific examples of the ferromagnetic powder include a hexagonal ferrite powder. For details of the hexagonal ferrite powder, for example, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to.

In the present invention and the present specification, the term "hexagonal ferrite powder" refers to a ferromagnetic powder in which a hexagonal ferrite crystal structure is detected as a main phase by X-ray diffraction analysis. The main phase refers to a structure to which the highest intensity diffraction peak in an X-ray diffraction spectrum obtained by X-ray diffraction analysis is attributed. For example, in a case where the highest intensity diffraction peak is attributed to a hexagonal ferrite crystal structure in an X-ray diffraction spectrum obtained by X-ray diffraction analysis, it is determined that the hexagonal ferrite crystal structure is detected as the main phase. In a case where only a single structure is detected by X-ray diffraction analysis, this detected structure is taken as the main phase. The hexagonal ferrite crystal structure includes at least an iron atom, a divalent metal atom, and an oxygen atom, as a constituent atom. The divalent metal atom is a metal atom that can be a divalent cation as an ion, and examples thereof may include an alkaline earth metal atom such as a strontium atom, a barium atom, and a calcium atom, and a lead atom. In the present invention and the present specification, a hexagonal strontium ferrite powder refers to a powder in which a main divalent metal atom is a strontium atom, and a hexagonal barium ferrite powder refers to a powder in which a main divalent metal atom is a barium atom. The main divalent metal atom refers to a divalent metal atom that accounts for the most on an at % basis among the divalent metal atoms included in the powder. Note that a rare earth atom is not included in the above divalent metal atom. The term "rare earth atom" in the present invention and the present specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), a europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder, which is an aspect of the hexagonal ferrite powder, will be described in more detail.

An activation volume of the hexagonal strontium ferrite powder is preferably in a range of 800 to 1600 $nm^3$. The finely granulated hexagonal strontium ferrite powder having an activation volume in the above range is suitable for manufacturing a magnetic tape exhibiting excellent electromagnetic conversion characteristics. The activation volume of the hexagonal strontium ferrite powder is preferably 800 $nm^3$ or more, and may be, for example, 850 $nm^3$ or more. Further, from the viewpoint of further improving the electromagnetic conversion characteristics, the activation volume of the hexagonal strontium ferrite powder is more preferably 1500 $nm^3$ or less, still more preferably 1400 $nm^3$ or less, still more preferably 1300 $nm^3$ or less, still more preferably 1200 $nm^3$ or less, and still more preferably 1100 $nm^3$ or less. The same applies to an activation volume of the hexagonal barium ferrite powder.

The term "activation volume" refers to a unit of magnetization reversal and is an index indicating the magnetic size of a particle. An activation volume described in the present invention and the present specification and an anisotropy constant Ku which will be described below are values obtained from the following relational expression between a coercivity Hc and an activation volume V, by performing measurement in a coercivity Hc measurement portion at a magnetic field sweep rate of 3 minutes and 30 minutes using a vibrating sample magnetometer (measurement temperature: 23° C.±1° C.). For a unit of the anisotropy constant Ku, 1 erg/cc=1.0×10$^{-1}$ J/$m^3$.

$$Hc=2Ku/Ms\{1-[(kT/KuV)\ln(At/0.693)]^{1/2}\}$$

[In the above expression, Ku: anisotropy constant (unit: J/$m^3$), Ms: saturation magnetization (Unit: kA/m), k: Boltzmann constant, T: absolute temperature (unit: K), V: activation volume (unit: $cm^3$), A: spin precession frequency (unit: $s^{-1}$), t: magnetic field reversal time (unit: s)]

An index for reducing thermal fluctuation, in other words, for improving the thermal stability may include the anisotropy constant Ku. The hexagonal strontium ferrite powder preferably has Ku of 1.8×10$^5$ J/$m^3$ or more, and more preferably has Ku of 2.0×10$^5$ J/$m^3$ or more. Ku of the hexagonal strontium ferrite powder may be, for example, 2.5×10$^5$ J/$m^3$ or less. Here, since higher Ku means higher thermal stability, which is preferable, a value thereof is not limited to the values exemplified above.

The hexagonal strontium ferrite powder may or may not include a rare earth atom. In a case where the hexagonal strontium ferrite powder includes a rare earth atom, it is preferable to include a rare earth atom at a content (bulk content) of 0.5 to 5.0 at % with respect to 100 at % of an iron atom. In one aspect, the hexagonal strontium ferrite powder including a rare earth atom may have a rare earth atom surface layer portion uneven distribution property. In the present invention and the present specification, the "rare earth atom surface layer portion uneven distribution property" means that a rare earth atom content with respect to 100 at % of an iron atom in a solution obtained by partially dissolving the hexagonal strontium ferrite powder with an acid (hereinafter, referred to as a "rare earth atom surface layer portion content" or simply a "surface layer portion content" for a rare earth atom.) and a rare earth atom content with respect to 100 at % of an iron atom in a solution obtained by totally dissolving the hexagonal strontium ferrite powder with an acid (hereinafter, referred to as a "rare earth atom bulk content" or simply a "bulk content" for a rare earth atom.) satisfy a ratio of a rare earth atom surface layer portion content/a rare earth atom bulk content >1.0. A rare earth atom content in the hexagonal strontium ferrite powder described below is synonymous with the rare earth atom bulk content. On the other hand, partial dissolution using an acid dissolves a surface layer portion of a particle constituting the hexagonal strontium ferrite powder, and thus, a rare earth atom content in a solution obtained by partial dissolution is a rare earth atom content in a surface layer portion of a particle constituting the hexagonal strontium ferrite powder. A rare earth atom surface layer portion content satisfying a ratio of "rare earth atom surface layer portion content/rare earth atom bulk content >1.0" means that in a particle constituting the hexagonal strontium ferrite powder, rare earth atoms are unevenly distributed in a surface layer portion (that is, more than an inside). The surface layer portion in the present invention and the present specification means a partial region from a surface of a particle constituting the hexagonal strontium ferrite powder toward an inside.

In a case where the hexagonal strontium ferrite powder includes the rare earth atom, a rare earth atom content (bulk content) is preferably in a range of 0.5 to 5.0 at % with respect to 100 at % of an iron atom. It is considered that a bulk content in the above range of the included rare earth atom and uneven distribution of the rare earth atoms in a surface layer portion of a particle constituting the hexagonal strontium ferrite powder contribute to suppression of a decrease in reproduction output during repeated reproduction. It is supposed that this is because the hexagonal strontium ferrite powder includes a rare earth atom with a bulk content in the above range, and rare earth atoms are unevenly distributed in a surface layer portion of a particle constituting the hexagonal strontium ferrite powder, and thus it is possible to increase an anisotropy constant Ku. The higher a value of an anisotropy constant Ku is, the more a phenomenon called thermal fluctuation can be suppressed (in other words, thermal stability can be improved). By suppressing occurrence of thermal fluctuation, it is possible to suppress a decrease in reproduction output during repeated reproduction. It is supposed that uneven distribution of rare earth atoms in a particulate surface layer portion of the hexagonal strontium ferrite powder contributes to stabilization of spins of iron (Fe) sites in a crystal lattice of a surface layer portion, and thus, an anisotropy constant Ku may be increased.

Moreover, it is supposed that the use of the hexagonal strontium ferrite powder having a rare earth atom surface layer portion uneven distribution property as a ferromagnetic powder in the magnetic layer also contributes to inhibition of a magnetic layer surface from being scraped by being slid with respect to the magnetic head. That is, it is supposed that the hexagonal strontium ferrite powder having a rare earth atom surface layer portion uneven distribution property can also contribute to an improvement of running durability of the magnetic tape. It is supposed that this may be because uneven distribution of rare earth atoms on a surface of a particle constituting the hexagonal strontium ferrite powder contributes to an improvement of interaction between the particle surface and an organic substance (for example, a binding agent and/or an additive) included in the magnetic layer, and, as a result, a strength of the magnetic layer is improved.

From the viewpoint of further suppressing a decrease in reproduction output during repeated reproduction and/or the viewpoint of further improving running durability, the rare earth atom content (bulk content) is more preferably in a range of 0.5 to 4.5 at %, still more preferably in a range of 1.0 to 4.5 at %, and still more preferably in a range of 1.5 to 4.5 at %.

The bulk content is a content obtained by totally dissolving the hexagonal strontium ferrite powder. In the present invention and the present specification, unless otherwise noted, the content of an atom means a bulk content obtained by totally dissolving the hexagonal strontium ferrite powder. The hexagonal strontium ferrite powder including a rare earth atom may include only one kind of rare earth atom as the rare earth atom, or may include two or more kinds of rare earth atoms. The bulk content in a case of including two or more kinds of rare earth atoms is obtained for the total of two or more kinds of rare earth atoms. This also applies to other components in the present invention and the present specification. That is, unless otherwise noted, a certain component may be used alone or in combination of two or more. A content amount or a content in a case where two or more components are used refers to that for the total of two or more components.

In a case where the hexagonal strontium ferrite powder includes a rare earth atom, the included rare earth atom need only be any one or more of rare earth atoms. As a rare earth atom that is preferable from the viewpoint of further suppressing a decrease in reproduction output during repeated reproduction, there are a neodymium atom, a samarium atom, a yttrium atom, and a dysprosium atom, here, the neodymium atom, the samarium atom, and the yttrium atom are more preferable, and a neodymium atom is still more preferable.

In the hexagonal strontium ferrite powder having a rare earth atom surface layer portion uneven distribution property, the rare earth atoms need only be unevenly distributed in the surface layer portion of a particle constituting the hexagonal strontium ferrite powder, and the degree of uneven distribution is not limited. For example, for the hexagonal strontium ferrite powder having a rare earth atom surface layer portion uneven distribution property, a ratio of a surface layer portion content of a rare earth atom obtained by partial dissolution under dissolution conditions which will be described below to a bulk content of a rare earth atom obtained by total dissolution under dissolution conditions which will be described below, that is, "surface layer portion content/bulk content" exceeds 1.0 and may be 1.5 or more. The fact that "surface layer portion content/bulk content" is larger than 1.0 means that in a particle constituting the hexagonal strontium ferrite powder, rare earth atoms are unevenly distributed in the surface layer portion (that is, more than an inside). Further, a ratio of a surface layer portion content of a rare earth atom obtained by partial dissolution under dissolution conditions which will be described below to a bulk content of a rare earth atom obtained by total dissolution under the dissolution conditions which will be described below, that is, "surface layer portion content/bulk content" may be, for example, 10.0 or less, 9.0 or less, 8.0 or less, 7.0 or less, 6.0 or less, 5.0 or less, or 4.0 or less. Note that, in the hexagonal strontium ferrite powder having a rare earth atom surface layer portion uneven distribution property, the rare earth atoms need only be unevenly distributed in the surface layer portion of a particle constituting the hexagonal strontium ferrite powder, and the "surface layer portion content/bulk content" is not limited to the exemplified upper limit or lower limit.

The partial dissolution and the total dissolution of the hexagonal strontium ferrite powder will be described below. For the hexagonal strontium ferrite powder that exists as a powder, the partially and totally dissolved sample powder is taken from the same lot of powder. On the other hand, for the hexagonal strontium ferrite powder included in the magnetic layer of the magnetic tape, a part of the hexagonal strontium ferrite powder taken out from the magnetic layer is subjected to partial dissolution, and the other part is subjected to total dissolution. The hexagonal strontium ferrite powder can be taken out from the magnetic layer by a method described in a paragraph 0032 of JP2015-91747A, for example.

The partial dissolution means that dissolution is performed such that, at the end of dissolution, the residue of the hexagonal strontium ferrite powder can be visually checked in the solution. For example, by partial dissolution, it is possible to dissolve a region of 10 to 20 mass % of the particle constituting the hexagonal strontium ferrite powder with the total particle being 100 mass %. On the other hand, the total dissolution means that dissolution is performed such that, at the end of dissolution, the residue of the hexagonal strontium ferrite powder cannot be visually checked in the solution.

The partial dissolution and measurement of the surface layer portion content are performed by the following method, for example. Note that the following dissolution conditions such as the amount of sample powder are exemplified, and dissolution conditions for partial dissolution and total dissolution can be employed in any manner.

A container (for example, a beaker) containing 12 mg of the sample powder and 10 mL of 1 mol/L hydrochloric acid is held on a hot plate at a set temperature of 70° C. for 1 hour. The obtained solution is filtered by a membrane filter of 0.1 µm. Elemental analysis of the filtrated solution thus obtained is performed by an inductively coupled plasma (ICP) analyzer. In this way, the surface layer portion content of a rare earth atom with respect to 100 at % of an iron atom can be obtained. In a case where a plurality of kinds of rare earth atoms are detected by elemental analysis, the total content of all rare earth atoms is defined as the surface layer portion content. This also applies to the measurement of the bulk content.

On the other hand, the total dissolution and measurement of the bulk content are performed by the following method, for example.

A container (for example, a beaker) containing 12 mg of the sample powder and 10 mL of 4 mol/L hydrochloric acid is held on a hot plate at a set temperature of 80° C. for 3 hours. Thereafter, the same procedure as the partial dissolution and the measurement of the surface layer portion content is carried out, and the bulk content with respect to 100 at % of an iron atom can be obtained.

From the viewpoint of increasing the reproduction output in a case of reproducing data recorded on the magnetic tape, it is desirable that mass magnetization σs of the ferromagnetic powder included in the magnetic tape is high. In this regard, the hexagonal strontium ferrite powder including a rare earth atom but not having the rare earth atom surface layer portion uneven distribution property tends to have a larger decrease in σs than that of the hexagonal strontium ferrite powder including no rare earth atom. With respect to this, it is considered that the hexagonal strontium ferrite powder having a rare earth atom surface layer portion uneven distribution property is preferable in suppressing such a large decrease in σs. In one aspect, σs of the hexagonal strontium ferrite powder may be 45 A·m²/kg or more, and may be 47 A·m²/kg or more. On the other hand, from the viewpoint of noise reduction, σs is preferably 80 A·m²/kg or less and more preferably 60 A·m²/kg or less. σs can be measured using a well-known measuring device, such as a vibrating sample magnetometer, capable of measuring magnetic properties. In the present invention and the present specification, unless otherwise noted, the mass magnetization σs is a value measured at a magnetic field intensity of 15 kOe. 1 [kOe]=$10^6/4\pi$[A/m]

Regarding the content (bulk content) of a constituent atom of the hexagonal strontium ferrite powder, a strontium atom content may be, for example, in a range of 2.0 to 15.0 at % with respect to 100 at % of an iron atom. In one aspect, the hexagonal strontium ferrite powder may include only a strontium atom as a divalent metal atom. In another aspect, the hexagonal strontium ferrite powder may include one or more other divalent metal atoms in addition to a strontium atom. For example, a barium atom and/or a calcium atom may be included. In a case where the other divalent metal atoms other than the strontium atom are included, a content of the barium atom and a content of the calcium atom in the hexagonal strontium ferrite powder respectively can be, for example, in a range of 0.05 to 5.0 at % with respect to 100 at % of the iron atom.

As the hexagonal ferrite crystal structure, a magnetoplumbite type (also referred to as an "M type"), a W type, a Y type, and a Z type are known. The hexagonal strontium ferrite powder may have any crystal structure. The crystal structure can be checked by X-ray diffraction analysis. In the hexagonal strontium ferrite powder, a single crystal structure or two or more crystal structures may be detected by X-ray diffraction analysis. For example, according to an aspect, in the hexagonal strontium ferrite powder, only the M-type crystal structure may be detected by X-ray diffraction analysis. For example, M-type hexagonal ferrite is represented by a composition formula of $AFe_{12}O_{19}$. Here, A represents a divalent metal atom, and in a case where the hexagonal strontium ferrite powder is the M-type, A is only a strontium atom (Sr), or in a case where, as A, a plurality of divalent metal atoms are included, as described above, a strontium atom (Sr) accounts for the most on an at % basis. The divalent metal atom content of the hexagonal strontium ferrite powder is usually determined by the type of crystal structure of the hexagonal ferrite and is not particularly limited. The same applies to the iron atom content and the oxygen atom content. The hexagonal strontium ferrite powder may include at least an iron atom, a strontium atom, and an oxygen atom, and may further include a rare earth atom. Furthermore, the hexagonal strontium ferrite powder may or may not include atoms other than these atoms. As an example, the hexagonal strontium ferrite powder may include an aluminum atom (Al). A content of an aluminum atom may be, for example, 0.5 to 10.0 at % with respect to 100 at % of an iron atom. From the viewpoint of further suppressing a decrease in reproduction output during repeated reproduction, the hexagonal strontium ferrite powder includes an iron atom, a strontium atom, an oxygen atom, and a rare earth atom, and the content of atoms other than these atoms is preferably 10.0 at % or less, more preferably in a range of 0 to 5.0 at %, and may be 0 at % with respect to 100 at % of an iron atom. That is, in one aspect, the hexagonal strontium ferrite powder may not include atoms other than an iron atom, a strontium atom, an oxygen atom, and a rare earth atom. The content expressed in at % is obtained by converting a content of each atom (unit: mass %) obtained by totally dissolving the hexagonal strontium ferrite powder into a value expressed in at % using an atomic weight of each atom. Further, in the present invention and the present specification, the term "not include" for a certain atom means that a content measured by an ICP analyzer after total dissolution is 0 mass %. A detection limit of the ICP analyzer is usually 0.01 parts per million (ppm) or less on a mass basis. The term "not included" is used as a meaning including that an atom is included in an amount less than the detection limit of the ICP analyzer. In one aspect, the hexagonal strontium ferrite powder may not include a bismuth atom (Bi).

Metal Powder

Preferred specific examples of the ferromagnetic powder include a ferromagnetic metal powder. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

Preferred specific examples of the ferromagnetic powder include an ε-iron oxide powder. In the present invention and the present specification, the term "ε-iron oxide powder" refers to a ferromagnetic powder in which an ε-iron oxide crystal structure is detected as a main phase by X-ray diffraction analysis. For example, in a case where the highest intensity diffraction peak is attributed to an ε-iron oxide crystal structure in an X-ray diffraction spectrum obtained by X-ray diffraction analysis, it is determined that the ε-iron oxide crystal structure is detected as the main phase. As a method of manufacturing an ε-iron oxide powder, a producing method from a goethite, a reverse micelle method, and the like are known. All of the manufacturing methods are well known. Regarding a method of manufacturing an ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. 51, pp. 5280 to 5284, J. Mater. Chem. C, 2013, 1, pp. 5200 to 5206 can be referred to, for example. Note that the method of manufacturing the ε-iron oxide powder capable of being used as the ferromagnetic powder in the magnetic layer of the magnetic tape is not limited to the methods described here.

An activation volume of the ε-iron oxide powder is preferably in a range of 300 to 1500 $nm^3$. The finely granulated ε-iron oxide powder having an activation volume in the above range is suitable for manufacturing a magnetic tape exhibiting excellent electromagnetic conversion characteristics. The activation volume of the ε-iron oxide powder is preferably 300 $nm^3$ or more, and may be, for example, 500 $nm^3$ or more. Further, from the viewpoint of further improving the electromagnetic conversion characteristics, the activation volume of the ε-iron oxide powder is more preferably 1400 $nm^3$ or less, still more preferably 1300 $nm^3$ or less, still more preferably 1200 $nm^3$ or less, and still more preferably 1100 $nm^3$ or less.

An index for reducing thermal fluctuation, in other words, for improving the thermal stability may include the anisotropy constant Ku. The ε-iron oxide powder preferably has Ku of $3.0 \times 10^4$ J/m$^3$ or more, and more preferably has Ku of $8.0 \times 10^4$ J/m$^3$ or more. Ku of the ε-iron oxide powder may be, for example, $3.0 \times 10^5$ J/m$^3$ or less. Here, since higher Ku means higher thermal stability, which is preferable, a value thereof is not limited to the values exemplified above.

From the viewpoint of increasing the reproduction output in a case of reproducing data recorded on the magnetic tape, it is desirable that mass magnetization σs of the ferromagnetic powder included in the magnetic tape is high. In this regard, in one aspect, σs of the ε-iron oxide powder may be 8 A·m$^2$/kg or more, and may be 12 A·m$^2$/kg or more. On the other hand, from the viewpoint of noise reduction, σs of the ε-iron oxide powder is preferably 40 A·m$^2$/kg or less and more preferably 35 A·m$^2$/kg or less.

In the present invention and the present specification, unless otherwise noted, an average particle size of various powders such as ferromagnetic powders is a value measured by the following method using a transmission electron microscope.

The powder is imaged at an imaging magnification of 100,000× with a transmission electron microscope, the image is printed on photographic printing paper or displayed on a display so that the total magnification of 500,000× to obtain an image of particles configuring the powder. A target particle is selected from the obtained image of particles, an outline of the particle is traced by a digitizer, and a size of the particle (primary particle) is measured. The primary particles are independent particles without aggregation.

The measurement described above is performed regarding 500 particles randomly extracted. An arithmetic average of the particle sizes of 500 particles thus obtained is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. An average particle size shown in Examples which will be described below is a value measured by using a transmission electron microscope H-9000 manufactured by Hitachi, Ltd. as the transmission electron microscope, and image analysis software KS-400 manufactured by Carl Zeiss as the image analysis software, unless otherwise noted. In the present invention and the present specification, the powder means an aggregate of a plurality of particles. For example, the ferromagnetic powder means an aggregate of a plurality of ferromagnetic particles. Further, the aggregate of the plurality of particles not only includes an aspect in which particles constituting the aggregate directly come into contact with each other, but also includes an aspect in which a binding agent or an additive which will be described below is interposed between the particles. The term "particle" is used to describe a powder in some cases.

As a method of taking a sample powder from the magnetic tape in order to measure the particle size, a method disclosed in a paragraph 0015 of JP2011-048878A can be employed, for example.

In the present invention and the present specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a plate shape or a columnar shape (here, a thickness or a height is smaller than a maximum long diameter of plate surface or a bottom surface), the particle size is shown as a maximum long diameter of the plate surface or the bottom surface, and (3) in a case where the shape of the particle is a sphere shape, a polyhedron shape, or an amorphous shape, and the long axis configuring the particles cannot be specified from the shape, the particle size is shown as an equivalent circle diameter. The equivalent circle diameter is a value obtained by a circle projection method.

In addition, a length of a short axis, that is, a short axis length of the particles is measured in the measurement described above, and an acicular ratio of the powder is obtained as a value of "average long axis length/average short axis length" from an arithmetic average (average long axis length) of the long axis lengths obtained regarding the 500 particles and an arithmetic average (average short axis length) of short axis lengths. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (average long axis length/average short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably in a range of 50 to 90 mass % and more preferably in a range of 60 to 90 mass %, with respect to the total mass of the magnetic layer. A high filling percentage of the ferromagnetic powder in the magnetic layer is preferable from the viewpoint of improving the recording density.

Binding Agent

The magnetic tape can be a coating type magnetic tape, and include a binding agent in the magnetic layer. In the magnetic layer including a binding agent, since many parts of the surface of the particles of the ferromagnetic powder can be coated with the binding agent, it is supposed that the adsorption force of components other than the binding agent to the particles tends to be lower as compared with particles not coated with the binding agent. With respect to this, it is considered that a fluorine-containing compound containing many adsorption functional groups can strongly adsorb particles in such a state. The present inventor supposes that this point is preferable for increasing the value of the ratio θr in the coating type magnetic tape. The binding agent is one or more resins. As the binding agent, various resins usually used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in a non-magnetic layer and/or a back coating layer which will be described below.

For the above binding agent, descriptions disclosed in paragraphs 0028 to 0031 of JP2010-24113A can be referred to. An average molecular weight of the resin used as the binding agent can be, for example, 10,000 to 200,000 as a weight-average molecular weight. Unless otherwise noted, the weight-average molecular weight in the present invention and the present specification is a value obtained by performing polystyrene conversion of a value measured by gel permeation chromatography (GPC) under the following measurement conditions. The weight-average molecular weight of the binding agent shown in Examples described below is a value obtained by performing polystyrene conversion of a value measured under the following measurement conditions. The binding agent may be used in an amount of, for example, 1.0 to 30.0 parts by mass with respect to 100.0 parts by mass of the ferromagnetic powder.

GPC device: HLC-8120 (manufactured by Tosoh Corporation)

Column: TSK gel Multipore HXL-M (manufactured by Tosoh Corporation, 7.8 mm inner diameter (ID)×30.0 cm)

Eluent: tetrahydrofuran (THF)

Curing Agent

A curing agent can also be used together with the resin which can be used as the binding agent. As the curing agent, in one aspect, a thermosetting compound which is a compound in which curing reaction (crosslinking reaction) proceeds due to heating can be used, and in another aspect, a photocurable compound in which a curing reaction (crosslinking reaction) proceeds due to light irradiation can be used. The curing reaction proceeds in a magnetic layer forming step, whereby at least a part of the curing agent can be included in the magnetic layer in a state of being reacted (crosslinked) with other components such as the binding agent. The same applies to the layer formed using this composition in a case where the composition used to form the other layer includes a curing agent. The preferred curing agent is a thermosetting compound, and polyisocyanate is suitable for this. For details of the polyisocyanate, descriptions disclosed in paragraphs 0124 and 0125 of JP2011-216149A can be referred to. The curing agent can be used in the magnetic layer forming composition in an amount of, for example, 0 to 80.0 parts by mass, and preferably 50.0 to 80.0 parts by mass from the viewpoint of improving a strength of the magnetic layer, with respect to 100.0 parts by mass of the binding agent.

Additive

The magnetic layer may include one or more kinds of additives, as necessary. As the additives, the curing agent described above is used as an example. In addition, examples of the additive which can be included in the magnetic layer include a non-magnetic powder, a lubricant, a dispersing agent, a dispersing assistant, a fungicide, an antistatic agent, and an antioxidant. For example, for the dispersing agent, a description disclosed in paragraphs 0061 and 0071 of JP2012-133837A can be referred to. The dispersing agent may be added to a non-magnetic layer forming composition. For the dispersing agent that can be added to the non-magnetic layer forming composition, a description disclosed in a paragraph 0061 of JP2012-133837A can be referred to.

The magnetic tape includes a fluorine-containing compound in a portion on the magnetic layer side. As described above, the fluorine-containing compound can function as a lubricant. In addition, it is possible to manufacture the magnetic tape by using one or more kinds of other compounds by adding the fluorine-containing compound as a compound capable of functioning as a lubricant. As such a compound, one or more kinds of compounds selected from the group consisting of fatty acids and derivatives thereof (for example, fatty acid amides, fatty acid esters, and the like) can be used. By using the magnetic layer forming composition and/or the non-magnetic layer forming composition including the compound described above, a magnetic tape including the compound described above can be manufactured in a portion on the magnetic layer side.

Examples of the fatty acid include lauric acid, myristic acid, palmitic acid, stearic acid, oleic acid, linoleic acid, linolenic acid, behenic acid, erucic acid, and elaidic acid, and stearic acid, myristic acid, and palmitic acid are preferable, and stearic acid is more preferable. The fatty acid may be included in the portion on the magnetic layer side in a form of a salt such as a metal salt.

Examples of the fatty acid amide include amides of the various fatty acids described above, for example, lauric acid amide, myristic acid amide, palmitic acid amide, and stearic acid amide.

Examples of the fatty acid ester include esters of the various fatty acids described above, for example, butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

A content of the fatty acid is, for example, 0.1 to 10.0 parts by mass and preferably 0.5 to 7.0 parts by mass per 100.0 parts by mass of the ferromagnetic powder as the content in the magnetic layer forming composition (or magnetic layer; the same applies hereinafter). In a case where two or more kinds of different fatty acids are added to the magnetic layer forming composition, the content refers to the total content thereof. This point also applies to the contents of other components in the present specification, unless otherwise noted.

The content of the fatty acid in the non-magnetic layer forming composition (or non-magnetic layer; the same applies hereinafter) is, for example, 1.0 to 10.0 parts by mass and is preferably 0.5 to 7.0 parts by mass per 100.0 parts by mass of the non-magnetic powder.

The content of the fatty acid amide in the magnetic layer forming composition is, for example, 0 to 3.0 parts by mass, preferably 0.1 to 3.0 parts by mass, and more preferably 0.1 to 1.0 parts by mass per 100.0 parts by mass of the ferromagnetic powder.

The content of the fatty acid amide in the non-magnetic layer forming composition is, for example, 0.1 to 3.0 parts by mass and is preferably 0.1 to 1.0 parts by mass per 100.0 parts by mass of the non-magnetic powder.

The content of the fatty acid ester in the magnetic layer forming composition is, for example, 0 to 10.0 parts by mass and is preferably 1.0 to 7.0 parts by mass per 100.0 parts by mass of the ferromagnetic powder.

The content of the fatty acid ester in the non-magnetic layer forming composition is, for example, 0 to 10.0 parts by mass and is preferably 1.0 to 7.0 parts by mass per 100.0 parts by mass of the non-magnetic powder.

Examples of the non-magnetic powder that can be included in the magnetic layer include a non-magnetic powder that can function as an abrasive. As an example of the additive which can be used for improving dispersibility of the abrasive in the magnetic layer including the abrasive, a dispersing agent disclosed in paragraphs 0012 to 0022 of JP2013-131285A can be used.

Examples of the non-magnetic powder that can be included in the magnetic layer include a non-magnetic powder (for example, a non-magnetic colloidal particles and carbon black) that can function as a protrusion forming agent which forms protrusions appropriately protruded from the magnetic layer surface. As the protrusion forming agent, for example, carbon black having an average particle size of 5 to 300 nm can be used. An average particle size of colloidal silica (silica colloidal particles) shown in Examples described below is a value obtained by a method disclosed as a measurement method of an average particle diameter in a paragraph 0015 of JP2011-048878A. A content of the protrusion forming agent in the magnetic layer is, for example, preferably 0.1 to 3.5 parts by mass, and more preferably 0.1 to 3.0 parts by mass per 100.0 parts by mass of the ferromagnetic powder.

The magnetic layer described above can be provided on a surface of the non-magnetic support directly or indirectly through the non-magnetic layer.

Non-Magnetic Layer

Next, the non-magnetic layer will be described. The magnetic tape may include a magnetic layer directly on a surface of the non-magnetic support or may include a magnetic layer on the non-magnetic support surface through one or more non-magnetic layers including a non-magnetic powder.

From the viewpoint of increasing smoothness of the magnetic layer surface, it is preferable to increase surface smoothness of the non-magnetic layer which is a surface on which the magnetic layer is to be formed. From this point, it is preferable to use a non-magnetic powder having a small average particle size as the non-magnetic powder included in the non-magnetic layer. An average particle size of the non-magnetic powder is preferably in a range of 500 nm or less, more preferably 200 nm or less, still more preferably 100 nm or less, and still more preferably 50 nm or less. In addition, from the viewpoint of ease of improving dispersibility of the non-magnetic powder, the average particle size of the non-magnetic powder is preferably 5 nm or more, more preferably 7 nm or more, and even more preferably 10 nm or more.

The non-magnetic powder used in the non-magnetic layer may be an inorganic powder or an organic powder. In addition, the carbon black and the like can be used.

For carbon black capable of being used in the non-magnetic layer, for example, a description disclosed in paragraphs 0040 and 0041 of JP2010-24113A can be referred to. Carbon black generally tends to have a large particle size distribution and tends to have poor dispersibility. Therefore, the non-magnetic layer including carbon black tends to have low surface smoothness. From this point, in one aspect, the non-magnetic layer adjacent to the magnetic layer is preferably a non-magnetic layer including a non-magnetic powder other than carbon black as the non-magnetic powder, or a non-magnetic layer including carbon black as one of a plurality of kinds of non-magnetic powders and having a low ratio of carbon black to the total amount of the non-magnetic powder. In addition, it is preferable that a plurality of non-magnetic layers are provided, and the non-magnetic layer positioned closest to the magnetic layer is set as a non-magnetic layer including a non-magnetic powder other than carbon black as the non-magnetic powder. For example, it is preferable that two non-magnetic layers are provided between the non-magnetic support and the magnetic layer, the non-magnetic layer on the non-magnetic support side (also referred to as a "lower non-magnetic layer") is set as a non-magnetic layer including carbon black as the non-magnetic powder, and the non-magnetic layer on the magnetic layer side (also referred to as an "upper non-magnetic layer") is set as a non-magnetic layer including the non-magnetic powder other than carbon black as the non-magnetic powder. In addition, in the non-magnetic layer forming composition including a plurality of kinds of non-magnetic powders, the dispersibility of the non-magnetic powder tends to be easily deteriorated, compared to that in the non-magnetic layer forming composition including one kind of non-magnetic powder. From this point, it is preferable to provide a plurality of non-magnetic layers and to reduce the kinds of the non-magnetic powder included in each non-magnetic layer. In addition, in one aspect, it is preferable to use a dispersing agent, in order to increase the dispersibility of the non-magnetic powder in the non-magnetic layer forming composition including a plurality of kinds of the non-magnetic powders. Such a dispersing agent will be described below.

Examples of the inorganic powder include powders of metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to.

As one aspect of the non-magnetic powder, a non-magnetic iron oxide powder can be used. It is preferable to use a powder having a small particle size as the non-magnetic iron oxide powder, from the viewpoint of increasing the surface smoothness of the non-magnetic layer on which the magnetic layer is to be formed. From this point, it is preferable to use a non-magnetic iron oxide powder having an average particle size in the range described above. In a case where the non-magnetic iron oxide powder has a particle shape of (1) described above, the average particle size is the average long axis length. The acicular ratio (average long axis length/average short axis length) of the non-magnetic iron oxide powder can be more than 1.0. It is preferable to use a powder having a small acicular ratio value as the non-magnetic iron oxide powder, from a viewpoint of improving the surface smoothness of the non-magnetic layer. The acicular ratio (average long axis length/average short axis length) of the non-magnetic iron oxide powder may be, for example, 7.0 or less, and preferably 3.0 or less and more preferably 1.5 or less. As the non-magnetic iron oxide powder, in one aspect, an α-iron oxide powder is preferable. The α-iron oxide is iron oxide is an iron oxide having an α phase as a main phase.

The content (filling percentage) of the non-magnetic powder of the non-magnetic layer is preferably in a range of 50 to 90 mass % and more preferably in a range of 60 to 90 mass %, with respect to the total mass of the non-magnetic layer. In a case where a plurality of non-magnetic layers are provided, the content of the non-magnetic powder in at least one non-magnetic layer is preferably in the range described above, and the content of the non-magnetic powder in more non-magnetic layers is more preferably in the range described above.

The non-magnetic layer includes a non-magnetic powder and can also include a binding agent together with the non-magnetic powder. In regards to other details of a binding agent or an additive of the non-magnetic layer, a well-known technology regarding the non-magnetic layer can be applied. In addition, in regards to the type and the content of the binding agent, and the type and the content of the additive, for example, the well-known technology regarding the magnetic layer can be applied.

As the additive that can be included in the non-magnetic layer, a dispersing agent that can contribute to an improvement of the dispersibility of the non-magnetic powder can be used. Examples of the dispersing agent include a fatty acid represented by RCOOH (R is an alkyl group or an alkenyl group) (for example, a caprylic acid, a capric acid, a lauric acid, a myristic acid, a palmitic acid, a stearic acid, a behenic acid, an oleic acid, an elaidic acid, a linoleic acid, a linolenic acid, and the like); alkali metal salt or alkaline earth metal salt of the fatty acid; ester of the fatty acid; a compound containing fluorine of ester of the fatty acid; amide of the fatty acid; polyalkylene oxide alkyl phosphates ester; lecithin; trialkyl polyolefin oxyquaternary ammonium salt (alkyl group contained is an alkyl group having 1 to 5 carbon atoms, olefin contained is ethylene, propylene, or the like); phenylphosphonic acid; and copper phthalocyanine. These may be used alone or in combination of two or more kinds thereof. The content of the dispersing agent is preferably 0.2 to 5.0 parts by mass with respect to 100.0 parts by mass of the non-magnetic powder.

In addition, as an example of an additive, an organic tertiary amine can be used. For the organic tertiary amine, descriptions disclosed in paragraphs 0011 to 0018 and 0021 of JP2013-049832A can be referred to. The organic tertiary amine can contribute to an improvement of dispersibility of carbon black. For the formulation of a composition for increasing the dispersibility of carbon black with the organic tertiary amine, paragraphs 0022 to 0024 and 0027 of JP2013-049832A can be referred to.

The amine is more preferably trialkylamine. The alkyl group included in the trialkylamine is preferably an alkyl group having 1 to 18 carbon atoms. Three alkyl groups included in the trialkylamine may be the same as or different from each other. For details of the alkyl group, descriptions disclosed in paragraphs 0015 and 0016 of JP2013-049832A can be referred to. As the trialkylamine, trioctylamine is particularly preferable.

The non-magnetic layer of the present invention and the present specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having a coercivity equal to or smaller than 7.96 kA/m (100 Oe), or a layer having a residual magnetic flux density equal to or smaller than 10 mT and a coercivity equal to or smaller than 7.96 kA/m (100 Oe). It is preferable that the non-magnetic layer does not have a residual magnetic flux density and coercivity.

Non-Magnetic Support

Next, the non-magnetic support will be described. Examples of the non-magnetic support (hereinafter, simply referred to as a "support") include well-known components such as polyethylene terephthalate, polyethylene naphthalate, polyamide, polyamideimide, and aromatic polyamide subjected to biaxial stretching. Among these, polyethylene terephthalate, polyethylene naphthalate, and polyamide are preferable. A corona discharge, a plasma treatment, an easy-bonding treatment, or a heat treatment may be performed on these supports in advance.

Back Coating Layer

The magnetic tape may or may not have a back coating layer including a non-magnetic powder on a surface side of the non-magnetic support opposite to a surface side having the magnetic layer. The back coating layer preferably contains any one or both of carbon black and an inorganic powder. The back coating layer can include a binding agent and can also include additives. Regarding the binding agent and additive in the back coating layer, a well-known technology for the back coating layer can be applied, and a well-known technology for the formulation of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Various Thicknesses

Regarding a thickness (total thickness) of the magnetic tape, it has been required to increase the recording capacity (increase the capacity) of the magnetic tape with the enormous increase in the amount of information in recent years. For example, as means for increasing the capacity, a thickness of the magnetic tape may be reduced (hereinafter, also referred to as "thinning") to increase a length of the magnetic tape accommodated in one roll of a magnetic tape cartridge. From this point, the thickness (total thickness) of the magnetic tape is preferably 5.6 μm or less, more preferably 5.5 μm or less, still more preferably 5.4 μm or less, still more preferably 5.3 μm or less, and still more preferably 5.2 μm or less. In addition, from the viewpoint of ease of handling, the thickness of the magnetic tape is preferably 3.0 μm or more, and more preferably 3.5 μm or more.

For example, the thickness (total thickness) of the magnetic tape can be measured by the following method.

Ten tape samples (for example, 5 to 10 cm in length) are cut out from any part of the magnetic tape, and these tape samples are stacked to measure the thickness. A value (thickness per tape sample) obtained by dividing the measured thickness by 1/10 is defined as the tape thickness. The thickness measurement can be performed using a well-known measuring instrument capable of measuring a thickness on the order of 0.1 μm.

A thickness of the non-magnetic support is preferably 3.0 to 5.0 μm.

A thickness of the magnetic layer can be optimized according to a saturation magnetization amount of a magnetic head used, a head gap length, a recording signal band, and the like, is generally 0.01 μm to 0.15 μm, and is preferably 0.02 μm to 0.12 μm and more preferably 0.03 μm to 0.1 μm, from a viewpoint of realization of high-density recording. The magnetic layer may be at least one layer, or the magnetic layer can be separated to two or more layers having different magnetic properties, and a configuration regarding a well-known multilayered magnetic layer can be applied. A thickness of the magnetic layer in a case where the magnetic layer is separated into two or more layers is a total thickness of the layers. This point also applies to the thickness of the non-magnetic layer in the magnetic tape including a plurality of non-magnetic layers.

Regarding the thickness of the non-magnetic layer, as a thicker non-magnetic layer is formed, a presence state of the particles of the non-magnetic powder easily becomes non-uniform in a coating step and a drying step of the non-magnetic layer forming composition, and the difference in thickness at each position tends to increase thereby roughening the surface of the non-magnetic layer. From the viewpoint of increasing the smoothness of the magnetic layer surface, it is preferable that the surface smoothness of the non-magnetic layer is high. From this point, the thickness of the non-magnetic layer is preferably 1.5 μm or less and more preferably 1.0 μm or less. In addition, the thickness of the non-magnetic layer is preferably 0.05 μm or more and more preferably 0.1 μm or more, from the viewpoint of improving the uniformity of coating of the non-magnetic layer forming composition.

A thickness of the back coating layer is preferably 0.9 μm or less and more preferably 0.1 to 0.7 μm.

Various thicknesses such as the thickness of the magnetic layer and the like can be obtained by the following method.

A cross section of the magnetic tape in a thickness direction is exposed by an ion beam, and then observation on the exposed cross section is performed using a scanning electron microscope. Various thicknesses can be obtained as an arithmetic average of thicknesses obtained at two optional points in the cross section observation. Alternatively, the various thicknesses can be obtained as a designed thickness calculated according to manufacturing conditions.

Manufacturing Step

Preparation of Each Layer Forming Composition

A step of preparing a composition for forming the magnetic layer, the non-magnetic layer, or the back coating layer can usually include at least a kneading step, a dispersing step, and, as necessary, a mixing step provided before and after these steps. Each step may be divided into two or more stages. Components used for the preparation of each layer forming composition may be added at an initial stage or in a middle stage of each step. As a solvent, one or more kinds of various solvents usually used for manufacturing a coating type magnetic recording medium can be used. For the solvent, for example, a description disclosed in a paragraph 0153 of JP2011-216149A can be referred to. In addition, each component may be separately added in two or more steps. For example, a binding agent may be added separately in a kneading step, a dispersing step, and a mixing step for adjusting a viscosity after dispersion. In order to manufacture the magnetic tape, a well-known manufacturing technology can be used in various steps. In the kneading step, an open kneader, a continuous kneader, a pressure kneader, or a kneader having a strong kneading force such as an extruder is preferably used. For details of the kneading treatment, descriptions disclosed in JP1989-106338A (JP-H01-106338A) and JP1989-79274A (JP-H01-79274A) can be referred to. As a dispersing device, a well-known dispersing device can be used. In any stage of preparing each layer forming composition, filtering may be performed by a well-known method. The filtering can be performed by using a filter, for example. As the filter used in the filtering, a filter having a pore diameter of 0.01 to 3 μm (for example, filter made of glass fiber or filter made of polypropylene) can be used, for example.

Coating Step

The magnetic layer can be formed by directly applying the magnetic layer forming composition onto the non-magnetic support surface or performing multilayer applying of the magnetic layer forming composition with the non-magnetic layer forming composition sequentially or simultaneously. The back coating layer can be formed by applying a back coating layer forming composition onto a surface of the non-magnetic support opposite to a surface having the non-magnetic layer and/or the magnetic layer (or to be provided with the non-magnetic layer and/or the magnetic layer). For details of the coating for forming each layer, a description disclosed in a paragraph 0066 of JP2010-231843A can be referred to.

Other Steps

After the coating step, various treatments such as a drying treatment, an alignment treatment of the magnetic layer, and a surface smoothing treatment (calendering treatment) can be performed. For various steps, for example, a well-known technology disclosed in paragraphs 0052 to 0057 of JP2010-24113A can be referred to. For example, a coating layer of the magnetic layer forming composition can be subjected to an alignment treatment, while the coating layer is in an undried state. For the alignment treatment, various well-known technologies including a description disclosed in a paragraph 0067 of JP2010-231843A can be used. For example, a vertical alignment treatment can be performed by a well-known method such as a method using a polar opposing magnet. In an alignment zone, a drying speed of the coating layer can be controlled depending on a temperature of drying air, an air volume, and/or a transportation speed of the non-magnetic support on which the coating layer is formed in the alignment zone. Further, the coating layer may be preliminarily dried before the transportation to the alignment zone. Regarding the calendering treatment, in a case where a calendering condition is strengthened, the smoothness of the magnetic layer surface tends to increase. Examples of the calendering condition include the number of times the calendering treatment is performed (hereinafter, also referred to as "the number of calendering times"), a calender pressure, a calender temperature (surface temperature of a calender roll), a calender speed, and a hardness of a calender roll. As the number calendering times increases, the calendering treatment is enhanced. As for the calender pressure, the calender temperature, and the hardness of the calender roll, the calendering treatment is enhanced by increasing these values, and the calendering treatment is enhanced by decreasing the calender speed. For example, the calender pressure (linear pressure) may be 200 to 500 kg/cm and is preferably 250 to 350 kg/cm. The calender temperature (surface temperature of the calender roll) may be, for example, 85° C. to 120° C. and is preferably 90° C. to 110° C., and the calender speed may be, for example, 50 to 300 m/min and is preferably 50 to 200 m/min.

Through various steps, a long magnetic tape original roll can be obtained. The obtained magnetic tape original roll is cut (slit) by a well-known cutter, for example, to have a width of the magnetic tape to be wound around the magnetic tape cartridge. The width is determined according to the standard and is usually ½ inches. ½ inches=12.65 mm.

A servo pattern is usually formed on the magnetic tape obtained by slitting. The detail of the servo pattern will be described below.

Heat Treatment

In one aspect, the magnetic tape can be a magnetic tape manufactured through the following heat treatment. In another aspect, the magnetic tape can be a magnetic tape manufactured without the following heat treatment.

As the heat treatment, the magnetic tape slit and cut to have a width determined according to the standard described above can be wound around a core member and can be subjected to the heat treatment in the wound state.

In one aspect, the heat treatment is performed in a state in which the magnetic tape is wound around a core member for the heat treatment (hereinafter, referred to as a "winding core for heat treatment"), the magnetic tape after the heat treatment is wound around a reel of the magnetic tape cartridge, and the magnetic tape cartridge in which the magnetic tape is wound around the reel can be manufactured.

The winding core for heat treatment can be formed of metal, a resin, or paper. The material of the winding core for heat treatment is preferably a material having high stiffness, from the viewpoint of suppressing the occurrence of winding failure such as spoking. From this point, the winding core for heat treatment is preferably formed of metal or a resin. In addition, as an index for stiffness, a bending elastic modulus of the material of the winding core for heat treatment is preferably 0.2 GPa (Gigapascal) or more, and more preferably 0.3 GPa or more. Meanwhile, since the material having high stiffness is generally expensive, the use of the winding core for heat treatment of the material having stiffness exceeding the stiffness capable of suppressing the occurrence of the winding failure leads to an increase in cost. Considering the above point, the bending elastic modulus of the material of the winding core for heat treatment is preferably 250 GPa or less. The bending elastic modulus is a value measured in accordance with international organization for standardization (ISO) 178, and the bending elastic modulus of various materials is well-known. In addition, the winding core for heat treatment can be a solid or hollow core member. In a case of the hollow core member, a thickness thereof is preferably 2 mm or more from the viewpoint of maintaining stiffness. In addition, the winding core for heat treatment may include or may not include a flange.

It is preferable to prepare a magnetic tape having a length equal to or more than a length to be finally accommodated in the magnetic tape cartridge (hereinafter, referred to as a "final product length") as the magnetic tape wound around the winding core for heat treatment, and to perform the heat treatment by placing the magnetic tape in a heat treatment environment while being wound around the winding core for heat treatment. The length of the magnetic tape wound around the winding core for heat treatment is equal to or more than the final product length, and is preferably the "final product length+α", from the viewpoint of ease of winding around the winding core for heat treatment. This α is preferably 5 m or more, from the viewpoint of ease of the winding. The tension during winding around the winding core for heat treatment is preferably 0.1 N (Newton) or more. In addition, from the viewpoint of suppressing the occurrence of excessive deformation, the tension during winding around the winding core for heat treatment is preferably 1.5 N or less, and more preferably 1.0 N or less. An outer diameter of the winding core for heat treatment is preferably 20 mm or more and more preferably 40 mm or more, from the viewpoint of ease of the winding and suppression of coiling (curling in longitudinal direction). In addition, the outer diameter of the winding core for heat treatment is preferably 100 mm or less, and more preferably 90 mm or less. A width of the winding core for heat treatment need only be equal to or more than the width of the magnetic tape wound around this winding core. In addition, in a case where the magnetic tape is removed from the winding core for heat treatment after the heat treatment, it is preferable to remove the magnetic tape from the winding core for heat treatment after the magnetic tape and the winding core for heat treatment are sufficiently cooled, in order to suppress occurrence of unintended deformation of the tape during the removal operation. It is preferable that the removed magnetic tape is once wound around another winding core (referred to as a "temporary winding core"), and then the magnetic tape is wound around the reel (generally, an outer diameter is about 40 to 50 mm) of the magnetic tape cartridge from the temporary winding core. As a result, the magnetic tape can be wound around the reel of the magnetic tape cartridge while maintaining a relationship between the inner side and the outer side with respect to the winding core for heat treatment of the magnetic tape during the heat treatment. Regarding the details of the temporary winding core and the tension in a case of winding the magnetic tape around the winding core, the description described above regarding the winding core for heat treatment can be referred to. In an aspect in which the heat treatment is applied to the magnetic tape having a length of the "final product length+$\alpha$", the length corresponding to "+$\alpha$" need only be cut off in any stage. For example, in one aspect, the magnetic tape for the final product length need only be wound around the reel of the magnetic tape cartridge from the temporary winding core, and the remaining length corresponding to "+$\alpha$" need only be cut off. From the viewpoint of reducing a portion to be cut off and discarded, the $\alpha$ is preferably 20 m or less.

A specific aspect of the heat treatment performed in a state of being wound around the core member as described above will be described below.

An atmosphere temperature at which the heat treatment is performed (hereinafter, referred to as a "heat treatment temperature") is preferably 40° C. or higher, and more preferably 50° C. or higher. On the other hand, from the viewpoint of suppressing excessive deformation, the heat treatment temperature is preferably 75° C. or lower, more preferably 70° C. or lower, and still more preferably 65° C. or lower.

A weight-basis absolute humidity of an atmosphere in which the heat treatment is performed is preferably 0.1 g/kg Dry air or more, and more preferably 1 g/kg Dry air or more. An atmosphere having a weight-basis absolute humidity in the above range is preferable because it can be prepared without using a special device for reducing moisture. On the other hand, the weight-basis absolute humidity is preferably 70 g/kg Dry air or less, and more preferably 66 g/kg Dry air or less, from the viewpoint of suppressing occurrence of dew condensation and deterioration of workability. A heat treatment time is preferably 0.3 hours or more, and more preferably 0.5 hours or more. In addition, the heat treatment time is preferably 48 hours or less, from the viewpoint of production efficiency.

Formation of Servo Pattern

The magnetic tape can have a servo pattern on the magnetic layer. The term "formation of servo pattern" can also be referred to as "recording of servo signal". The formation of the servo pattern will be described below.

The servo pattern is usually formed along a longitudinal direction of the magnetic tape. Examples of control (servo control) systems using a servo signal include a timing-based servo (TBS), an amplitude servo, and a frequency servo.

As shown in a European computer manufacturers association (ECMA)-319 (June 2001), a magnetic tape conforming to a linear tape-open (LTO) standard (generally called "LTO tape") employs a timing-based servo system. In this timing-based servo system, the servo pattern is formed by continuously disposing a plurality of pairs of non-parallel magnetic stripes (also referred to as "servo stripes") in the longitudinal direction of the magnetic tape. In the present invention and the present specification, the term "timing-based servo pattern" refers to a servo pattern that enables head tracking in a timing-based servo system. As described above, the reason why the servo pattern is formed of a pair of non-parallel magnetic stripes is to indicate, to a servo signal reading element passing over the servo pattern, a passing position thereof. Specifically, the pair of magnetic stripes is formed such that an interval thereof continuously changes along a width direction of the magnetic tape, and the servo signal reading element reads the interval to thereby sense a relative position between the servo pattern and the servo signal reading element. Information on this relative position enables tracking on a data track. Accordingly, a plurality of servo tracks are usually set on the servo pattern along the width direction of the magnetic tape.

A servo band is formed of a servo pattern continuous in the longitudinal direction of the magnetic tape. A plurality of the servo bands are usually provided on the magnetic tape. For example, in an LTO tape, the number of the servo bands is five. Regions interposed between two adjacent servo bands are data bands. The data band is formed of a plurality of data tracks and each data track corresponds to each servo track.

Further, in one aspect, as shown in JP2004-318983A, information indicating a servo band number (referred to as "servo band identification (ID)" or "unique data band identification method (UDIM) information") is embedded in each servo band. This servo band ID is recorded by shifting a specific one of the plurality of pairs of the servo stripes in the servo band so that positions thereof are relatively displaced in the longitudinal direction of the magnetic tape. Specifically, a way of shifting the specific one of the plurality of pairs of servo stripes is changed for each servo band. Accordingly, the recorded servo band ID is unique for each servo band, and thus, the servo band can be uniquely specified only by reading one servo band with a servo signal reading element.

In a method of uniquely specifying the servo band, a staggered method as shown in ECMA-319 (June 2001) is used. In this staggered method, a group of pairs of non-parallel magnetic stripes (servo stripes) disposed continuously in plural in a longitudinal direction of the magnetic tape is recorded so as to be shifted in a longitudinal direction of the magnetic tape for each servo band. Since this combination of shifting methods between adjacent servo bands is unique throughout the magnetic tape, it is possible to uniquely specify a servo band in a case of reading a servo pattern with two servo signal reading elements.

As shown in ECMA-319 (June 2001), information indicating a position of the magnetic tape in the longitudinal direction (also referred to as "longitudinal position (LPOS) information") is usually embedded in each servo band. This LPOS information is also recorded by shifting the positions of the pair of servo stripes in the longitudinal direction of the magnetic tape, as the UDIM information. Note that, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding information in the servo band, it is possible to employ a method other than the above. For example, a predetermined code may be recorded by thinning out a predetermined pair from the group of pairs of servo stripes.

A head for forming a servo pattern is called a servo write head. The servo write head usually has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, 1 μm or less, 1 to 10 μm, 10 μm or more, and the like.

Before the servo pattern is formed on the magnetic tape, the magnetic tape is usually subjected to a demagnetization (erasing) treatment. This erasing treatment can be performed by applying a uniform magnetic field to the magnetic tape using a direct current magnet or an alternating current magnet. The erasing treatment includes direct current (DC) erasing and alternating current (AC) erasing. AC erasing is performed by gradually decreasing an intensity of the magnetic field while reversing a direction of the magnetic field applied to the magnetic tape. On the other hand, DC erasing is performed by applying a unidirectional magnetic field to the magnetic tape. As the DC erasing, there are two additional methods. A first method is horizontal DC erasing of applying a unidirectional magnetic field along a longitudinal direction of the magnetic tape. A second method is vertical DC erasing of applying a unidirectional magnetic field along a thickness direction of the magnetic tape. The erasing treatment may be performed on the entire magnetic tape or may be performed for each servo band of the magnetic tape.

A direction of the magnetic field of the servo pattern to be formed is determined according to a direction of the erasing. For example, in a case where the horizontal DC erasing is performed to the magnetic tape, the servo pattern is formed so that the direction of the magnetic field is opposite to the direction of the erasing. Therefore, an output of a servo signal obtained by reading the servo pattern can be increased. As shown in JP2012-53940A, in a case where the magnetic pattern is transferred to, using the gap, a magnetic tape that has been subjected to the vertical DC erasing, a servo signal obtained by reading the formed servo pattern has a monopolar pulse shape. On the other hand, in a case where a magnetic pattern is transferred to, using the gap, a magnetic tape that has been subjected to horizontal DC erasing, a servo signal obtained by reading the formed servo pattern has a bipolar pulse shape.

In one aspect, the dimension in the width direction of the magnetic tape can be controlled by acquiring dimension information in the width direction of the magnetic tape during running by using the servo signal and adjusting and changing the tension applied in the longitudinal direction of the magnetic tape according to the acquired dimension information. Such tension adjustment can contribute to suppressing a phenomenon that, during recording or reproduction, the magnetic head for recording or reproducing data deviates from a target track position due to width deformation of the magnetic tape and data is recorded or reproduced.

Magnetic Tape Cartridge

Another aspect of the present invention relates to a magnetic tape cartridge including the magnetic tape described above.

The details of the magnetic tape included in the above tape cartridge are as described above.

In the magnetic tape cartridge, generally, the magnetic tape is accommodated inside a cartridge body in a state of being wound around a reel. The reel is rotatably provided inside the cartridge body. As the magnetic tape cartridge, a single reel type magnetic tape cartridge having one reel inside the cartridge body and a dual reel type magnetic tape cartridge having two reels inside the cartridge body are widely used. In a case where the single reel type magnetic tape cartridge is mounted on a magnetic tape apparatus for recording and/or reproducing data on the magnetic tape, the magnetic tape is pulled out of the magnetic tape cartridge to be wound around the reel on the magnetic tape apparatus side. A magnetic head is disposed on a magnetic tape transportation path from the magnetic tape cartridge to a winding reel. Feeding and winding of the magnetic tape are performed between a reel (supply reel) on the magnetic tape cartridge side and a reel (winding reel) on the magnetic tape apparatus side. During this time, data is recorded and/or reproduced as the magnetic head and the magnetic layer surface of the magnetic tape come into contact with each other to be slid on each other. With respect to this, in the dual reel type magnetic tape cartridge, both reels of the supply reel and the winding reel are provided in the magnetic tape cartridge.

Magnetic Tape Apparatus

Still another aspect of the present invention relates to a magnetic tape apparatus including the magnetic tape described above. In the magnetic tape apparatus, recording of data on the magnetic tape and/or reproduction of data recorded on the magnetic tape can be performed, for example, as the magnetic layer surface of the magnetic tape and the magnetic head come into contact with each other to be slid on each other.

In the present invention and the present specification, the term "magnetic tape apparatus" means an apparatus capable of performing at least one of the recording of data on the magnetic tape or the reproduction of data recorded on the magnetic tape. Such an apparatus is generally called a drive. The magnetic tape apparatus may include a magnetic head. The magnetic head can be a recording head capable of performing the recording of data on the magnetic tape, and can also be a reproducing head capable of performing the reproduction of data recorded on the magnetic tape. In addition, in one aspect, the magnetic tape apparatus can include both a recording head and a reproducing head as separate magnetic heads. In another aspect, the magnetic head included in the magnetic tape apparatus may have a configuration in which both a recording element and a reproducing element are provided in one magnetic head. As the reproducing head, a magnetic head (MR head) including a magnetoresistive (MR) element capable of sensitively reading information recorded on the magnetic tape as a reproducing element is preferable. As the MR head, various well-known MR heads (for example, a giant magnetoresistive (GMR) head and a tunnel magnetoresistive (TMR)

head) can be used. In addition, the magnetic head which performs the recording of data and/or the reproduction of data may include a servo signal reading element. Alternatively, as a head other than the magnetic head which performs the recording of data and/or the reproduction of data, a magnetic head (servo head) comprising a servo signal reading element may be included in the magnetic tape apparatus. For example, a magnetic head that records data and/or reproduces recorded data (hereinafter also referred to as "recording and reproducing head") can include two servo signal reading elements, and the two servo signal reading elements can simultaneously read two adjacent servo bands with the data band interposed therebetween. One or a plurality of elements for data can be disposed between the two servo signal reading elements. An element for recording data (recording element) and an element for reproducing data (reproducing element) are collectively referred to as an "element for data".

In a case of recording data and/or reproducing recorded data, first, tracking using the servo signal can be performed. That is, by causing the servo signal reading element to follow a predetermined servo track, the element for data can be controlled to pass on the target data track. Displacement of the data track is performed by changing a servo track read by the servo signal reading element in a tape width direction.

The recording and reproducing head can also perform recording and/or reproduction with respect to other data bands. In this case, the servo signal reading element need only be displaced to a predetermined servo band using the above described UDIM information to start tracking for the servo band.

Figure 2:
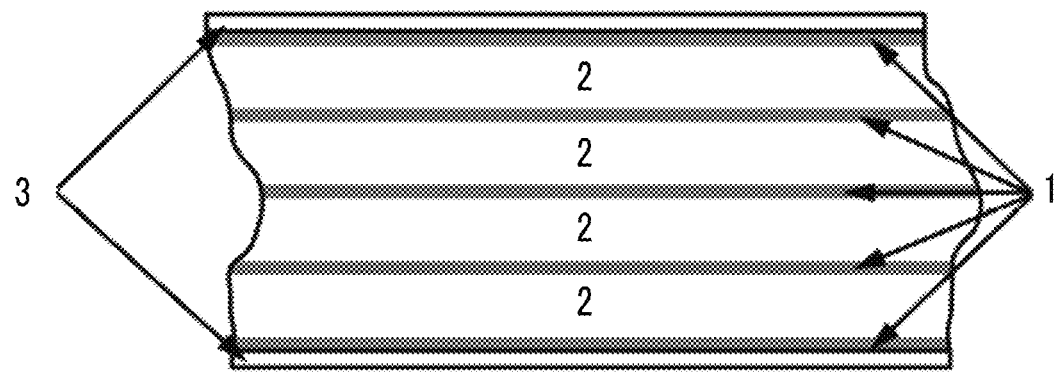
FIG. 2 shows an arrangement example of data bands and servo bands.
Figure 3:
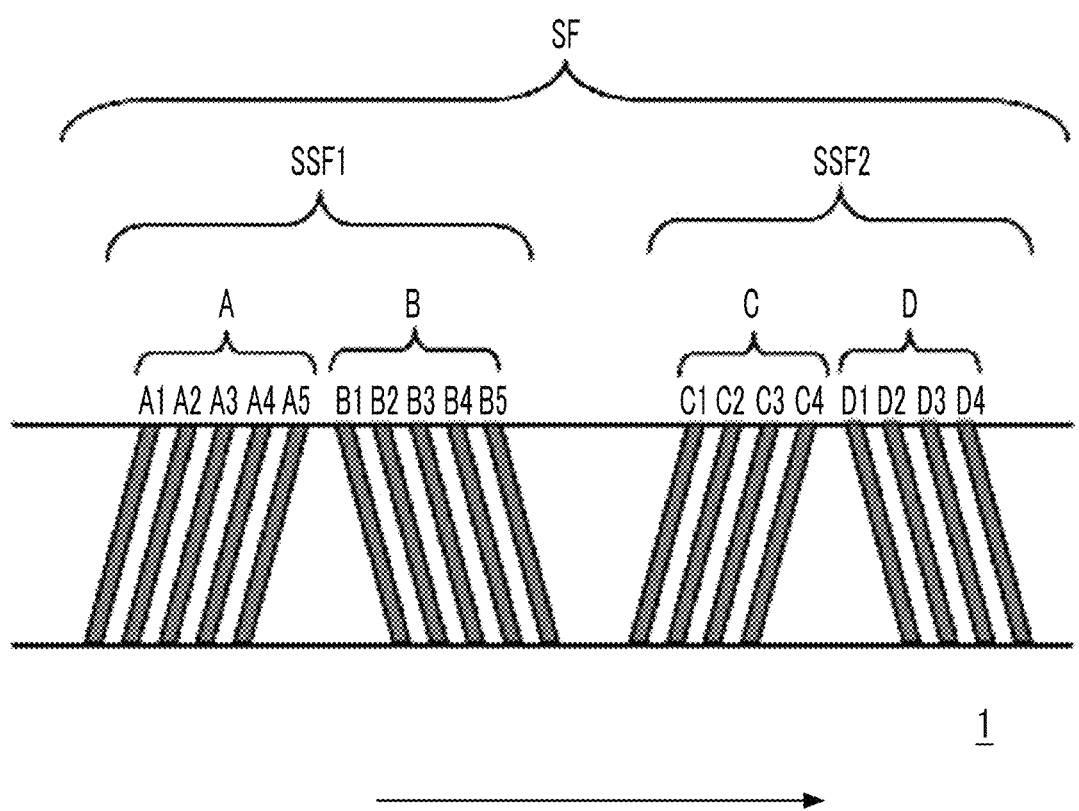
FIG. 3 shows an arrangement example of a servo pattern of a linear tape-open (LTO) Ultrium format tape.

FIG. 2 shows an arrangement example of data bands and servo bands. In FIG. 2, a plurality of servo bands 1 are disposed to be interposed between guide bands 3 in a magnetic layer of a magnetic tape MT. A plurality of regions 2 interposed between two servo bands are data bands. The servo pattern is a magnetization region, and is formed by magnetizing a specific region of the magnetic layer by the servo write head. A region magnetized by the servo write head (a position where the servo pattern is formed) is determined by the standard. For example, in an LTO Ultrium format tape which is based on a local standard, a plurality of servo patterns inclined with respect to a tape width direction as shown in FIG. 3 are formed on a servo band, in a case of manufacturing a magnetic tape. Specifically, in FIG. 3, a servo frame SF on the servo band 1 is composed of a servo sub-frame 1 (SSF1) and a servo sub-frame 2 (SSF2). The servo sub-frame 1 is composed of an A burst (in FIG. 3, reference numeral A) and a B burst (in FIG. 3, reference numeral B). The A burst is composed of servo patterns A1 to A5 and the B burst is composed of servo patterns B1 to B5. Meanwhile, the servo sub-frame 2 is composed of a C burst (in FIG. 3, reference numeral C) and a D burst (in FIG. 3, reference numeral D). The C burst is composed of servo patterns C1 to C4 and the D burst is composed of servo patterns D1 to D4. Such 18 servo patterns are arranged in the sub-frames in an array of 5, 5, 4, 4, as the sets of 5 servo patterns and 4 servo patterns, and are used for identifying the servo frames. FIG. 3 shows one servo frame for description. Note that, in practice, a plurality of the servo frames are arranged in the running direction in each servo band in the magnetic layer of the magnetic tape on which the head tracking of the timing-based servo system is performed. In FIG. 3, an arrow shows the running direction. For example, an LTO Ultrium format tape usually has 5000 or more servo frames per 1 m of tape length in each servo band of the magnetic layer.

In the magnetic tape apparatus, in one aspect, the magnetic tape is treated as a removable medium (so-called replaceable medium), and a magnetic tape cartridge accommodating the magnetic tape therein is inserted into the magnetic tape apparatus and taken out. In another aspect, the magnetic tape is not treated as a replaceable medium, the magnetic tape is wound around the reel of the magnetic tape apparatus comprising a magnetic head, and the magnetic tape is accommodated in the magnetic tape apparatus. In one aspect, in such a magnetic tape apparatus, the magnetic tape and the magnetic head can be accommodated in a sealed space in the magnetic tape apparatus. In the present invention and the present specification, the term "sealed space" refers to a space in which a degree of sealing evaluated by a dipping method (bombing method) using helium (He) specified in JIS Z 2331:2006 helium leakage test method is $10 \times 10^{-8}$ Pa·m$^3$/sec or less. The degree of sealing of the sealed space may be, for example, $5 \times 10^{-9}$ Pa·m$^3$/sec or more and $10 \times 10^{-8}$ Pa·m$^3$/sec or less, or may be less than the above range. In one aspect, the entire space in a housing can be the sealed space, and in another aspect, a part of the space in a housing can be the sealed space. The sealed space can be an internal space of the housing that covers the whole or a part of the magnetic tape apparatus. The material and shape of the housing are not particularly limited, and can be, for example, the same as the material and shape of the housing of a normal magnetic tape apparatus. As an example, metal, resin, or the like can be used as the material of the housing.

EXAMPLES

Hereinafter, one aspect of the present invention will be described based on Examples. Note that the present invention is not limited to the embodiments shown in Examples. "Parts" and "%" in the following description mean "parts by mass" and "mass %", unless otherwise specified. "eq" is an equivalent and is a unit that cannot be converted into an SI unit.

The following various steps and operations were performed in an environment of a temperature of 20° C.±25° C. and a relative humidity of 40% to 60%, unless otherwise noted.

In Table 2 described below, "BaFe" indicates hexagonal barium ferrite powder having an average particle size (average plate diameter) of 21 nm.

In Table 2 below, "SrFe" indicates a hexagonal strontium ferrite powder produced by the method described below, and "ε-iron oxide" indicates an ε-iron oxide powder produced by the method described below.

The average particle volume of the various ferromagnetic powders described below is a value obtained by the method described above. The various values related to the particle size of the various powders described below are also values obtained by the method described above.

The anisotropy constant Ku is a value obtained by the method described above regarding each ferromagnetic powder by using a vibrating sample magnetometer (manufactured by Toei Industry Co., Ltd.).

In addition, a mass magnetization σs is a value measured at a magnetic field intensity of 15 kOe using a vibrating sample magnetometer (manufactured by Toei Industry Co., Ltd.).

Method of Producing Ferromagnetic Powder

Method of Producing Hexagonal Strontium Ferrite Powder 1707 g of SrCO$_3$, 687 g of H$_3$BO$_3$, 1120 g of Fe$_2$O$_3$, 45 g of Al(OH)$_3$, 24 g of BaCO$_3$, 13 g of CaCO$_3$, and 235 g of Nd$_2$O$_3$ were weighed and mixed by a mixer to obtain a raw material mixture.

The obtained raw material mixture was melted in a platinum crucible at a melting temperature of 1390° C., and a hot water outlet provided at a bottom of the platinum crucible was heated while stirring a melt, and the melt was discharged in a rod shape at about 6 g/sec. Hot water was rolled and quenched by a pair of water-cooling rollers to manufacture an amorphous body.

280 g of the manufactured amorphous body was charged into an electric furnace, was heated to 635° C. (crystallization temperature) at a temperature rising rate of 3.5° C./min, and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 ml of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving treatment of a glass component, and then the crystallized product was sedimented by a centrifugal separator to be washed by repeatedly performing decantation and was dried in a heating furnace at an internal temperature of the furnace of 110° C. for 6 hours to obtain a hexagonal strontium ferrite powder.

Regarding the hexagonal strontium ferrite powder ("SrFe" in Table 2 below) obtained as described above, an average particle volume was 900 nm$^3$, an anisotropy constant Ku was $2.2 \times 10^5$ J/m$^3$, and a mass magnetization σs was 49 A·m$^2$/kg.

12 mg of a sample powder was taken from the hexagonal strontium ferrite powder obtained above, elemental analysis of the filtrated solution obtained by partially dissolving this sample powder under dissolution conditions illustrated above was performed by an ICP analyzer, and a surface layer portion content of a neodymium atom was determined.

Separately, 12 mg of a sample powder was taken from the hexagonal strontium ferrite powder obtained above, elemental analysis of the filtrated solution obtained by totally dissolving this sample powder under dissolution conditions illustrated above was performed by an ICP analyzer, and a bulk content of a neodymium atom was determined.

A content (bulk content) of a neodymium atom with respect to 100 at % of an iron atom in the hexagonal strontium ferrite powder obtained above was 2.9 at %. A surface layer portion content of a neodymium atom was 8.0 at %. It was confirmed that a ratio between a surface layer portion content and a bulk content, that is, "surface layer portion content/bulk content" was 2.8, and a neodymium atom was unevenly distributed in a surface layer of a particle.

The fact that the powder obtained above shows a crystal structure of hexagonal ferrite was confirmed by performing scanning with CuKα rays under conditions of a voltage of 45 kV and an intensity of 40 mA and measuring an X-ray diffraction pattern under the following conditions (X-ray diffraction analysis). The powder obtained above showed a crystal structure of hexagonal ferrite of a magnetoplumbite type (M type). A crystal phase detected by X-ray diffraction analysis was a single phase of a magnetoplumbite type.

PANalytical X'Pert Pro diffractometer, PIXcel detector
Soller slit of incident beam and diffracted beam: 0.017 radians
Fixed angle of dispersion slit: ¼ degrees
Mask: 10 mm
Anti-scattering slit: ¼ degrees
Measurement mode: continuous
Measurement time per stage: 3 seconds
Measurement speed: 0.017 degrees per second
Measurement step: 0.05 degrees Method of Producing ε-Iron Oxide Powder 8.3 g of iron(III) nitrate nonahydrate, 1.3 g of gallium(III) nitrate octahydrate, 190 mg of cobalt(II) nitrate hexahydrate, 150 mg of titanium(IV) sulfate, and 1.5 g of polyvinylpyrrolidone (PVP) were dissolved in 90 g of pure water, and while the dissolved product was stirred using a magnetic stirrer, 4.0 g of an aqueous ammonia solution having a concentration of 25% was added to the dissolved product under a condition of an atmosphere temperature of 25° C. in an air atmosphere, and the dissolved product was stirred for 2 hours while maintaining a temperature condition of the atmosphere temperature of 25° C. A citric acid solution obtained by dissolving 1 g of citric acid in 9 g of pure water was added to the obtained solution, and the mixture was stirred for 1 hour. The powder sedimented after stirring was collected by centrifugal separation, was washed with pure water, and was dried in a heating furnace at a furnace temperature of 80° C.

800 g of pure water was added to the dried powder, and the powder was dispersed again in water to obtain dispersion liquid. The obtained dispersion liquid was heated to a liquid temperature of 50° C., and 40 g of an aqueous ammonia solution having a concentration of 25% was dropwise added with stirring. After stirring for 1 hour while maintaining the temperature at 50° C., 14 mL of tetraethoxysilane (TEOS) was dropwise added and was stirred for 24 hours. A powder sedimented by adding 50 g of ammonium sulfate to the obtained reaction solution was collected by centrifugal separation, was washed with pure water, and was dried in a heating furnace at a furnace temperature of 80° C. for 24 hours to obtain a ferromagnetic powder precursor.

The obtained ferromagnetic powder precursor was loaded into a heating furnace at a furnace temperature of 1000° C. in an air atmosphere and was heat-treated for 4 hours.

The heat-treated ferromagnetic powder precursor was put into an aqueous solution of 4 mol/L sodium hydroxide (NaOH), and the liquid temperature was maintained at 70° C. and was stirred for 24 hours, whereby a silicic acid compound as an impurity was removed from the heat-treated ferromagnetic powder precursor.

Thereafter, the ferromagnetic powder from which the silicic acid compound was removed was collected by centrifugal separation, and was washed with pure water to obtain a ferromagnetic powder.

The composition of the obtained ferromagnetic powder that was confirmed by high-frequency inductively coupled plasma-optical emission spectrometry (ICP-OES) has Ga, Co, and a Ti substitution type ε-iron oxide (ε-Ga$_{0.28}$Co$_{0.05}$Ti$_{0.05}$Fe$_{1.62}$O$_3$). In addition, X-ray diffraction analysis is performed under the same condition as that described above for the manufacturing method of hexagonal strontium ferrite powder, and from a peak of an X-ray diffraction pattern, it is checked that the obtained ferromagnetic powder does not include α-phase and γ-phase crystal structures, and has a single-phase and ε-phase crystal structure (ε-iron oxide crystal structure).

Regarding the obtained ε-iron oxide powder ("ε-iron oxide" in Table 2 below), an average particle volume was 750 nm$^3$, an anisotropy constant Ku was $1.2 \times 10^5$ J/m$^3$, and a mass magnetization σs was 16 A·m$^2$/kg.

Fluorine-Containing Compound

Polymer (1-1)

16.25 g of n-propyl alcohol, 16.25 g of cyclohexanone, and 20.00 g of Novec7200 (manufactured by 3M Company) were charged into a 300 ml three-neck flask comprising a stirrer, a thermometer, a reflux condenser, and a nitrogen gas introduction pipe, and the liquid temperature was raised to 97° C. Next, a mixed solution containing 9.00 g (5.0 mmol) of Fluorolink MD700 (manufactured by Solvay), 1.00 g (3.8 mmol) of 3-[[2-(acryloyloxy)ethyl]dimethylammonio]propane-1-sulfonic acid, 7.00 g of n-propyl alcohol, 5.50 g of cyclohexanone, 15.00 g of Novec7200, and 10.00 g (43.4 mmol) of polymerization initiator V-601 (manufactured by Fujifilm Wako Pure Chemical Corporation) was added dropwise at a constant rate such that the dropwise addition was completed in 60 minutes. After completion of the dropwise addition, stirring was continued for another 6 hours to obtain 82.9 g of a polymer solution of the polymer (1-1) shown below. The concentration of solid contents of the polymer solution was 13.2%. In the following, a and b are values shown in Table 1.

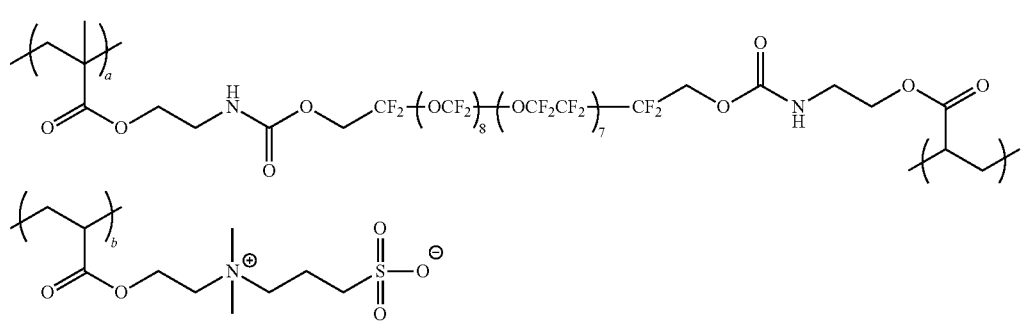

(1-1)

Polymers (1-2) to (1-9), (1-12), (1-15), and (1-20)

Polymers (1-2) to (1-9), (1-12), (1-15), and (1-20) having the following structures were synthesized by the same method as described for the polymer (1-1), with the items shown in Table 1 changed as shown in Table 1. In Table 1, polymers (1-8)(a), (1-8)(b), and (1-8)(c) are polymers (1-8) having different composition ratios.

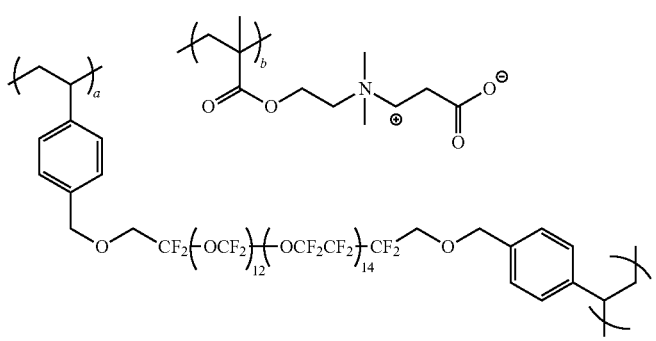

(1-2)

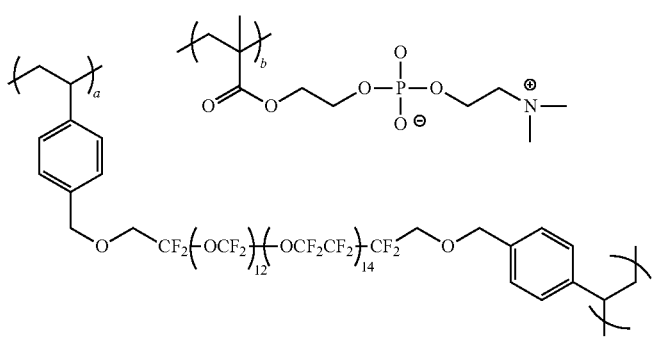

(1-3)

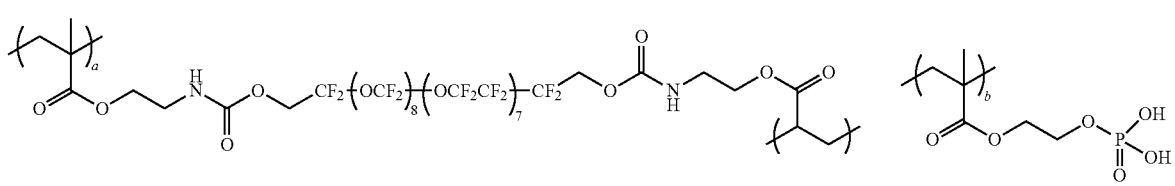

(1-4)

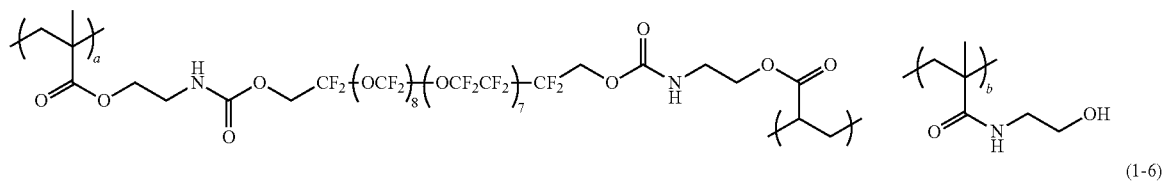

(1-5)

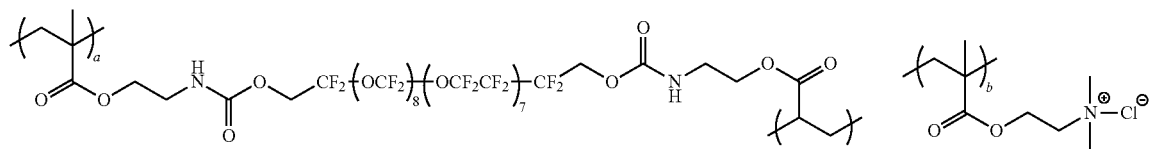

(1-6)

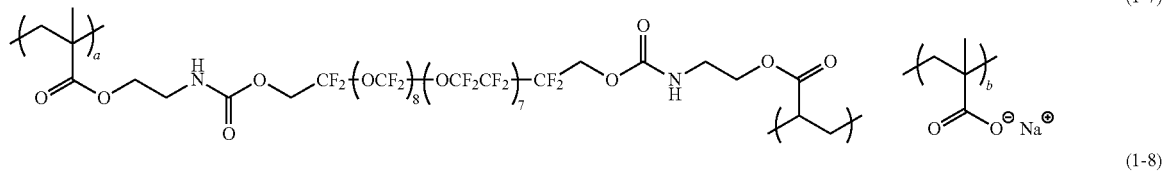

(1-7)

(1-8)

TABLE 1

| Polymer | Composition ratio (content (unit: mass %)) a | b | Polymerization initiator Type | mol % (based on monomer) |
|---|---|---|---|---|
| (1-1) | 90 | 10 | V-601 | 493 |
| (1-2) | 70 | 30 | V-601 | 400 |
| (1-3) | 65 | 35 | V-601 | 300 |
| (1-4) | 80 | 20 | V-601 | 220 |
| (1-5) | 70 | 30 | V-601 | 50 |
| (1-6) | 32 | 68 | V-601 | 350 |
| (1-7) | 68 | 32 | AMBN | 420 |
| (1-8)(a) | 85 | 15 | V-601 | 265 |
| (1-8)(b) | 15 | 85 | V-601 | 265 |
| (1-8)(c) | 40 | 60 | V-601 | 265 |
| (1-9) | 90 | 10 | V-601 | 382 |
| (1-12) | 70 | 30 | V-601 | 141 |
| (1-15) | 70 | 30 | V-601 | 225 |
| (1-20) | 50 | 50 | V-601 | 305 |

V-601: dimethyl 2,2'-azobis(isobutyrate)
AMBN: 2,2'-azobis(2-methylbutyronitrile)

(1) Preparation of Alumina Dispersion 3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a polyester polyurethane resin having a $SO_3Na$ group as a polar group (UR-4800 manufactured by Toyobo Co., Ltd. (amount of a polar group: 80 meq/kg)), and 570.0 parts of a mixed solution of methyl ethyl ketone and cyclohexanone at 1:1 (mass ratio) as a solvent were mixed with respect to 100.0 parts of an alumina powder (HIT-80 manufactured by Sumitomo Chemical Co., Ltd.) having a pregelatinization ratio of about 65% and a Brunauer-Emmett-Teller (BET) specific surface area of 20 $m^2/g$, and dispersed in the presence of zirconia beads by a paint shaker for 5 hours. After the dispersion, the dispersion liquid and the beads were separated by a mesh and an alumina dispersion was obtained.

(2) Formulation of Magnetic Layer Forming Composition

Magnetic liquid

| | |
|---|---|
| Ferromagnetic powder (Type: see Table 2) | 100.0 parts |
| $SO_3Na$ group-containing polyurethane resin | 14.0 parts |
| Weight-average molecular weight: 70,000, | |
| $SO_3Na$ group: 0.2 meq/g | |
| Cyclohexanone | 150.0 parts |
| Methyl ethyl ketone | 150.0 parts |

Abrasive Liquid

| | |
|---|---|
| Alumina dispersion prepared in the section (1) | 6.0 parts |

Protrusion Forming Agent Liquid

| | |
|---|---|
| Protrusion forming agent | 2.0 parts |
| Type: colloidal silica (average particle size: 120 nm) | |
| Methyl ethyl ketone | 1.4 parts |

Other Components

| | |
|---|---|
| Stearic acid | 2.0 parts |
| Stearic acid amide | 0.2 parts |
| Butyl stearate | 2.0 parts |
| Polyisocyanate (CORONATE (registered product) L manufactured by Tosoh Corporation) | 2.5 parts |

Finishing Additive Solvent

| | |
|---|---|
| Cyclohexanone | 200.0 parts |
| Methyl ethyl ketone | 200.0 parts |

(3) Formulation of Lower Non-Magnetic Layer Forming Composition

| | |
|---|---|
| Carbon black (average particle size: 20 nm) | 100.0 parts |
| Trioctylamine | 4.0 parts |
| Vinyl chloride resin | 12.0 parts |
| Stearic acid | 1.5 parts |

(3) Formulation of Lower Non-Magnetic Layer Forming Composition

| | |
|---|---|
| Stearic acid amide | 0.3 parts |
| Butyl stearate | 1.5 parts |
| Cyclohexanone | 200.0 parts |
| Methyl ethyl ketone | 510.0 parts |

(4) Formulation of Upper Non-Magnetic Layer Forming Composition

| | |
|---|---|
| Non-magnetic inorganic powder: α-iron oxide<br>Average particle size (average long axis length): 30 nm<br>Average short axis length: 15 nm<br>Acicular ratio: 2.0 | 100.0 parts |
| SO$_3$Na group-containing polyurethane resin<br>Weight-average molecular weight: 70,000,<br>SO$_3$Na group: 0.2 meq/g | 18.0 parts |
| Stearic acid | 1.0 part |
| Cyclohexanone | 300.0 parts |
| Methyl ethyl ketone | 300.0 parts |

(5) Formulation of Back Coating Layer Forming Composition

| | |
|---|---|
| Carbon black<br>Dibutyl phthalate (DBP) oil absorption amount: 74 cm$^3$/100 g | 100.0 parts |
| Nitrocellulose | 27.0 parts |
| Polyester polyurethane resin containing sulfonic acid group and/or salt thereof | 62.0 parts |
| Polyester resin | 4.0 parts |
| Alumina powder (BET specific surface area: 17 m$^2$/g) | 0.6 parts |
| Methyl ethyl ketone | 600.0 parts |
| Toluene | 600.0 parts |
| Polyisocyanate (CORONATE (registered product) L manufactured by Tosoh Corporation) | 15.0 parts |

(6) Preparation of Each Layer Forming Composition

The magnetic layer forming composition was prepared by the following method. The above magnetic liquid was prepared by dispersing the above components for 24 hours (beads-dispersion) using a batch type vertical sand mill. As dispersion beads, zirconia beads having a bead diameter of 0.5 mm were used. Using the sand mill, the prepared magnetic liquid was mixed with the abrasive liquid, and other components (protrusion forming agent liquid, other components, and finishing additive solvent) and the mixture was beads-dispersed for 5 minutes, and then the treatment (ultrasonic dispersion) was performed on the mixture for 0.5 minutes by a batch type ultrasonic apparatus (20 kHz, 300 W). Thereafter, filtration was performed using a filter having a pore diameter of 0.5 μm to prepare a magnetic layer forming composition.

For each of the lower non-magnetic layer forming composition and the upper non-magnetic layer forming composition, the above components were kneaded by an open kneader for 240 minutes and then dispersed by a sand mill. As the dispersion conditions of each non-magnetic layer forming composition, a dispersion time was 24 hours, and zirconia beads having a bead diameter of 0.1 mm were used as dispersion beads. 4.0 parts of polyisocyanate (CORONATE 3041 manufactured by Tosoh Corporation) was added to the dispersion liquid obtained, and the mixture was further stirred and mixed for 20 minutes, and then filtered using a filter having a pore diameter of 0.5 μm. Based on the above, the lower non-magnetic layer forming composition and the upper non-magnetic layer forming composition were prepared.

The back coating layer forming composition was prepared by the following method. The above components excluding polyisocyanate were introduced into a dissolver stirrer, stirred at a circumferential speed of 10 m/sec for 30 minutes, and then subjected to a dispersion treatment by a horizontal beads mill dispersing device. After that, polyisocyanate was added, and stirred and mixed by a dissolver stirrer, and a back coating layer forming composition was prepared.

(7) Manufacturing of Magnetic Tape and Magnetic Tape Cartridge

The lower non-magnetic layer forming composition was applied onto a surface of a biaxially stretched support made of polyethylene terephthalate having a thickness of 4.1 μm so that the thickness after drying was as shown in Table 2, and was dried in an environment of an atmosphere temperature of 100° C., to form a lower non-magnetic layer. The upper non-magnetic layer forming composition was applied onto the lower non-magnetic layer so that the thickness after drying was as shown in Table 2, and was dried in an environment of an atmosphere temperature of 100° C., to form an upper non-magnetic layer.

Next, the magnetic layer forming composition prepared in the section (6) was applied onto the upper non-magnetic layer so that the thickness after drying was 0.1 μm to form a coating layer. After that, while the coating layer of the magnetic layer forming composition is in an undried state, a vertical alignment treatment was performed by applying a magnetic field having a magnetic field intensity of 0.3 T in a direction perpendicular to a surface of the coating layer, and then the surface of the coating layer was dried. Thereby, a magnetic layer was formed.

After that, the back coating layer forming composition prepared in the section (6) was applied onto a surface of the support opposite to the surface on which the non-magnetic layer and the magnetic layer are formed and was dried so that the thickness after drying was 0.3 μm, and thus, a back coating layer was formed.

After that, a surface smoothing treatment (calendering treatment) was performed once using a calender roll formed of only metal rolls at a speed of 100 m/min, a linear pressure of 300 kg/cm, and a calender temperature of 90° C. (surface temperature of calender roll).

After the calendering treatment, the fluorine-containing compound shown in Table 2 was mixed with a solvent (using a mixed solvent of cyclohexanone and methyl ethyl ketone 1:1 (mass ratio)) to prepare a coating liquid having a fluorine-containing compound concentration of 0.1%. This coating liquid was applied onto the magnetic layer surface by a wire bar with an amount in which the coating amount of the fluorine-containing compound was as shown in Table 2, and dried.

After the overcoating, the heat treatment was performed by storing the long magnetic tape original roll in a heat treatment furnace at the atmosphere temperature of 70° C. (heat treatment time: 36 hours). After the heat treatment, the resultant was slit to have ½ inches width to obtain a magnetic tape. A servo signal was recorded on the magnetic layer of the obtained magnetic tape by a commercially available servo writer to obtain a magnetic tape having a data band, a servo band, and a guide band in an arrangement according to a linear tape-open (LTO) Ultrium format and having a servo pattern (timing-based servo pattern) in an arrangement and a shape according to the LTO Ultrium format on the servo band. The servo pattern thus formed is a servo pattern according to the description in Japanese industrial standards (JIS) X6175:2006 and Standard ECMA-319 (June 2001). The total number of servo bands is 5, and the total number of data bands is 4.

The magnetic tape (length of 970 m) after forming the servo pattern was wound around the winding core for heat treatment, and the heat treatment is performed while being wound around the winding core. As the winding core for heat treatment, a solid core member (outer diameter: 50 mm) formed of a resin and having the bending elastic modulus of 0.8 GPa was used, and the tension during winding was set as 0.6 N. The heat treatment was performed at a heat treatment temperature of 50° C. for 5 hours. The weight-basis absolute humidity in the atmosphere in which the heat treatment was performed was 10 g/kg Dry air.

After the heat treatment, the magnetic tape and the winding core for heat treatment were sufficiently cooled, the magnetic tape was removed from the winding core for heat treatment and wound around the temporary winding core, and then, the magnetic tape having the final product length (960 m) was wound around the reel (reel outer diameter: 44 mm) of the magnetic tape cartridge (LTO Ultrium 7 data cartridge) from the temporary winding core. The remaining length of 10 m was cut out and the leader tape based on section 9 of Standard European Computer Manufacturers Association (ECMA)-319 (June 2001) Section 3 was bonded to the terminal of the cut side by using a commercially available splicing tape. As the temporary winding core, a solid core member made of the same material and having the same outer diameter as the winding core for heat treatment was used, and the tension during winding was set as 0.6 N.

As described above, a single reel type magnetic tape cartridge in which a magnetic tape having a length of 960 m was wound around a reel was manufactured.

Examples 2 and 3

A magnetic tape and a magnetic tape cartridge were manufactured by the method described in Example 1 except that the overcoating was performed with an amount in which the coating amount of the fluorine-containing compound was as shown in Table 2.

Examples 4 to 10 and 15 to 20 and Comparative Example 2

A magnetic tape and a magnetic tape cartridge were manufactured by the method described in Example 1 except that the fluorine-containing compound was changed to that shown in Table 2.

Example 11

A magnetic tape and a magnetic tape cartridge were manufactured by the method described in Example 1 except that the ferromagnetic powder was changed to that shown in Table 2.

Example 12

A magnetic tape and a magnetic tape cartridge were manufactured by the method described in Example 1 except that only one non-magnetic layer was formed as described below.

| Formulation of Non-Magnetic Layer Forming Composition | |
|---|---|
| Non-magnetic inorganic powder: α-iron oxide | 100.0 parts |
| Average particle size (average long axis length): 150 nm | |
| Acicular ratio: 7.0 | |
| BET specific surface area: 52 m$^2$/g | |
| Carbon black | 20.0 parts |
| Average particle size: 20 nm | |

| Formulation of Non-Magnetic Layer Forming Composition | |
|---|---|
| SO$_3$Na group-containing polyurethane resin | 18.0 parts |
| Weight-average molecular weight: 70,000, | |
| SO$_3$Na group: 0.2 meq/g | |
| Stearic acid | 2.0 parts |
| Stearic acid amide | 0.2 parts |
| Butyl stearate | 2.0 parts |
| Cyclohexanone | 300.0 parts |
| Methyl ethyl ketone | 300.0 parts |

A non-magnetic layer forming composition was prepared by the following method. The components described above excluding the lubricant (stearic acid, stearic acid amide, and butyl stearate) were kneaded and diluted by an open kneader, and subjected to a dispersion treatment by a horizontal beads mill dispersing device. After that, the lubricant (stearic acid, stearic acid amide, and butyl stearate) was added into the obtained dispersion liquid and stirred and mixed by a dissolver stirrer to prepare a non-magnetic layer forming composition.

The non-magnetic layer forming composition prepared in the above section was applied onto a surface of a biaxially stretched support made of polyethylene terephthalate having a thickness of 4.1 μm so that the thickness after drying was as shown in Table 2 and was dried to form one non-magnetic layer.

Example 13

A magnetic tape and a magnetic tape cartridge were manufactured by the method described in Example 12 except that the ferromagnetic powder was changed to that shown in Table 2.

Example 14

A magnetic tape and a magnetic tape cartridge were manufactured by the same method described in Example 1 except that 0.5 parts by mass of the fluorine-containing compound shown in Table 2 with respect to 100.0 parts by mass of the ferromagnetic powder was added to the magnetic layer forming composition, and that the overcoating of the coating liquid including the fluorine-containing compound was not performed.

Comparative Example 1

A magnetic tape and a magnetic tape cartridge were manufactured by the method described in Example 1 except that the overcoating was performed with an amount in which the overcoating of the coating liquid including the fluorine-containing compound was not performed.

For each of the examples and comparative examples, two magnetic tape cartridges were manufactured, one used to measure the water contact angle for obtaining the following ratio θr, and the other used to evaluate the electromagnetic conversion characteristics described below.

Ratio θr

A tape sample having a length of 5 cm and a tape sample having a length of 100 m were cut out from randomly selected positions in the longitudinal direction of each magnetic tape of the examples and comparative examples. For the tape sample having a length of 5 cm, a water contact angle $θ_{before}$ was obtained without sliding on the magnetic head. The tape sample having a length of 100 m was attached as described above to a reel tester having ½ inches to which the recording and reproducing head mounted on an LTO 8 tape drive manufactured by IBM Corporation was fixed, and slid on a magnetic head (LTO 8 head) in an environment of an atmosphere temperature of 23° C.±1° C. and a relative humidity of 50% under the running conditions described above. A tape sample having a length of 5 cm was cut out from a randomly selected position of the tape sample after the sliding, and a water contact angle $\theta_{after}$ was obtained in this tape sample.

The water contact angle was measured on the magnetic layer surface of the tape sample by the following method by using a contact angle measuring device (contact angle measurement device DropMaster700 manufactured by Kyowa Interface Science Co., Ltd.).

The tape sample was placed on a slide glass so that the back coating layer surface was in contact with a slide glass surface. 2.0 µl of a measurement liquid (water) was added dropwise onto the surface of the tape sample (magnetic layer surface), and after visually confirming that the dropped liquid formed stable liquid droplets, a liquid droplet image was analyzed by a contact angle analysis software FAMAS attached to the contact angle measuring device, and the contact angle of the liquid droplet with the sample piece was measured. The contact angle was calculated by a θ/2 method, and an arithmetic average of values obtained by performing measurement at 6 different parts on the magnetic layer surface for one tape sample was set as the water contact angle $\theta_{before}$ or $\theta_{after}$. The measurement was performed in an environment of an atmosphere temperature of 25° C. and a relative humidity of 50%, and the contact angle was obtained under the following analysis conditions. The ratio θr was calculated from $\theta_{before}$ and $\theta_{after}$ obtained in this way.

Method: Liquid droplet method (θ/2 method)
Droplet landing recognition: automatic
Droplet landing recognition line (distance from needle tip): 50 dots
Algorithm: automatic
Image mode: frame
Threshold hold level: automatic In Comparative Example 1, the friction during sliding between the magnetic layer surface and the magnetic head was too high to repeatedly slide the tape sample and the magnetic head on each other. Therefore, the ratio θr could not be obtained for Comparative Example 1 (indicated as "–" in Table 2).

Evaluation of Electromagnetic Conversion Characteristics in Repeated Running

The following evaluations were performed in an environment of an atmosphere temperature of 23° C.±1° C. and a relative humidity of 50%.

For each of the examples and comparative examples, the tape sample having a length of 100 m cut out from a randomly selected position in the longitudinal direction of the magnetic tape taken out from the magnetic tape cartridge was attached as described above to a reel tester having ½ inches to which the recording and reproducing head mounted on an LTO 8 tape drive manufactured by IBM Corporation was fixed, and data was recorded and reproduced. As the running conditions in a case of recording and reproduction, the running conditions described above for the sliding on the magnetic head performed to obtain the ratio θr were employed.

The recording was performed at a linear recording density of 300 kfci, the reproduction output during reproduction was measured, and a signal-to-noise-ratio (SNR) was obtained as a signal-to-noise-ratio (ratio of the reproduction output to noise). The unit kfci is a unit of a linear recording density (cannot be converted into an SI unit system).

A difference between the SNR in a case of recording and reproducing at the 1st single pass and the SNR in a case of recording and reproducing at the 20,000th single pass (SNR at the 20,000th single pass—SNR at the 1st single pass) was calculated. The calculated value is shown in the "SNR decrease" column in Table 2.

In Comparative Example 1, the friction during sliding between the magnetic layer surface and the magnetic head was too high to repeatedly run the magnetic tape. Therefore, the SNR at the 20,000th single pass could not be obtained (indicated as "not measurable" in Table 2).

The above results are shown in Table 2.

TABLE 2

| | Ferromagnetic powde | Fluorine-containing compound | | | Lower non-magnetic layer Non-magnetic powder |
|---|---|---|---|---|---|
| | | Type | Coating amount (mg/m²) | Method | |
| Example 1 | SrFe | Polymer (1-8)(a) | 11 | Overcoating | Carbon black |
| Example 2 | SrFe | Polymer (1-8)(a) | 22 | Overcoating | Carbon black |
| Example 3 | SrFe | Polymer (1-8)(a) | 1 | Overcoating | Carbon black |
| Example 4 | SrFe | Polymer (1-1) | 11 | Overcoating | Carbon black |
| Example 5 | SrFe | Polymer (1-2) | 11 | Overcoating | Carbon black |
| Example 6 | SrFe | Polymer (1-3) | 11 | Overcoating | Carbon black |
| Example 7 | SrFe | Polymer (1-4) | 11 | Overcoating | Carbon black |
| Example 8 | SrFe | Polymer (1-5) | 11 | Overcoating | Carbon black |
| Example 9 | SrFe | Polymer (1-6) | 11 | Overcoating | Carbon black |
| Example 10 | SrFe | Polymer (1-7) | 11 | Overcoating | Carbon black |
| Example 11 | ε-Iron oxide | Polymer (1-8)(a) | 11 | Overcoating | Carbon black |
| Example 12 | SrFe | Polymer (1-8)(a) | 11 | Overcoating | Carbon black/α-iron oxide |
| Example 13 | BaFe | Polymer (1-8)(a) | 11 | Overcoating | Carbon black/α-iron oxide |
| Example 14 | SrFe | Polymer (1-8)(a) | — | Added to magnetic layer forming composition | Carbon black |
| Example 15 | SrFe | Polymer (1-8)(b) | 11 | Overcoating | Carbon black |
| Example 16 | SrFe | Polymer (1-8)(c) | 11 | Overcoating | Carbon black |
| Example 17 | SrFe | Polymer (1-9) | 11 | Overcoating | Carbon black |
| Example 18 | SrFe | Polymer (1-12) | 11 | Overcoating | Carbon black |
| Example 19 | SrFe | Polymer (1-15) | 11 | Overcoating | Carbon black |
| Example 20 | SrFe | Polymer (1-20) | 11 | Overcoating | Carbon black |

TABLE 2-continued

| | | | | | |
|---|---|---|---|---|---|
| Comparative Example 1 | SrFe | — | — | — | Carbon black |
| Comparative Example 2 | SrFe | Lubricant of Example A1 shown in Table 3 of JP2006-188596A | 11 | | Overcoating |

| | Lower non-magnetic layer Thickness | Upper non-magnetic layer | | | SNR decrease (dB) |
|---|---|---|---|---|---|
| | | Non-magnetic powder | Thickness | θr | |
| Example 1 | 0.15 μm | α-Iron oxide | 0.15 μm | 0.98 | −0.1 |
| Example 2 | 0.15 μm | α-Iron oxide | 0.15 μm | 0.95 | −0.1 |
| Example 3 | 0.15 μm | α-Iron oxide | 0.15 μm | 0.79 | −3.0 |
| Example 4 | 0.15 μm | α-Iron oxide | 0.15 μm | 0.88 | −1.5 |
| Example 5 | 0.15 μm | α-Iron oxide | 0.15 μm | 0.84 | −1.9 |
| Example 6 | 0.15 μm | α-Iron oxide | 0.15 μm | 0.83 | −2.0 |
| Example 7 | 0.15 μm | α-Iron oxide | 0.15 μm | 0.86 | −1.2 |
| Example 8 | 0.15 μm | α-Iron oxide | 0.15 μm | 0.77 | −4.0 |
| Example 9 | 0.15 μm | α-Iron oxide | 0.15 μm | 0.82 | −2.4 |
| Example 10 | 0.15 μm | α-Iron oxide | 0.15 μm | 0.81 | −2.8 |
| Example 11 | 0.15 μm | α-Iron oxide | 0.15 μm | 0.89 | −0.5 |
| Example 12 | 0.70 μm | — | — | 0.76 | −4.6 |
| Example 13 | 0.70 μm | — | — | 0.72 | −4.8 |
| Example 14 | 0.15 μm | α-Iron oxide α-Iron oxide | 0.15 μm | 0.88 | −1.1 |
| Example 15 | 0.15 μm | α-Iron oxide | 0.15 μm | 0.87 | −1.0 |
| Example 16 | 0.15 μm | α-Iron oxide | 0.15 μm | 0.92 | −0.8 |
| Example 17 | 0.15 μm | α-Iron oxide | 0.15 μm | 0.90 | −0.3 |
| Example 18 | 0.15 μm | α-Iron oxide | 0.15 μm | 0.76 | −4.1 |
| Example 19 | 0.15 μm | α-Iron oxide | 0.15 μm | 0.78 | −4.2 |
| Example 20 | 0.15 μm | α-Iron oxide | 0.15 μm | 0.98 | −0.1 |
| Comparative Example 1 | 0.15 μm | α-Iron oxide | 0.15 μm | — | Not measurable |
| Comparative Example 2 | 0.15 μm | α-Iron oxide | 0.15 μm | 0.68 | −5.2 |

As shown in Table 2, in Comparative Example 2, the SNR at the 20,000th single pass decreased by more than 5.0 dB with respect to the SNR at the 1st single pass, and deterioration in electromagnetic conversion characteristics after repeated running were significantly was remarkable.

On the other hand, in Examples 1 to 20, the SNR decrease after repeated running was suppressed as compared with Comparative Example 2. From this result, it can be confirmed that the magnetic tapes of Examples 1 to 20 are magnetic tapes having little deterioration in electromagnetic conversion characteristics even after repeated running.

One aspect of the present invention is useful in the technical field of a data storage magnetic tape.

What is claimed is:

1. A magnetic tape comprising:
a non-magnetic support; and
a magnetic layer including a ferromagnetic powder,
wherein a fluorine-containing compound is included in a portion on the non-magnetic support on a magnetic layer side, and
a ratio θr of a water contact angle ($\theta_{after}$) measured on a surface of the magnetic layer after sliding on a magnetic head to a water contact angle ($\theta_{before}$) measured on the surface of the magnetic layer before sliding on the magnetic head is 0.70 or more,
wherein the water contact angle is measured as follows:
a tape sample having any length enough to measure the water contact angle and a tape sample having a length of 100 m are cut out from any position in the longitudinal direction of the same magnetic tape; for the tape sample having any length, a water contact angle $\theta_{before}$ is obtained without sliding on the magnetic head; for the tape sample having a length of 100 m, a water contact angle $\theta_{after}$ is obtained after sliding on the magnetic head; the sliding between the magnetic tape and the magnetic head is performed by a reel tester at a running speed of 4 m/sec and a tension applied in longitudinal direction of the magnetic tape of 100 gf, in an environment of an atmosphere temperature of 23° C.±1° C. and a relative humidity of 50%; the water contact angle is an arithmetic average of values obtained by measuring the tape sample to be measured at six different locations of the magnetic layer surface by a θ/2 method in a measurement environment of an atmosphere temperature of 25° C. and a relative humidity of 50%, and the fluorine-containing compound is one or more fluorine-containing polymers, the fluorine-containing polymer being a polymer having a branched structure that includes a repeating unit represented by General Formula (1) and at least one repeating unit selected from the group consisting of a repeating unit represented by General Formula (2) and a repeating unit represented by General Formula (3):

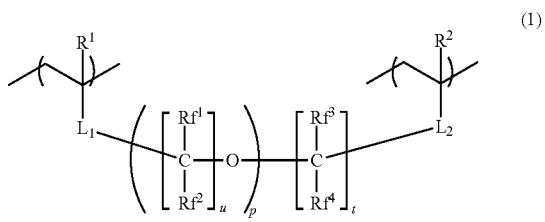

(1)

in General Formula (1), $R^1$ and $R^2$ each independently represent a hydrogen atom or a methyl group, $L^1$ and $L^2$ each independently represent a divalent linking group, $Rf^1$, $Rf^2$, $Rf^3$, and $Rf^4$ each independently represent a fluorine atom or a perfluoroalkyl group, u represents an integer of 1 or more, p represents an integer of 2 or more, t represents an integer of 0 or more, a plurality of $Rf^1$'s may be the same as or different from each other, a plurality of $Rf^2$'s may be the same as or different from each other, in a case where there are a plurality of $Rf^3$'s, the plurality of $Rf^3$'s may be the same as or different from each other, in a case where there are a plurality of $Rf^4$'s, the plurality of $Rf^4$'s may be the same as or different from each other,

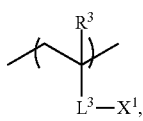

(2)

in General Formula (2), $R^3$ represents a hydrogen atom or a methyl group, $L^3$ represents a single bond or a divalent linking group, $X^1$ represents —OH, —COOH, —PO$_3$H, {—OP(=O)(OH)$_2$}, —OM$^1$, —CO$_2$M$^1$, —SO$_3$M$^1$, —NT$^1$T$^2$, an epoxy group, an alicyclic epoxy group, an oxazoline group, —NG$^1$G$^2$G$^3$E$^1$, or a group having a betaine structure, $M^1$ represents alkali metal, alkaline earth metal, Mg, Al, or $Q^1Q^2Q^3Q^4N^+$, $Q^1$, $Q^2$, $Q^3$, and $Q^4$ each independently represent a hydrogen atom or an alkyl group having 1 to 20 carbon atoms, $T^1$ and $T^2$ each independently represent a hydrogen atom, an alkyl group having 1 to 20 carbon atoms, or an alkoxy group having 1 to 20 carbon atoms, $T^1$ and $T^2$ may be bonded, $E^1$ represents an anion, $G^1$, $G^2$, and $G^3$ each independently represent a hydrogen atom or an alkyl group having 1 to 20 carbon atom,

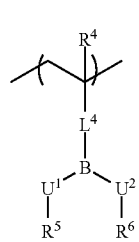

(3)

in General Formula (3), $R^4$ represents a hydrogen atom, a fluorine atom, a chlorine atom, or an alkyl group having 1 to 20 carbon atoms, $U^1$ and $U^2$ each independently represent —O—, —S—, —COO—, —OCO—, —CONH—, —NHCOO—, or NH—

$R^5$ and $R^6$ each independently represent a hydrogen atom, an aliphatic hydrocarbon group, an aryl group, or a heteroaryl group, $R^5$ and $R^6$ may be bonded, $L^4$ represents a single bond or a divalent linking group.

2. The magnetic tape according to claim 1, wherein the ratio θr is 0.80 or more.

3. The magnetic tape according to claim 1, wherein the ratio θr is 0.85 or more.

4. The magnetic tape according to claim 1, further comprising:

one or more non-magnetic layers including a non-magnetic powder between the non-magnetic support and the magnetic layer.

5. The magnetic tape according to claim 1, further comprising:

a back coating layer including a non-magnetic powder on a surface side of the non-magnetic support opposite to a surface side having the magnetic layer, wherein the fluorine-containing compound is selected from the group consisting of polymers (1-1) to (1-21), and for each polymer, "a" and "b" represent a content (unit: mass %) of each repeating unit with respect to the total repeating unit in the polymer:

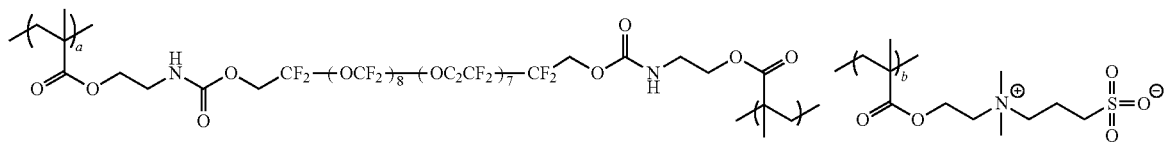

(1-1)

(1-2)
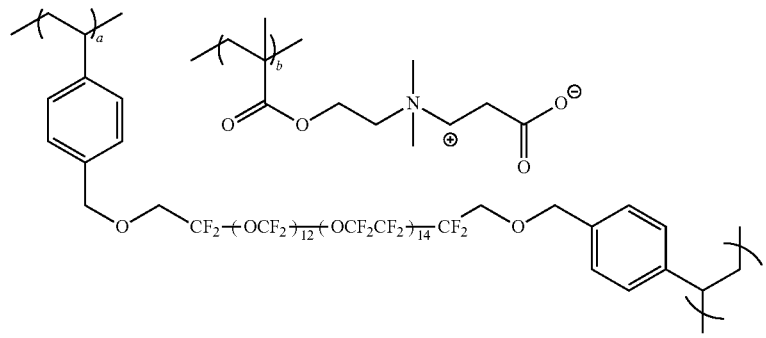
(1-3)
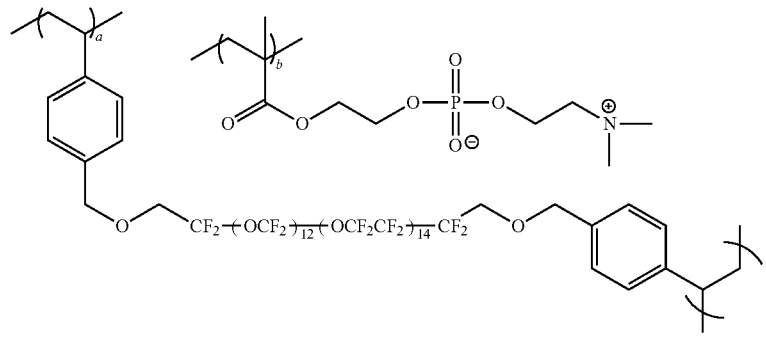
(1-4)
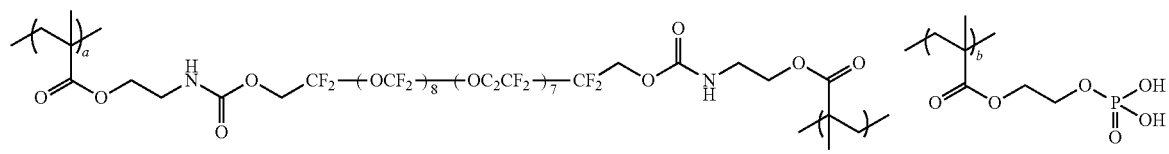
(1-5)
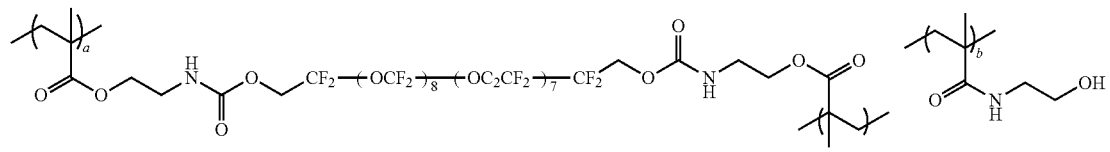
(1-6)
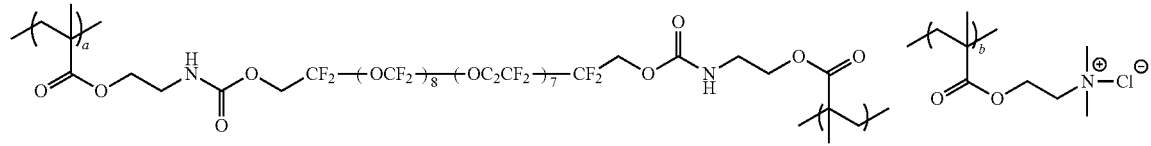
(1-7)
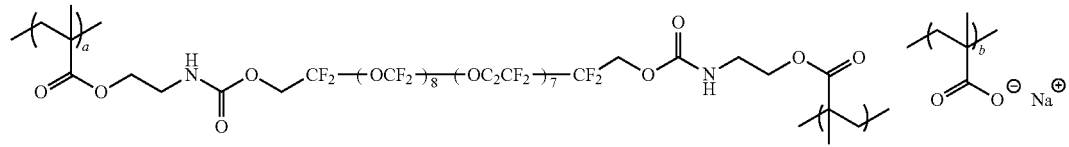
(1-8)
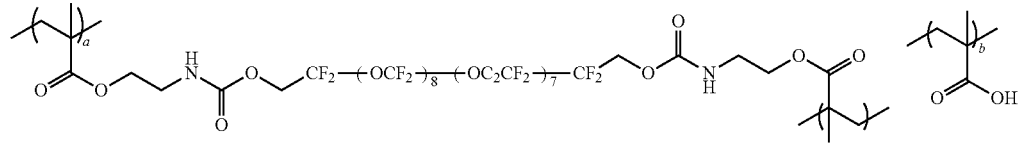

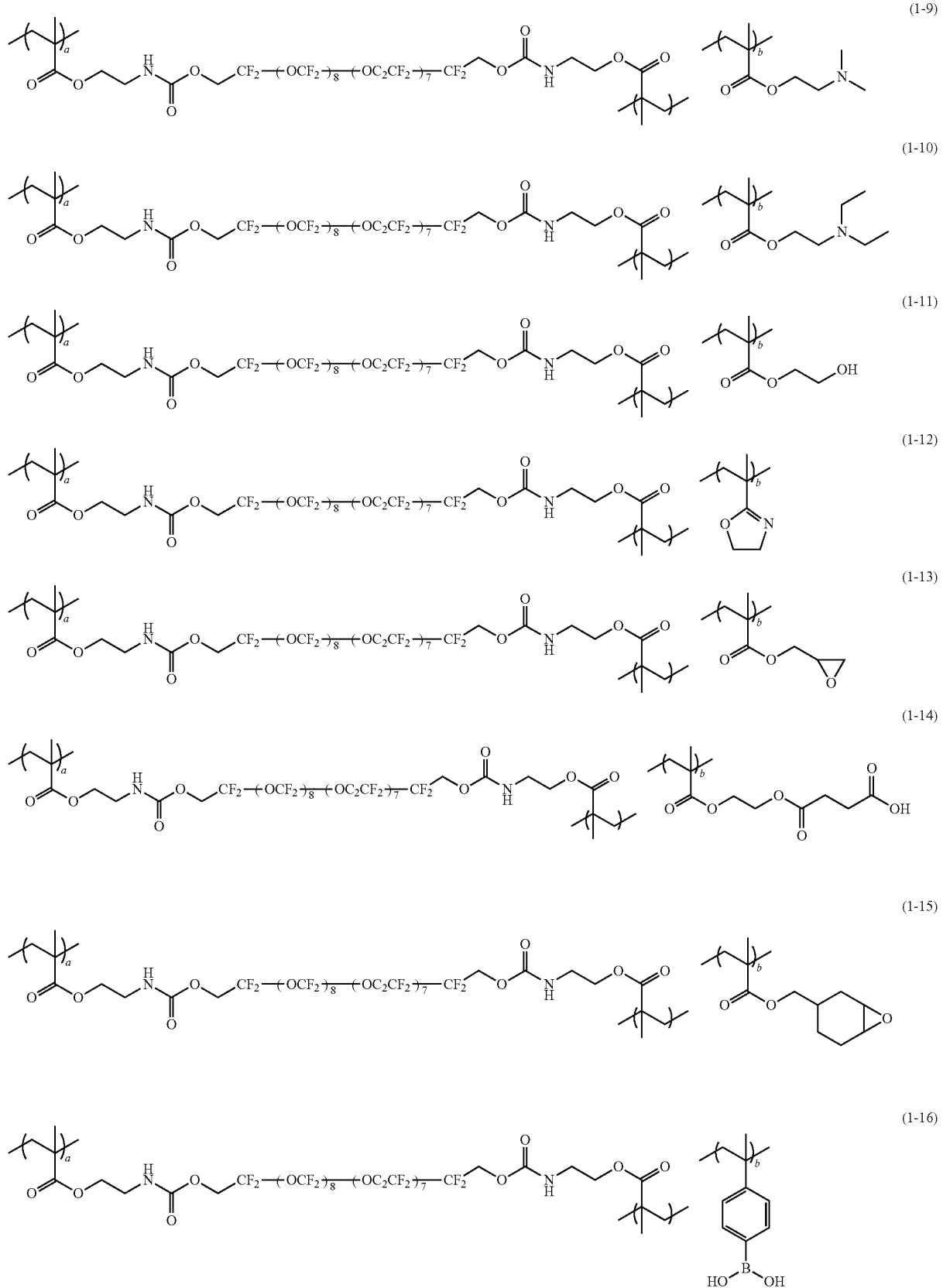

-continued (1-17)
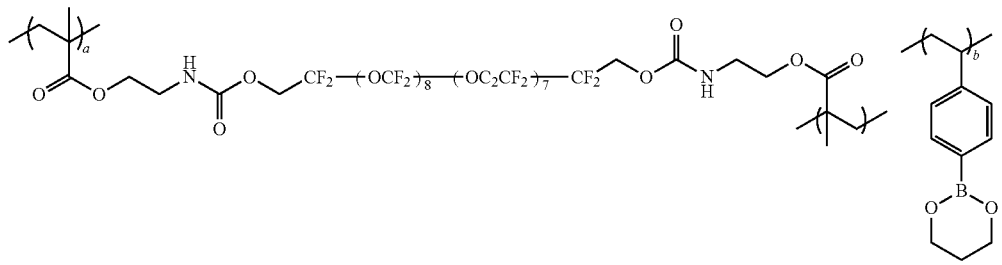

(1-18)
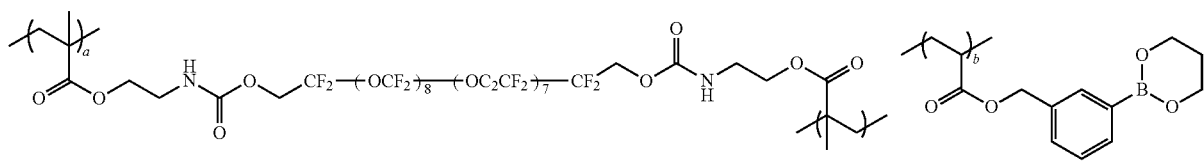

(1-19)
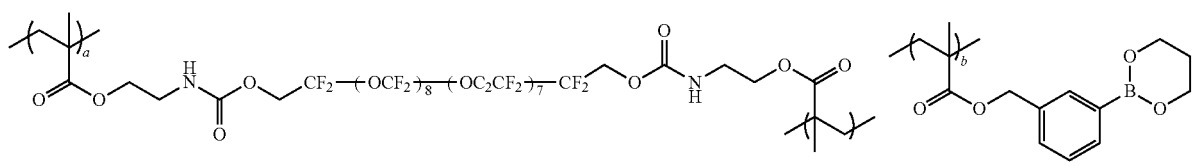

(1-20)
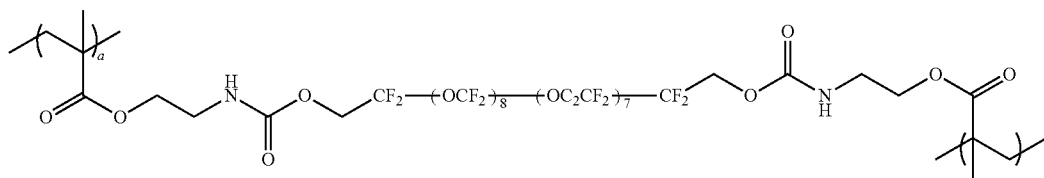

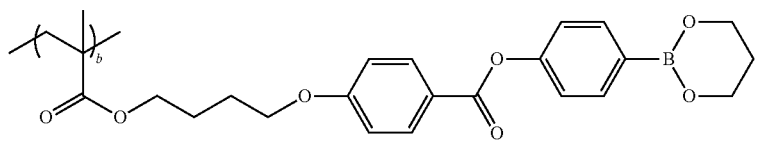

(1-21)
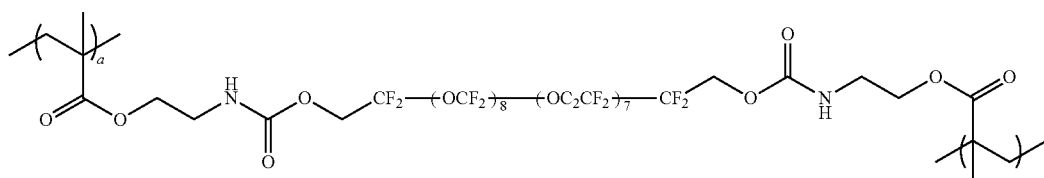

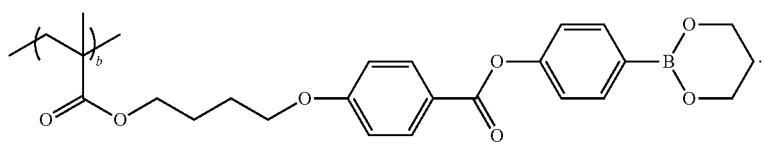

6. The magnetic tape according to claim 1, wherein the ferromagnetic powder is a hexagonal strontium ferrite powder.

7. The magnetic tape according to claim 1, wherein the ferromagnetic powder is a hexagonal barium ferrite powder.

8. The magnetic tape according to claim 1, wherein the ferromagnetic powder is an ε-iron oxide powder.

9. A magnetic tape cartridge comprising:
the magnetic tape according to claim 1.

10. The magnetic tape cartridge according to claim 9, wherein the ratio θr is 0.80 or more.

11. The magnetic tape cartridge according to claim 9, wherein the ratio θr is 0.85 or more.

12. The magnetic tape cartridge according to claim 9, wherein the ferromagnetic powder is a hexagonal strontium ferrite powder.

13. The magnetic tape cartridge according to claim 9, wherein the ferromagnetic powder is a hexagonal barium ferrite powder.

14. The magnetic tape cartridge according to claim 9, wherein the ferromagnetic powder is an ε-iron oxide powder.

15. A magnetic tape apparatus comprising:
the magnetic tape according to claim 1.

16. The magnetic tape apparatus according to claim 15, wherein the ratio θr is 0.80 or more.

17. The magnetic tape apparatus according to claim 15, wherein the ratio θr is 0.85 or more.

18. The magnetic tape apparatus according to claim 15, wherein the ferromagnetic powder is a hexagonal strontium ferrite powder.

19. The magnetic tape apparatus according to claim 15, wherein the ferromagnetic powder is a hexagonal barium ferrite powder.

20. The magnetic tape apparatus according to claim 15, wherein the ferromagnetic powder is an ε-iron oxide powder.

* * * * *